(12) United States Patent
Yang et al.

(10) Patent No.: US 7,949,642 B2
(45) Date of Patent: May 24, 2011

(54) SYSTEM AND METHOD FOR MANAGING AND PRESENTING ENTITY INFORMATION

(76) Inventors: Wendy W Yang, San Mateo, CA (US); Stan J Simon, San Mateo, CA (US)

( * ) Notice: Subject to any disclaimer, the term of this patent is extended or adjusted under 35 U.S.C. 154(b) by 0 days.

(21) Appl. No.: 11/248,480

(22) Filed: Oct. 11, 2005

(65) Prior Publication Data

US 2006/0101005 A1    May 11, 2006

Related U.S. Application Data

(60) Provisional application No. 60/618,201, filed on Oct. 12, 2004.

(51) Int. Cl.
    *G06F 7/00* (2006.01)
(52) U.S. Cl. ...................................................... 707/706
(58) Field of Classification Search ............... 707/104.1, 707/999, 706
    See application file for complete search history.

(56) References Cited

U.S. PATENT DOCUMENTS

| | | | |
|---|---|---|---|
| 5,907,837 A * | 5/1999 | Ferrel et al. ........................ 707/3 |
| 5,917,436 A * | 6/1999 | Endo et al. ................ 340/995.14 |
| 5,948,040 A * | 9/1999 | DeLorme et al. ............. 701/201 |
| 6,263,343 B1 * | 7/2001 | Hirono ........................ 707/104.1 |
| 6,477,526 B2 * | 11/2002 | Hayashi et al. .................... 707/4 |
| 6,760,770 B1 * | 7/2004 | Kageyama .................... 709/229 |
| 6,957,250 B1 * | 10/2005 | Nakano ......................... 709/219 |
| 2002/0029226 A1 * | 3/2002 | Li et al. ....................... 707/104.1 |
| 2002/0042819 A1 * | 4/2002 | Reichert et al. ............... 709/217 |
| 2002/0176117 A1 * | 11/2002 | Randalli et al. ............... 358/407 |
| 2002/0177944 A1 * | 11/2002 | Ihara et al. ..................... 701/208 |

OTHER PUBLICATIONS

Switchboard, Switchboard.com home page, web page, Jul. 16, 2004, switchboard.com, published on internet, 1 page.
KB Home, kbhome.com web page, web page, Jul. 16, 2004, kbhome.com, published on internet, 1 page.
Shea Homes, sheahomes.com web page, web page, Jul. 16, 2004, sheahomes.com, published on internet, 1 page.
Metrobot LLC, Metrobot LLC releases map based search engine & city guide, press release, Oct. 14, 2003, metrobot.com, published on internet.
Kevin Ryan, SearchTHIS: Overture Gets Local Right, internet article, Jun. 29, 2004, imediaconnection.com, published on internet.
Yahoo, Yahoo! Launches Smartview Technology: New Mapping Feature Creates Customzied Visual Search Capability, press release, Mar. 29, 2004, yahoo.com, published on internet.

(Continued)

*Primary Examiner* — Wilson Lee
*Assistant Examiner* — Michael Le

(57) ABSTRACT

A system and method for managing and presenting entity information is described. In an illustrative implementation, information such as product availability and operating hours is stored in a server (130). A query may be sent from a client (202) having a time (1402), date (1410), or both inquiring, for example, which entities are open at a certain or range of times, in the past, present or future. The server (130) compares the queried time with stored information, such as hours entries (4000, 4050). The results are displayed on a map (300) with open entities represented by a first symbol (930R) and closed entities by a second symbol (930G) such that all the entities on the map (300) are viewable without further searches. Clicking on a symbol (422) leads to a display (940) containing information about the associated entity, thereby enabling an entity's information to be found using only its location.

44 Claims, 29 Drawing Sheets
(17 of 29 Drawing Sheet(s) Filed in Color)

OTHER PUBLICATIONS

Google, Google Connects Searchers With Local Information, press release, Mar. 17, 2004, google.com, published on internet.
Brian Morrissey, Yahoo Adds Local Search to Maps, internet article, Mar. 10, 2004, DMNEWS.com, published on internet.
Hollie Cooper, Perform a Map-Based Search, internet article, Oct. 3, 2002, www.superpages.com, published on internet.
Localharvest, localharvest.com home page, web page, Jul. 17, 2004, localharvest.org, published on internet.
Google, Google.com home page, web page, Jul. 17, 2004, google.com, published on internet.
SBC, Smartpages.com home page, web page, Jul. 16, 2004, smartpages.com, published on internet.

* cited by examiner

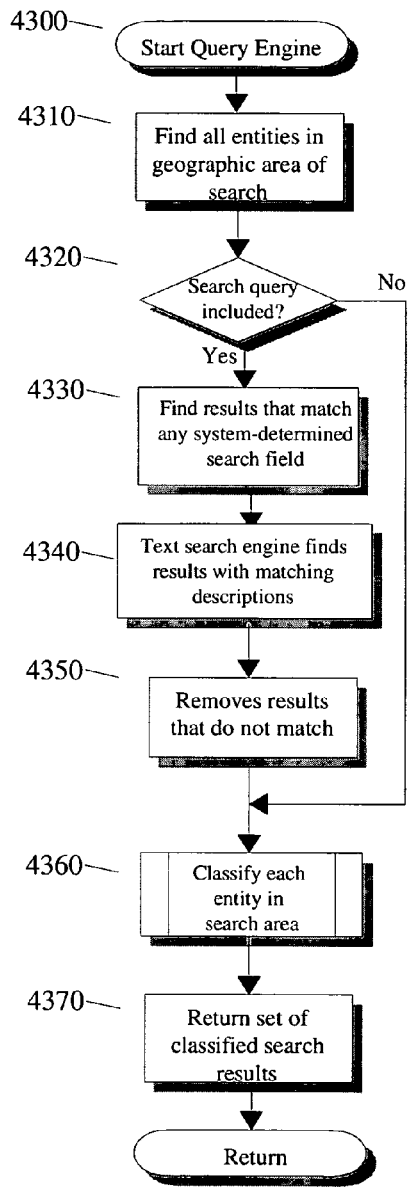
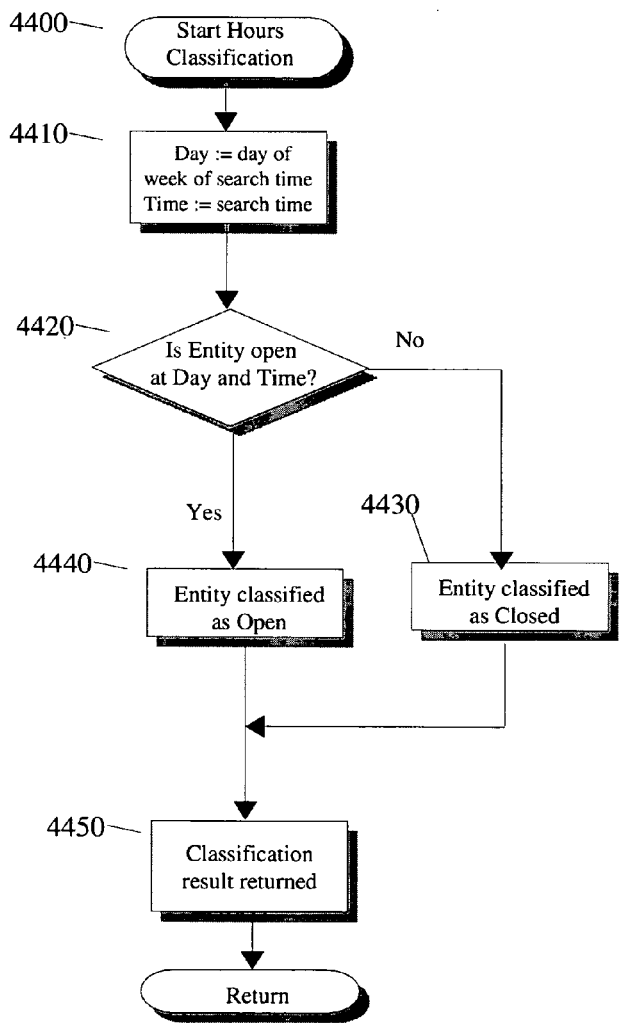
FIG. 43
FIG. 44

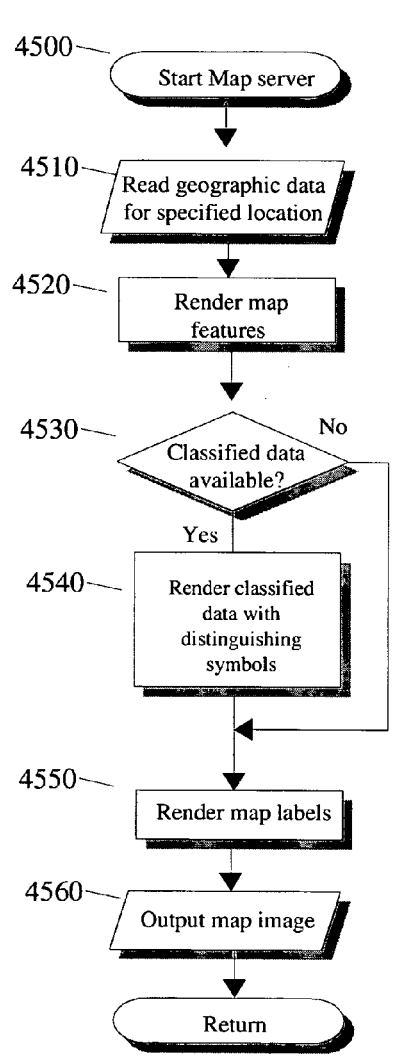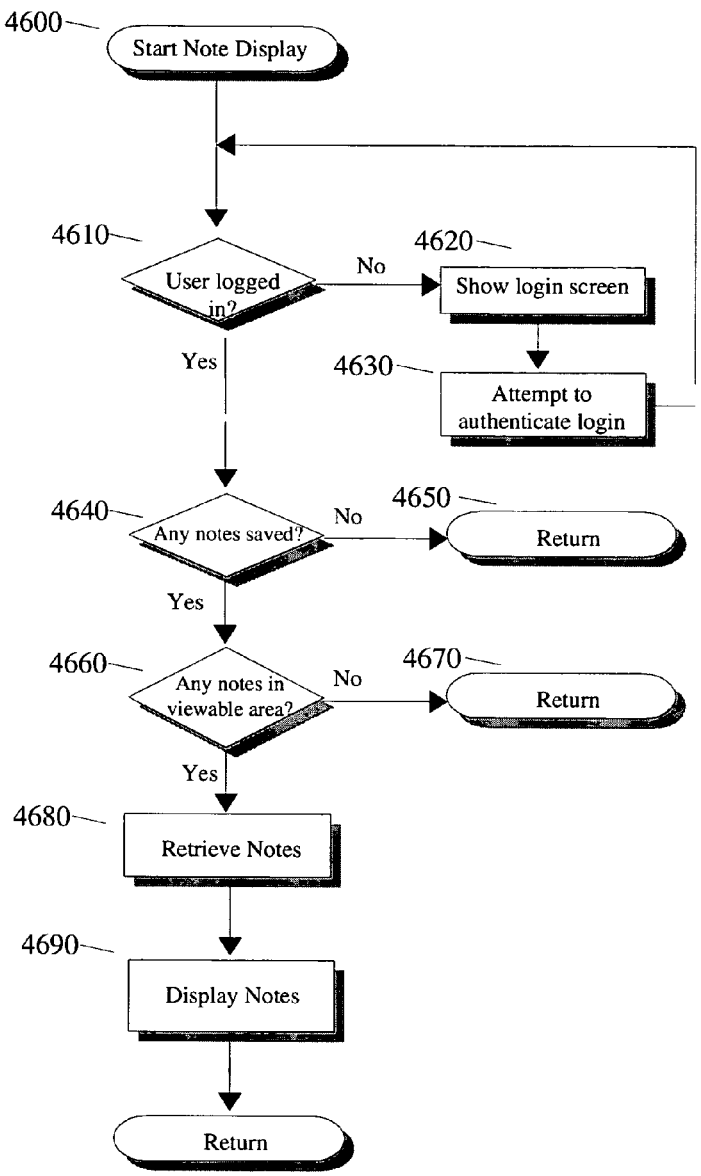
FIG. 45
FIG. 46

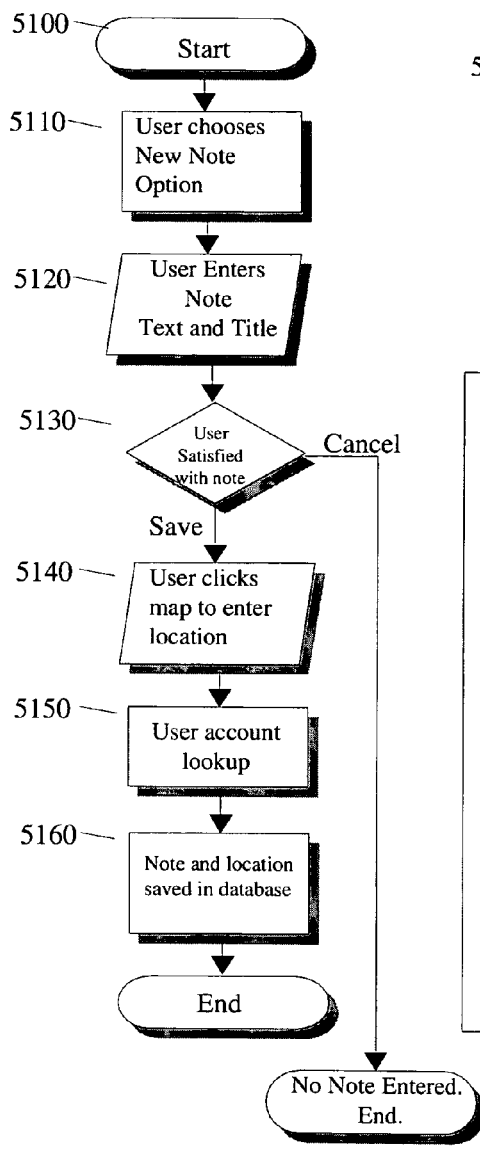
FIG. 51A
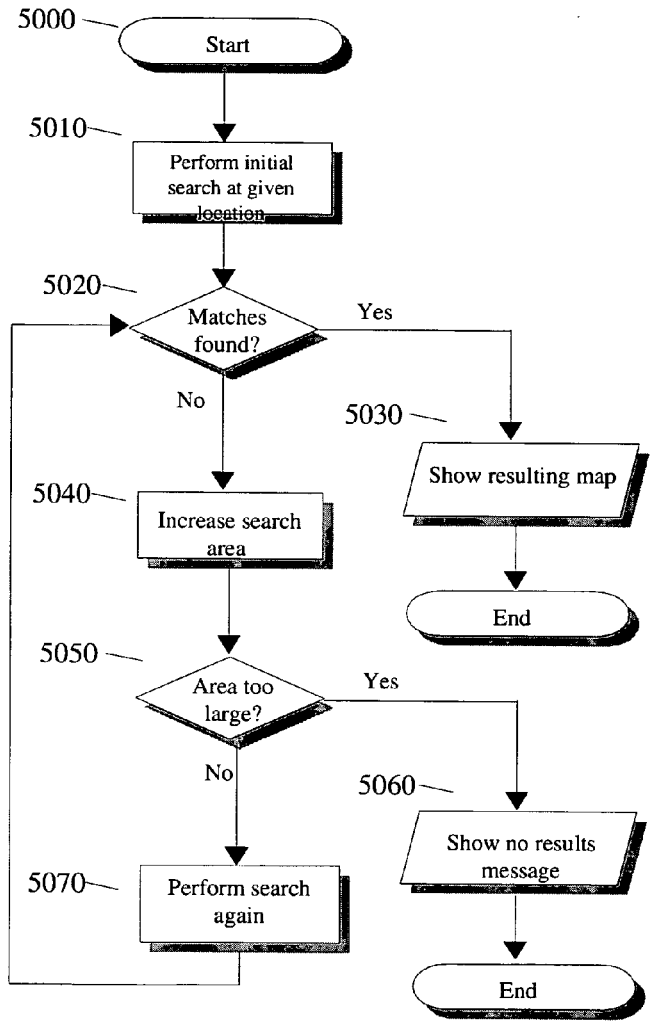
FIG. 50
| 5115 | 5125 | 5135 | 5145 | 5155 | 5165 |
|---|---|---|---|---|---|
| 12001 | ralp | 7.8465N | 122.5069W | Great Soup! | The restaurant here serves great chicken noodle soup. |
| 12002 | jane | 7.8512N | 122.5378W | Parking | Street parking is easy to find. |
5105
FIG. 51B

SYSTEM AND METHOD FOR MANAGING AND PRESENTING ENTITY INFORMATION

CROSS-REFERENCE TO RELATED APPLICATIONS

This application claims the benefit of provisional patent application Ser. No. 60/618,201, filed 2004 Oct. 12 by the present inventors.

FEDERALLY SPONSORED RESEARCH

Not Applicable

SEQUENCE LISTING OR PROGRAM

Not Applicable

FIELD OF THE INVENTION

This invention relates to systems and methods for managing information of one or more entities and presenting the information about such entities, such as on a map, with symbols conveying information about the entities, such as the hours of operation of the entities.

BACKGROUND OF THE INVENTION

Finding information regarding entities like businesses, organizations, or events in a specific area often means looking through the printed Yellow Pages or searching electronically through search engines or electronic directories and listing services such as Internet Yellow Pages. An example of an Internet Yellow Pages is www.smartpages.com, and an example of a search engine is www.google.com. While useful, printed Yellow Pages have major drawbacks including space limitations that cause the information provided to be limited, as well as publishing frequency limits which limit how up to date the information can be. For example, the printed Yellow Pages are not useful for printing news regarding a weekend special or daily menu items for a restaurant.

On the Internet, a business can provide more information on its web site than it is able to in the printed Yellow Pages as well as update it as frequently as necessary. However, finding a web site for a specific business can be difficult, especially for local businesses that may not have an easily remembered web address or an easily searchable name. For example, a restaurant named "Best Cuisine" located in Boston, Mass. contains such generic terms in its name that a search containing "best cuisine" and "Boston" is unlikely to find the web site for the restaurant. Finding categories of businesses on the Internet (particularly for local businesses) is also problematic. Internet search engines attempt to help find this information, but, using them usually requires a multi-step process that often does not result in relevant information. Finding information regarding businesses at a specific location in a search engine entails assembling a list of relevant keywords and a geographic locator. For instance, if one were searching for a business that sells tennis rackets in Boston, Mass., one could type in "tennis racket", and "Boston" in the search box. The problem with performing this type of search on a search engine is that the result may include noncommercial results such as articles regarding tennis rackets or tennis organizations in Boston, rather than a business that sells the product. The result may also encompass a business that sells tennis rackets but does not have a physical location or a business with a physical location in a different state or in the same state but very far away. This is not useful for users who want to go to a nearby store and buy the tennis racket immediately.

Finding information regarding a business in Internet Yellow Pages entails typing in a location and guessing a category that the desired businesses may fall into. For instance, in our example above, one may type in "tennis store" for a category. Depending on the directory, the search may or may not return relevant results. If the search does not return a relevant result, than one would have to perform the search again, possibly trying a different category like "sporting goods."

Another shortcoming of the prior art approaches to finding information regarding local businesses is that none of the methods discussed above allows one to browse multiple types of businesses in a desired radius. For instance, a user may wish to plan an evening shopping trip by looking for information on restaurants, gift shops, and clothing stores on or near Newbury Street in Boston, Mass. Doing this type of search would entail multiple searches in the printed Yellow Pages, search engines, and Internet Yellow Pages. In this example, the most relevant criteria for choosing the stores to visit and a restaurant might be distance of the businesses from each other and the hours of operation. This type of search is quite difficult to perform in the printed Yellow Pages because searching for a business based on distance is not possible in the printed Yellow Pages since only an address, and not a map or a radius, is given for a business listing. This type of search would also be a particularly difficult query to do with a traditional search engine or on an Internet Yellow Pages site. It would require performing a separate search for clothing stores, gift shops, and restaurants at the desired address or street; examining each set of search results for relevant matches (such as clothing type, type of gifts desired, and type of cuisine); re-doing any searches that do not return relevant results; searching through the relevant results for each one's business hours; determining whether the gift shops, clothing stores, and restaurants found are open during desired hours; determining whether the gift shops, clothing stores, and restaurants found are within walking distance of each other, and performing more searches if one business is not within walking distance of the others; taking notes on the results as they are found in order to use later (or opening many confusing web browser windows); and finally combining all the results into a reasonable set of businesses at the end.

Another shortcoming of the prior art approaches is that it would be very difficult for a user to find all the businesses in a particular section of a city. For example, if the user will be staying at a hotel on Fifth Avenue in New York and would like to know about all of the businesses on the same block as the hotel, the traditional approaches do not enable the user to find such businesses. Listings in the Printed Yellow Pages are organized alphabetically or by categories so finding all the businesses in one block of Fifth Avenue would be quite a difficult task. Performing such a search on a traditional search engine is also quite difficult, given that a geographic locator, such as "Fifth Avenue" and "New York" would have to be entered into the search box, but limiting the geography to a certain block in Fifth Avenue is not possible on the traditional search engine. Internet Yellow Pages allow a user to search by radius, so for example, a user can enter a street number on Fifth Avenue and perform desired searches, but since searches on an Internet Yellow Pages site are based on categories, the user would have to perform a separate search for all the categories that the user may be interested in (e.g., women's apparel, accessories, children's apparel, gift shops, restaurants . . . etc.). Furthermore, searches are based on a radius in Internet Yellow Pages, so that such searches would include results on other streets or other neighborhoods in the vicinity which may be in areas the user is not interested in visiting.

As discussed above, the hours of operation for a business is a common source of questions regarding local businesses. Users would like to be sure that a business will be open when they get there before they make a trip to it. Many business include their operating hours in their printed or Internet Yellow Pages or web site listings, but these are textual listings of the hours and can be hard to find. On the Internet, a user would have to find the web site or a listing of a business by performing a search on a search engine or an Internet Yellow Pages, click on the listing or web site, then find the right link to display the operating hours. Even after the hours are found, it requires a bit of time and thought to find the correct hours of operation for the current day and time, and see if the business is currently open. In particular, this mental computation is impractical when one wants to quickly glance through a list of tens or hundreds of businesses to see which one is open now, as might happen if you urgently need to purchase something late at night or on a holiday. Also, listings in printed Yellow Pages or online web sites often make no mention of special holiday hours, vacations, or temporary closings or hours changes. Often, it is during these situations when consumers need operating hours information the most.

A similar problem exists whenever a user needs to search through multiple entities for any single piece of information, such as searching through all the hotels in a certain neighborhood to find those that have a current vacancy. Other examples include finding one of the many stores within walking distance of one's home that sells a particular brand of phone, finding the businesses among all the businesses within the user's town that are hiring a cashier, finding all the movies in movie theaters that are within a half hour drive that will be playing between 45 minutes to 1½ hours from now, finding the homes within a particular neighborhood that are having an open house or a garage sale tomorrow, finding the apartment complexes among all the apartment complexes in a certain neighborhood that have apartments available, or finding all the parks in a town that are currently having a concert. This problem also applies to combinations of information, such as finding all the stores in the neighborhood with a particular phone in stock that is currently open. All of these searches can be difficult or time-consuming with existing approaches.

Other shortcomings of prior art approaches include their methods of presentation. Searches for entity information, even seemingly simple searches, can produce large amounts of result data. Some example data include names, pictures, distances, product and service availability, and operating hours. Presentation methods that can communicate large amounts of complex data in a simple manner are desirable. However, pages filled with textual listings to click on are still the typical results from current search engines and Internet Yellow Pages. Also, even though search results may include large amounts of data, it can be unclear to a user which pages or data were searched to find the results. For example, a user who is aware of a nearby tennis store may attempt to look up its hours in an Internet Yellow Pages, but find that the store does not appear in the results. Does this mean that the store is not present in the directory, or that perhaps the category searched under (e.g., sporting goods) was wrong? It would be advantageous to communicate to the user which entities were searched to find the answer, while still keeping the matching results easily comprehensible.

In light of the foregoing complexity, one can see why it is desirable to provide systems or methods to make finding information about entities easier.

SUMMARY OF THE INVENTION

According to the present invention, systems and methods for presenting and managing information regarding entities (defined below) are provided. Such entity information could encompass various entity characteristics, including, without limitation, hours of operation, availability of a product or service, movie start times, concert and festival times and dates, other event occurrences, job availability, apartment openings, hotel vacancies, garage sales, open houses, any information associated with a physical location, or any other information regarding an entity (hereinafter referred to as "entity characteristics").

An embodiment of the present invention encompasses a web site, which further encompasses a map. Provided on the map are multiple links. Each link represents an entity and is linked to a web page with information regarding the entity. The link is placed at a location on the map which is proximate to the physical location of the entity. The web site may be provided with address entry forms or navigational buttons that allows a user of the web site to select the viewable area of the map, zoom in or out, select a desired viewing level, or pan the map in multiple directions. A user of the systems and methods would then be able to find information regarding a particular entity by looking in the vicinity where the entity is located, without having to enter a search name that includes the name of the entity that may be too difficult to find with a search engine, such as if the name is too generic (as in the example above of a restaurant named "Best Cuisine"). Such systems and methods enable users to more easily find and understand entity information, providing advantages such as allowing users to easily find business information without knowing the categories, keywords, address or business name of the business or their exact spellings; allowing users to browse all listings in a geographic area and then either view information about businesses that spans multiple categories or narrow the set of listings down by eliminating unwanted results from the map; and finding information (including Internet web site addresses) for any entity they know the physical location of. Furthermore, the user of the web site need not enter a physical location or category or business name to search for a business, but simply uses the address entry form or the navigational buttons to view the desired area of the map and browse for desired businesses. These improved systems and methods of finding entity information increase efficiency in finding entity information and provide an incentive for entities to update their entity information more frequently.

In another embodiment of the present invention, the web site may be further provided with a search engine. This search engine may allow a user to select or type in a search query containing a search term or phrase such that a comparison of the query with either information on the map or with the keywords, categories, or information in the web pages connected to the links is performed, and any link whose associated entity contains no information that is a match to the query is eliminated from the map. When no business is found that matches the query, according to an alternative embodiment of the present invention, the map automatically zooms to a level or region such that the viewable area of the map on the web site contains at least one business that matches the query.

In another embodiment of the present invention, the web site is provided with pages for entities to enter and modify the information about themselves that will be accessible to users of the system. This is advantageous for businesses, since it provides a system and methods for them to display information where it can be easily found by their customers and updated at any time.

In another embodiment of the present invention, the information entered by an entity is captured in great detail. The systems and methods include allowing entities to enter their operating hours information in its full complexity, including multiple openings and closings on the same day, exceptional dates on which the normal operating hours are not followed, such as vacations and holidays, and special cases such as currently open or closed, or open around the clock. These systems and methods also include allowing entities to manually enter their exact location (such as by placing it graphically on a map), improving the geographic location of their listing. By properly accounting for such detailed information, this embodiment can help businesses automatically answer common customer questions (such as holiday operating hours) that would otherwise be dealt with manually, such as with customer telephone calls.

In another embodiment of the present invention, links to web pages including information regarding entities are contained in symbols. The symbols can be, without limitation, shapes, images, pictures, colors, sounds, videos, animations, or any combination thereof, or images distinguished by color, shading, intensity, or pattern, or presence or absence of any symbol at all. The symbols may be associated with any entity characteristic, such as hours of operation or availability of a product or service. These characteristics may change over time, so that the symbols can be coded and used to present dynamic information at a glance. For example, when an entity is open for business, the symbol can be a green dot, and when the business is closed, the symbol can be changed to a red dot. One advantage of this aspect of the present invention is that a user of the described web site can easily find information about a particular business or businesses that have the desired characteristic. For example, one could look at the symbol for an entity to determine whether an entity is currently open rather than determining the current time and date and compare this to the listed hours of operation. The same can be done for a list of entities. In an embodiment of the present invention that includes a directory, one could find all the entities that are currently open in Boston, Mass., by simply typing in Boston, Mass. into the directory or navigating to the desired view of Boston, Mass. in an embodiment that further includes a map and looking for green dots. This is a great improvement over textual listings of operating hours. The web site may be further provided with time changing options so that a user can enter a time other than the present for display on the map, for example, next July $4^{th}$ at 11 pm, and see which entities will be open at that time.

Classifying the entity characteristics with dynamic representations in this way has advantages over simply presenting only entities with characteristics matching the desired type. Users can be sure that the non-matching results were properly searched, because they are still visible on the map (but shown in red). Also, this method is able to simultaneously present multiple pieces of information about entities without requiring additional user steps. For example, a user who has moved to a new town may wish to find all the Chinese restaurants in their neighborhood, and may also want to know which ones are currently open for dinner. This method shows all the Chinese restaurants in the neighborhood as visible results on the map, while the classification (into red and green dots) communicates the operating hours information at the same time. Furthermore, users who repeat operating hours searches using different times will be less confused by changing colors than by matching results appearing and disappearing from the map with each query. Other embodiments of the invention may present characteristics other than operating hours or use different symbols than red and green dots, or may present multiple classified characteristics on the map at the same time using more complex symbols.

In another embodiment of the present invention, methods and systems for evaluating search queries distributed over many servers and presenting the results are provided. A single query by a user to the system will automatically retrieve results from numerous servers which may include one or more servers of one or more entities. These results are then presented as easily understood coded symbols on a map. This distributed query mechanism can lower the search query load on the system and potentially provide better control of detailed entity information by allowing the entities to store it on their own servers. For example, this method could be used to search for a specific tennis racket model and receive a detailed map of the area with a green dot representing stores with the tennis racket in stock, and a red dot representing stores that do not have the racket in stock; the product availability information having been retrieved directly from each store's web site.

In another embodiment of the present invention, the name of the entity is placed on or about its associated symbol directly on the map so that a user can identify the name of the entity without referring to a legend or moving or clicking the mouse. This may allow users to more easily discover information about entities while browsing detailed street-level maps.

In another embodiment of the present invention, when a user moves the cursor so that the cursor hovers on or around the symbol of an associated entity, information regarding such entity is displayed. In one embodiment of the invention, this information is limited to a summary of information about the entity that may be quickly understood by a user.

In another embodiment of the present invention, when a user clicks on or around the symbol of an associated entity, information regarding such entity is displayed. In one embodiment of the invention, this information is a detailed description of the entity that may be used by a user seeking information about a specific entity.

In another embodiment of the present invention, a button is provided such that clicking on the button displays a slide show of the entities. This slide show format makes it easy to display information about many entities to a user without requiring them to make repeated mouse clicks. The set of entries in the slide show may be those which are displayed on the viewable region of the map or those that match some other criteria.

In another embodiment of the present invention, the web site allows a user to save entities or regions as favorites. This helps users save time when doing common or repeated searches.

In another embodiment of the present invention, a button is provided to allow a user to insert a note and associate such a note to a map location. Exemplary uses of such notes are to allow a user to place reminders on the map that describe entities or locations, or write notes to oneself or others regarding an errand that is associated with the location or entity (e.g., a note to drop off dry cleaning at Hometown Dry Cleaners could be attached to a map in the vicinity of the location of Hometown Dry Cleaners).

Other embodiments of the present invention may be implemented without the use of a map or entity directory.

Other features of the present invention will be apparent from the accompanying drawing and from the detailed description which follows.

BRIEF DESCRIPTION OF THE DRAWINGS

The file of this patent contains at least one color drawing. Copies of the patent with color drawings will be provided by the PTO upon payment of necessary fee.

The foregoing aspects and many of the attendant advantages of this invention will become more readily appreciated as the same becomes better understood by reference to the following detailed descriptions, when taken in conjunction with the accompanying drawings, wherein:

FIG. 43 is an exemplary flow diagram of a method for qualifying, matching, and classifying entities in accordance with the present invention;

FIG. 44 is an exemplary flow diagram of a method for classifying business hours and other entity characteristics of entities in accordance with the present invention;

FIG. 45 is an exemplary flow diagram of a method for generating maps in accordance with the present invention;

FIG. 46 is an exemplary flow diagram of a method for displaying notes on a map in accordance with the present invention;

FIG. 50 is an exemplary flow diagram of a method for finding matching results when no matches are apparent on a map in accordance with the present invention;

FIG. 51A is an exemplary flow diagram of a method for adding notes to a given location in accordance with the present invention;

FIG. 51B is an exemplary data structure showing the layout of note entries in the user account tables of the database;

DETAILED DESCRIPTION

Figure 1:
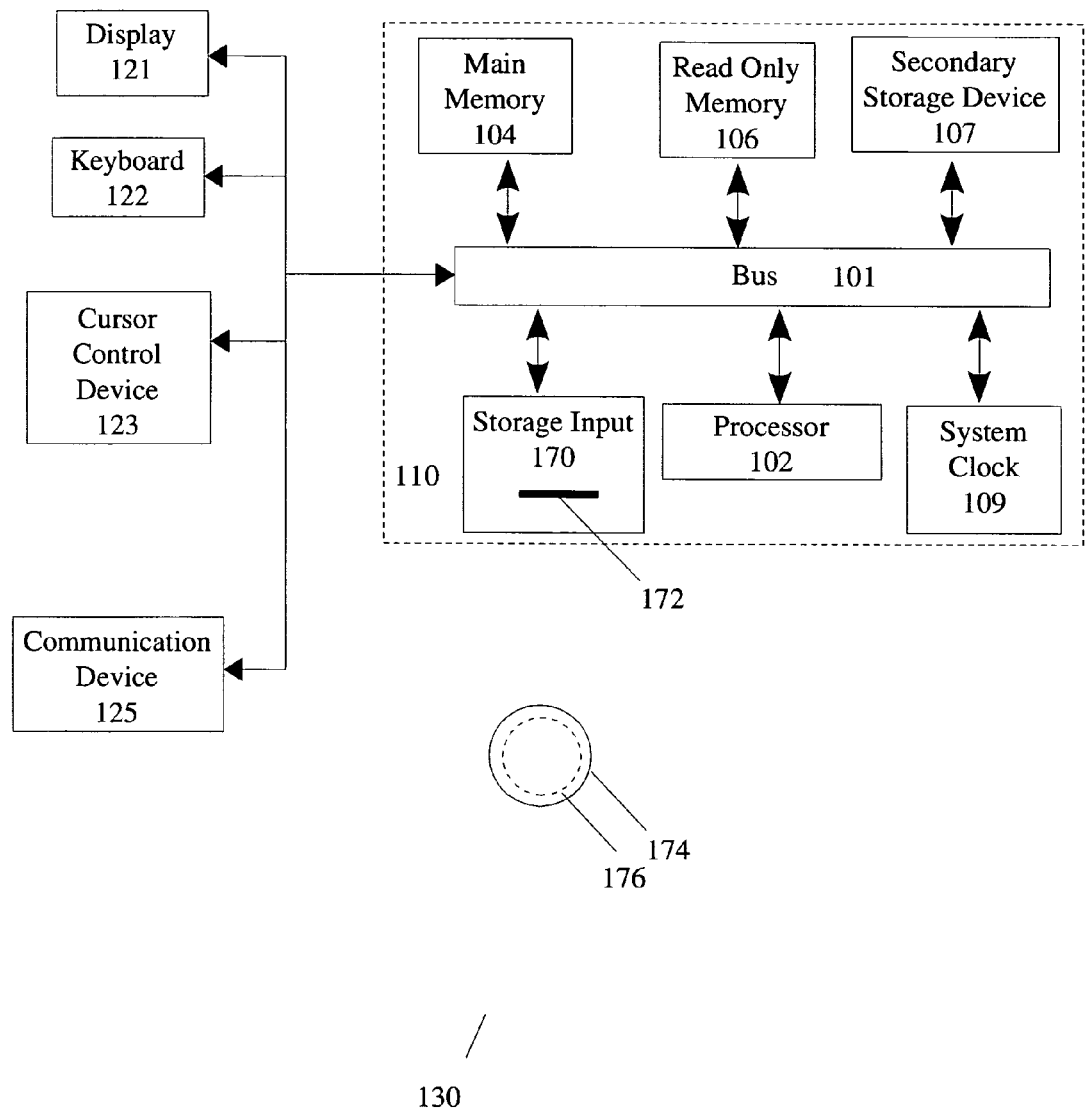
FIG. 1 is a simplified block diagram of an exemplary server.

Systems and methods for presenting and managing entity information are described. In an exemplary embodiment, the present invention provides systems and methods for managing and presenting information regarding, without limitation, businesses, organizations, groups, individuals, other entities, events, attractions, places, points of interest, objects, or information associated with a physical location (hereinafter referred to as "entity" or "entities"). Such entity information could encompass various entity characteristics, including, without limitation, hours of operation, availability of a product or service, movie show times, concert and festival times and dates, other event occurrences, job availability, apartment openings, hotel vacancies, garage sales, open houses, any information associated with a physical location, or any other information regarding an entity (hereafter referred to as "entity characteristics"). The methods and systems can be implemented on an individual computer, navigational system, or device or a network of computers or devices. The network of computers can be a local area network (LAN), a wide area network (WAN), an intranet, an extranet, an internet, or the public Internet or a combination thereof. Merely by way of example, the invention is illustrated using the Internet, but one of ordinary skill in the art would recognize that the invention can be implemented on an individual computer or a network of computers described above.

The present invention is explained with reference to a specific embodiment that operates on a client-server network using HTTP messages. The description of a specific embodiment that follows is intended to illustrate, but not limit, the scope of the present invention as set forth in the claims. One of ordinary skill in the art would recognize many other alternatives. The term "client" is used to refer to a computer's general role as a requester of data and "server" is used to refer to a computer's general role as provider of data. Web clients and web servers communicate using a protocol such as HyperText Transfer Protocol (HTTP). In the Web environment, Web browsers reside on clients and render Web documents served by the Web servers. The client-server model is used to communicate information between clients and servers. Web servers are coupled to a computer network such as an internetwork, extranet, WAN, intranetwork, or LAN and respond to document requests and/or other queries from clients. An internetwork is a collection of networks and gateways utilizing a common protocol like the TCP/IP suite so that users and devices of any network segment can communicate with each other. An example of an internetwork is the public Internet. When a user selects a document by submitting its Uniform Resource Locator (URL), a Web browser, such as Internet Explorer, opens a connection to a server and initiates a request (e.g., an HTTP GET) for the document. The server delivers the requested document, typically in the form of a text document coded in a standard markup language such as Hypertext Markup Language (HTML).

In an embodiment of the present invention, the steps of the present invention are embodied in machine-executable instructions. The instructions can also be used to cause a general-purpose or special-purpose processor which is programmed with the instructions to perform the steps of the present invention. Alternatively, the steps of the present invention may be performed by specific hardware components that contain hardwired logic for performing the steps, or by a combination of programmed computer components and hardware components. Additionally, one of ordinary skill in the art will realize that the present invention may be implemented as a single code section or a variety of distinct code elements that functionally interrelate with each other to accomplish the described tasks.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, CD-ROMs, DVD-ROMs, ROMs, RAMs, flash memories, EPROMs, EEPROMs, magnetic or optical cards, or other types of media suitable for storing electronic instructions. The present invention may also be downloaded as a computer program such that the program is transferred from a remote computer to a requesting computer by way of data signals embodied in a carrier wave or other propagation medium via a communication link, such as a modem or network connection. All or part of systems and methods consistent with the present invention may be stored on or read from other computer-readable media, such as secondary storage devices, like hard disks, floppy disks, CD-ROMs or DVD-ROMs, carrier waves received from the Internet, or other forms of computer-readable memory, such as flash memories, EPROMs, EEPROMs, read-only memory (ROM) or random-access memory (RAM).

While embodiments of the present invention are described herein with respect to an entity information service, the systems and methods described herein are equally applicable to other applications in which data is collected from disparate sources and presented, as well as to individual web sites of entities.

FIG. 1 is a simplified block diagram of a computer system 110 representing an exemplary server 130 in which features of the present invention may be implemented. Server 130 comprises a bus or other communication means 101 for communicating information, and a processing means such as processor 102 coupled with bus 101 for processing information. Server 130 further comprises a random access memory (RAM) or other dynamic storage device 104 ("main memory"), coupled to bus 101 for storing information and instructions to be executed by processor 102. Main memory 104 also may be used for storing temporary variable or other intermediate information during execution of instructions by processor 102. Server 130 also comprises a read only memory (ROM) and/or other storage devices 106 coupled to bus 101 for storing data and instructions for processor 102. One or more secondary storage devices 107 such as a standard hard drive, CD-ROM or DVD-ROM drive, EPROM, EEPROM, or flash memory reader, or any other magnetic disk or optical disk and its corresponding drive or any solid state memory or device reader may also be coupled to server 130 for storing databases, files, and instructions. Server 130 also comprises a system clock 109 coupled to bus 101 for returning the current day, date and time of day. Server 130 can also be coupled via bus 101 to a display device 121 such as a cathode ray tube (CRT) or Liquid Crystal Display (LCD) for displaying information to a computer user. A keyboard 122 and/or mouse, stylus, buttons, trackball, or similar cursor control devices 123 may also be coupled to bus 101 for communicating directions to server 130 and for controlling cursor movements on display 121. A communication device 125, such as, for example, modem, network card, other network interface devices (such as those used for coupling to an Ethernet, token ring, wireless network, or other type of network) may also be coupled to bus 101 for communicating with remote servers and/or clients via the Internet, an intranet, or other type of network. In a similar manner, the server 130 may be coupled to clients and/or other servers via a network structure. Storage input device 170 such as a conventional floppy disk drive or CD-ROM drive or DVD-ROM drive accepts via input 172 computer program products 174 such as a conventional floppy disk or CD-ROM or DVD-ROM or other nonvolatile storage media that may be used to transfer computer instructions or data to the server 130. Computer program product 174 has encoded thereon computer readable program code 176, which comprises program instructions, data, or both to configure the server 130 to operate as described hereinbelow.

An exemplary server 130 suitable for use in an embodiment of this invention is a server computer commercially available from a computer manufacturer such as Dell, Inc. of Round Rock, Tex. with dual 2.8 Ghz Xeon CPUs, 4 GB RAM, 2 SCSCI hard drives with a combined capacity of 140 GB, network connectivity, and a multitasking, networked server operating system such as Enterprise 3.0 Linux by Red Hat, Inc. or the conventional Microsoft Windows 2000 operating system by Microsoft, Inc. Other suitable servers include a conventional workstation with an Ultra Sparc processor from Sun Microsystems or an Opteron processor from Advanced Micro Devices, Inc. running the conventional Solaris operating system commercially available from Sun Microsystems of Palo Alto, Calif. or a conventional Macintosh Computer System running the conventional operating system commercially available from Apple Computer Corporation of Cupertino, Calif. One of ordinary skill in the art will understand that other systems may be used as well.

Figure 2:
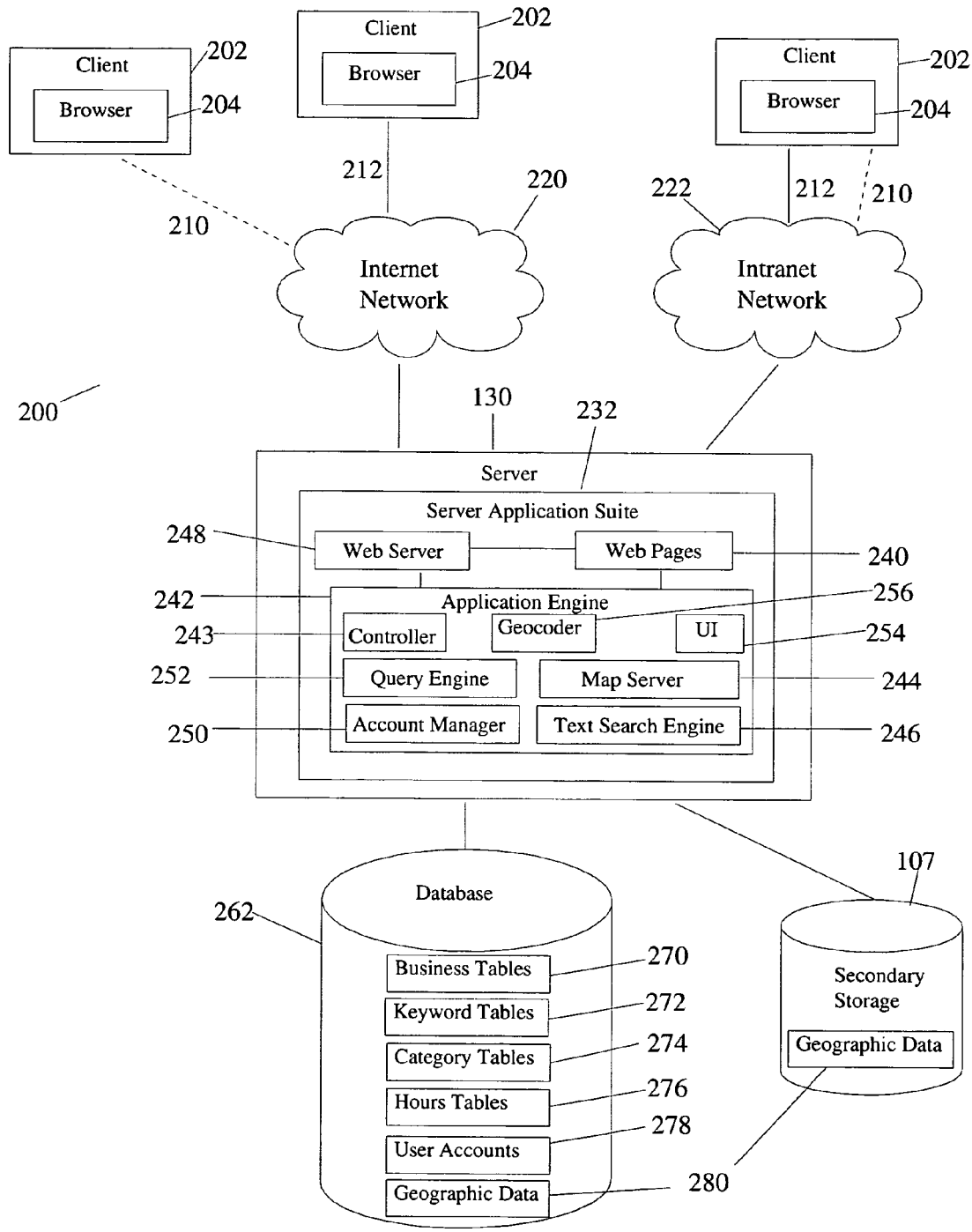
FIG. 2 is a simplified block diagram of the system for presenting and managing entity information.

FIG. 2 is a simplified block diagram of an exemplary system 200 for presenting entity information. The system 200 is generally distributed over individual computers interconnected over a network but can also be a stand-alone system. In the described embodiment, a server 130 is interconnected with a plurality of clients 202 over an internetwork 220, such as the Internet, or an intranetwork 222.

An exemplary server 130 is described hereinabove with reference FIG. 1. While server 130 may be implemented as a single computer, server 130 may also be implemented as a more complex system of interconnected computing and networking components. The server 130 may be made up of a router, a load balancing server, and a predetermined number of redundant web serves. Queries from the clients are typically sent to router where it is forwarded to load balancing server which determines which of the web servers is least loaded and then sends the queries to that web server. One of ordinary skill in the art will recognize that the actual number of servers in this configuration is empirically determined according to cost and performance criteria. Thus, the appropriate number of each server will depend on a variety of performance factors, including, without limitation, such considerations as how many queries the server 130 receives and the amount of data in server 130.

An exemplary client 202 in which features of the present may be implemented is herein described. Each client 202 is a conventional computer system which comprises some or all of the components of the server 130 described hereinabove with reference to FIG. 1. An exemplary client 202 suitable for use in an embodiment of this invention is a personal computer, such as is commercially available from a computer manufacturer such as Dell, Inc. of Round Rock, Tex., having a connection to the Internet. In the described embodiment, each client 202 also runs a web browser 204, such as Internet Explorer available from the software provider Microsoft, Inc. which retrieves web pages 240 over a wired 212 internetwork 220 or wireless 210 internetwork 220 or over a wired 212 intranetwork 222 or wireless 210 intranetwork 222 and displays their contents to the end user. In other embodiments, each client 202 would run other software programs, such as an embedded web browser or custom client application, capable of communicating with server 130 or other module and displaying the results to the user.

The client computer described in the preferred embodiment may also be replaced by any computing device with a suitable display and data network connectivity, including, but not limited to, a laptop, desktop, mainframe computer, dedicated computer, handheld computer, PDA, mobile telephone, other mobile device, interactive television system, set top box, automobile navigation system, other navigation system, or dumb terminal or client with the software running on a server.

In an embodiment of the present invention, the server 130 is also interconnected with a secondary storage 107 (shown in FIG. 1) which can be any conventional storage means as is known in the art such as a hard drive, an array of hard drives, a CD-Rom or DVD-Rom drive, or similar storage means attached over a network connection. A standard hard drive is currently preferred by the inventors. Geographic data 280 in the form of vector or raster map data (as can be procured from various commercial or government sources, including the US Geological Survey or the US Census Bureau) is loaded into the secondary storage 107. Vector data, including shapefiles from the USGS and the TIGER data produced by the US Census Bureau, is currently preferred by the inventors. Alternative embodiments may use additional formats including pre-drawn raster images of maps of certain areas or photographic images. Additionally, alternative embodiments may store the geographic data 280 directly in the main memory 104 of the server 130, computer program product 174, or any other computer readable medium that may be attached directly to the server 130 or connected through a network.

In the described embodiment, the server application suite 232 is loaded into the main memory 104 of the server 130. The server application suite 232 contains functionalities suitable for producing a dynamic web site. For example, server application suite 232 publishes web pages 240 making the web pages 240 available to the clients 202 over internetwork 220 or intranetnetwork 222. In accordance with an embodiment of the present invention, the server application suite 232 comprises a plurality of web pages 240, a web server 248, and an application engine 242. In alternative embodiments, the server application suite 232 may be partitioned so that various parts of it run on different servers 130.

In an embodiment of the present invention, the application engine 242 communicates over local network sockets with database 262 which runs on the server 130 into which is compiled data about entities in business tables 270, keyword tables 272, category tables 274, hours tables 276, and the geographic data 280, said data being stored in the secondary storage 107 in an embodiment of the present invention. Information about registered users of the system 200 is also compiled into the database 262 in user account tables 278. The format of the data structures used in the business tables 270, keyword tables 272, category tables 274, and hours tables 276 are further described hereinbelow with reference to FIGS. 37, 38, 39, and 40, respectively.

The application engine 242 further comprises a controller 243, map server 244, a text search engine 246, an account manager 250, a query engine 252, a UI (User Interface) 254, a geocoder 256 and additional integration logic. The inventors currently rely on a version of the application engine 242 written in a mixture of code in the PHP, SQL, and C programming languages. Computer language function calls and procedures, as well as standard IPC (inter-process communication) techniques like communications over network socket connections are used to communicate between the various modules of the application engine 242 and with parts of the server application suite 232. The included descriptions and figures will permit one with ordinary skill in the art to create such an application engine 242 that performs the necessary methods described hereinbelow.

The map server 244 and text search engine 246 each communicate with the database 262 over local network socket connections. All communications from the map server 244, text search engine 246, other modules of the application engine 242, or any other component or module can utilize socket connections or any other standard inter-process communication mechanisms for communicating with a database as are known in the art, as well as the appropriate authentication method to use to authenticate to the database 262 such as presenting a username/password combination or digital certificate.

In an exemplary operation of an embodiment of the present invention, a user of system 200 directs a web browser 204 of a client 202 to send an HTTP request (which in the current example, contains an address and search query) for information to the server 130, over either the internetwork 220 or an intranetwork 222. This causes the server application suite 232 to process the request using the web server 248 and application engine 242 and its constituent parts, as described more fully hereinbelow. Briefly, this consists of the application engine 242 evaluating the request using its controller 243, which manages the subcomponents needed to handle the request. The controller 243 instructs the geocoder 256 to determine which portions of the geographic data 280 are needed to fulfill the request. The controller 243 instructs the query engine 252 together with the text search engine 246 to determine which entity information is necessary for the request and to classify the information appropriately. The controller 243 then instructs the map server 244 to draw a map of the requested area containing the relevant classified entity information, and the UI 254 to add useful interface elements. This creates a useful presentation of entity information containing a map and information regarding a plurality of entities. This presentation of entity information is described more fully hereinbelow beginning with reference to FIG. 3. The server 130 then sends this information back in an HTML coded HTTP response to the client's 202 web browser 204, as directed by the web server 248. One of ordinary skill in the art will recognize that network protocols other than HTTP are also capable of carrying the necessary communications and that other page description languages than HTML are equally capable of encoding the responses. In addition, if the request is for an entry of or update of entity information, the controller 243 also directs the request to the account manager 250 for further handling.

In an embodiment of the present invention, a map server 244 is used. One of ordinary skill in the art will recognize that any application or development platform suitable for map drawing may be used as a map server 244. Typical products are GIS systems that utilize vector or spatial databases for drawing maps and other purposes. An exemplary map server 244 preferred by the inventors for use in the present invention is MapServer from the University of Minnesota which is currently available (including source code) at the web site mapserver.gis.umn.edu. Some products capable for use as a map server 244 may also perform further mapping functions such as converting addresses into latitude and longitude coordinates, known in the art as geocoding. In an embodiment of the present invention, this functionality is not performed by the map server 244 but is instead performed by the geocoder 256 of the application engine 242. In the described embodiment of the present invention, the map server 244 is responsible for the drawing of maps. Other components of the application engine 242 determine the extent of the map to be drawn and the types of data to render into the map while the map server 244 is responsible for reading geographical data 280 and converting this into a viewable map image. Other embodiments may use the map server to perform geocoding.

In the embodiment that uses a geocoder 256, the geocoder 256 is used to take the address query describing a location such as state names, state abbreviations, city names, zip codes, street names, street addresses, or various combinations thereof, and convert this into latitude and longitude coordinates. The geocoder also tries to recognize abbreviations and misspellings of common words (such as can be found with the use of the well-known soundex or metaphone algorithms). The geocoder 256 takes the given address input, parses it, and converts it into several plausible candidates for address matches in the geographic data 280. It then searches for these candidate matches in the geographic data 280. If a match is found, the corresponding latitude and longitude from the geographic data is then returned. The geocoder 256 uses this and similar algorithms well known in the art to do its work. If desired, one of many commercial solutions may be used for the geocoder 256 such as the one produced by Tele Atlas and described at the web site www.geocode.com. The described embodiment uses a proprietary geocoder 256 written by and used by the inventors using a mixture of code in the PHP, SQL, and C programming languages.

In an embodiment of the present invention, a query engine 252 is used. This component is a software application or module that can determine which entity information is necessary to fulfill a request and classify the information appropriately. The query engine 252 determines which entries in database 262, such as those in the business tables 270, may be needed to fulfill the particular user request. In one embodiment, this is done by examining the fields containing the physical locations of the entities which are stored in the business tables 270. The query engine 252 may also examine other data from the database 262, such as the keyword tables 272 and category tables 274, as well as search results returned from the text search engine 246, in order to find matching results for the user request. This method is described more fully hereinbelow with reference to FIG. 43. In an embodiment of the present invention, the query engine 252 also classifies entities for display based on information in the database 262, such as that in the hours tables 276. This classification may be used to graphically present the entity information, such as on a map, for the user. The classification method used by the query engine 252 is described more fully hereinbelow with reference to FIG. 44.

In an embodiment of the present invention, a web server 248 is used to handle communicating information between clients 202 and the server 130 using the well-known HTTP protocol. An exemplary web server 248 preferred by the inventors for use in the present invention is the Apache HTTP server which is well known in the art and currently available (including source code) at the web site www.apache.org. One of ordinary skill in the art will realize that the server may be implemented in a variety of ways, such as using freely or commercially available website server software such as Internet Information Server from the software provider Microsoft Corporation of Redmond, Wash. or Apache, using custom computer code written in the C, C++, Java, or other programming language, or may be implemented as a hardwired application specific integrated circuit (ASIC) custom designed just for this purpose.

A text search engine 246 suitable for use in an embodiment of the present invention is a software application or module that can index a large number of textual items or documents, such as web pages, and quickly return those items that match a given query. A well known public search engine is the search engine produced by the internet software corporation Google, Inc. An exemplary text search engine 246 suitable for use in the present invention is Tsearch2—full text extension for PostgreSQL, which is currently available (including source code) at the web site www.sai.msu.su/~megera/postgres/gist/tsearch/V2. This text search engine 246 can be used to search through the textual descriptions of entities as described more fully hereinbelow with reference to FIG. 33. In an embodiment of the present invention, the text search engine 246 also removes "stop words" from indexed documents and normalizes words to their root stems ("stemming"). Stop words are common words (such as "a", "an", "the", etc. . . . ) that are ignored by the text search engine 246 in order to save space and also accelerate the search process. Stemming is a form of automatic right truncation of each word in the index to its root. This helps to accommodate the variety of the English language. For example, if the word "searching" is used as a search query, stemming causes variants like "searcher", "searches", "searched", "searching", etc. in the documents being searched to match the query. This can help find results where the search query contains one or more words with different verb tenses and/or different plural/singular noun types than the corresponding word(s) in the documents being searched that would otherwise not produce a match using strict textual comparisons. The text search engine 246 handles this matching by stemming words before they are stored, and performing the same stemming on search queries before executing them. This causes all words with the same root stem to match. Stop words and stemming algorithms are well known to one of ordinary skill in the art.

A database 262 suitable for use in an embodiment of the present invention is one that can handle relational database queries such as those in the SQL query language and can also provide support for spatial data. A database that supports spatial data is one that can index data based on a geographic location using such methods as R-Trees or other well-known techniques. Such databases are well known in the art, one such database is produced by Oracle, Inc. Another suitable database 262 currently preferred by the inventors is PostgreSQL, currently available (including source code) at the web site www.postgresql.org. The PostgreSQL database may have further support for spatial data added by installing the PostGIS module. PostGIS adds support for geographic objects to PostgreSQL: it is developed by Refractions Research Inc. of Victoria, British Columbia, Canada, and is currently available (including source code) at the web site postgis.refractions.net. In an embodiment of the present invention, the database software is run on the same server 130 as the server application suite 232 and stores its data files in the secondary storage 107 of the same server 130. One of ordinary skill in the art will recognize that databases are customarily run on separate servers but may be run on the same server as other application or system code for speed, simplicity, or other reasons. Thus, while this described embodiment specifies that the database is run on the same server as the application code, this should not be seen as limiting the invention in scope.

In an embodiment of the present invention, the UI 254 of the application engine 242 encodes computer instructions in the web pages 240 returned by the web server 248 to the client 202 so that the client web browser 204 will perform various actions based on user interactions with the client 202, such as clicks of a computer mouse 123. These instructions are a combination of well known techniques for web site applications such as HTML and Javascript interface code that allow features like clickable buttons and links, input forms, drop-down menus and lists, graphics, pop-up windows, . . . , etc. ("UI elements"). Even though these instructions are encoded on the server 130 by the UI 254 as the application engine 242 runs, the actual execution of the instructions and subsequent interactions happen on the client 202 as discussed in the beginning of this paragraph. For clarity, these client 202 interactions are still best thought of as being performed by the UI 254. Any descriptions of actions performed by the UI 254 on the client 202 or within the client web browser 204 or reference to UI 254 elements should therefore not imply that the UI 254 is not a component of application engine 242, but are simply a convenient method of describing the UI 254.

The account manager 250 of the application engine 242 is used to allow an entity (defined above) to enter or modify the entity information associated with the entity and stored in the database 262, and to allow users of clients 202 to enter and modify personal information and preferences. In an embodiment of the invention, the account manager 250 is responsible for ensuring that entities and users are appropriately logged in to the system by comparing usernames and passwords to values stored in the database 262. The account manager 250 also reads current account information from the database and displays it to the requesting entity or user, as the case may be, and can accept updates of the information. The account manager 250 verifies the updates and writes back the modified data to the database 262, associating it with the correct user or entity account. Further information on the methods of the account manager 250 are described hereinbelow with reference to FIG. 47, while details of the interface used can be found hereinbelow with reference to FIGS. 28-36.

The controller 243 of the application engine 242 is responsible for integrating with other components of system 200, such as the web server 248, and managing the subcomponents of the application engine 242 needed to handle client requests.

In order to facilitate explanation, the web server 248, query engine 252, account manager 250, map server 244, controller 243, UI 254, Geocoder 256, text search engine 246, and database 262 are generally discussed as if they were each a single device. However, each of the web server 248, query engine 252, account manager 250, map server 244, controller 243, UI 254, Geocoder 256, text search engine 246, and database 262 may actually comprise multiple physical and/or logical devices connected in a distributed architecture, and the various functions performed may actually be distributed among multiple devices. Additionally, in alternative embodiments, the functions performed by the various devices may be consolidated and/or distributed differently than as described. For example, any function can be implemented on any number of machines or on a single machine, and any process may be divided across multiple machines. Furthermore, combinations of multiple functions may be consolidated onto a single machine.

Finally, although specific components of system 200 have been described, one of ordinary skill in the art will appreciate that data processing systems suitable for use with the exemplary embodiment may contain additional or different components, such as multiple processors, routers or subnetworks and a variety of input/output devices.

A number of screen shots of exemplary web pages 240 for use by a user in an embodiment of system 200 will now be described. Hereinafter, references to the actions of a user of system 200 or the client 202 should be understood to mean actions that are taken using the web browser 204 on client 202. These web pages 240 are generated by the application engine 242 in response to requests from web browser 204 of client 202. These web pages 240 demonstrate how portions of such a system 200 may be constructed as well as illustrate how some of the methods for presenting entity information described may be realized in practice. These descriptions of specific embodiments are intended to be illustrative, but not limiting, of the scope of the present invention as set forth in the claims. One of ordinary skill in the art would recognize many other modifications and alternative embodiments. In particular, although a web browser 204 based interface is described, many other types of computer programs, routines, and interfaces may be used to implement system 200 or any of the described methods. These descriptions of screen shots of exemplary web pages 240 are also intended to make clear the behavior of various modules of the application engine 242 of system 200, such as the map server 244, query engine 252, UI 254, and account manager 250, and will make certain decisions regarding their use or implementation readily apparent to one of ordinary skill in the art.

Figure 3:
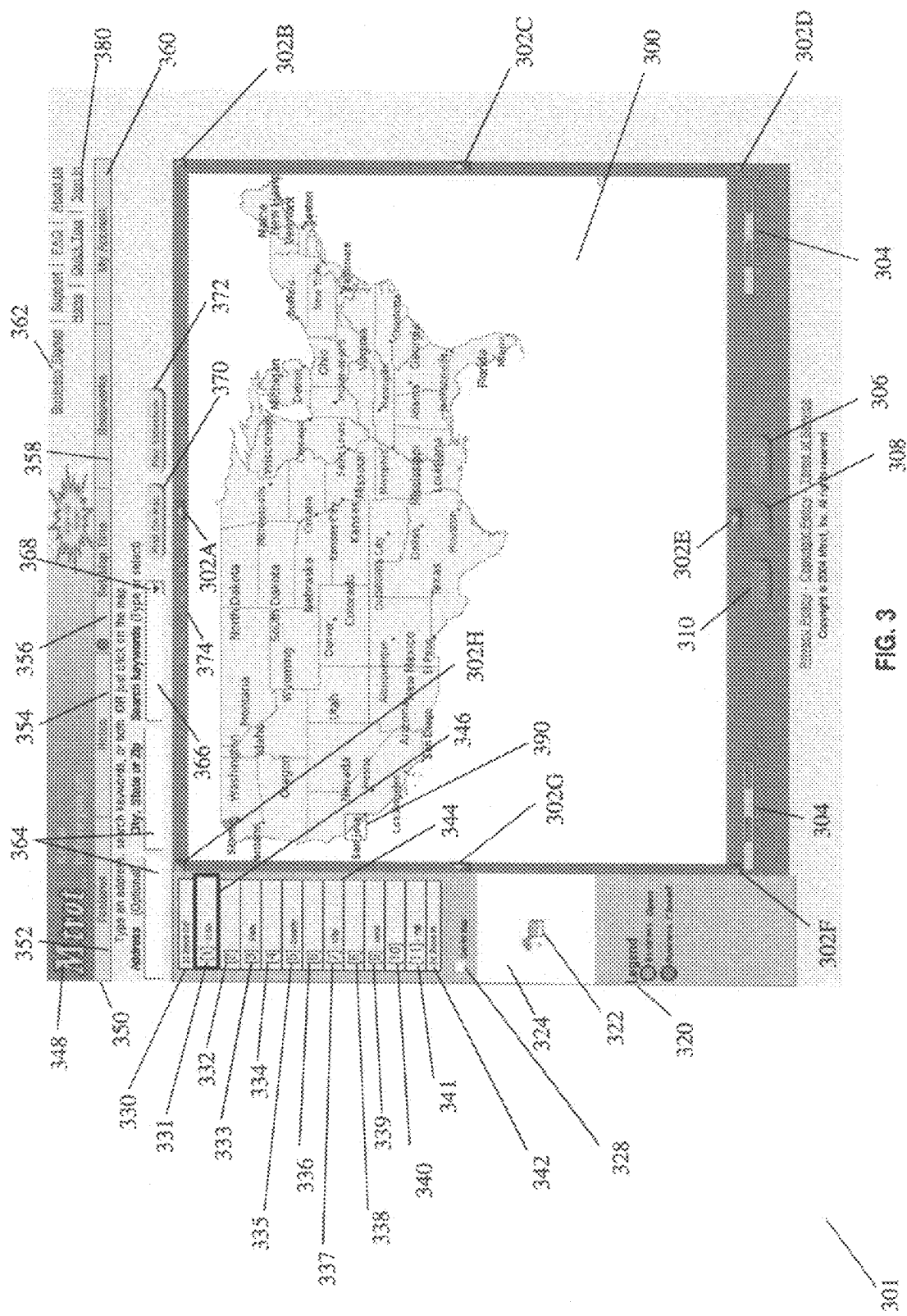
FIG. 3 is a screen shot of an exemplary web page containing an exemplary landing (starting) page for the system, showing the viewable map and navigation elements.

FIG. 3 is a screen shot 301 of an exemplary web page 240 showing an exemplary page that an end user might see on the web browser 204 of client 202 upon beginning use of system 200. The web page 240 shows a viewable map 300 generated by map server 244. On web page 240 is an address entry form 364. Into the address entry form may be entered any individual entry or combination of entries that suffice to identify a location in the geographic data 280 of the system 200. Such entries include the following: a state name, state abbreviation, city name, zip code, street name, street address, or recognized abbreviations or approximate sound-alike matches (such as can be found with the use of the well-known soundex or metaphone algorithms) of these entries. This identification of a location using an address and geographic data 280 is known in the art as geocoding, and is performed by the geocoder 256 in the described embodiment.

Figure 11:
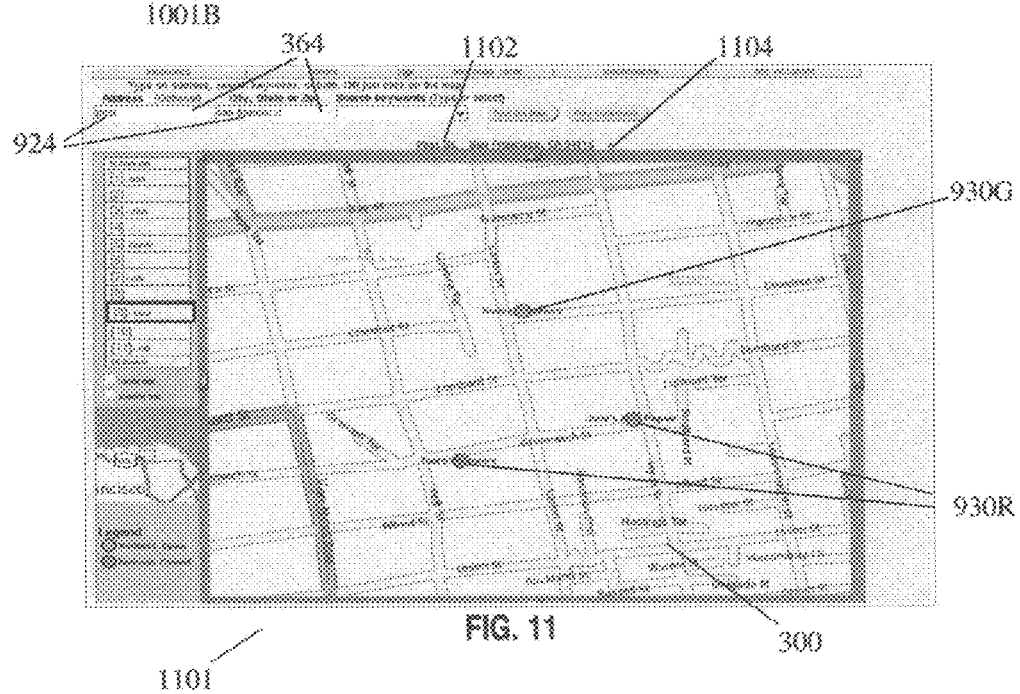
FIG. 11 is a screen shot of an exemplary web page containing a map view showing the use of the address display.

Upon entering an address in the address entry form 364, the user presses the find on map button 370 using web browser 204 or simply presses the enter button on the keyboard (not shown) to view the desired area. This user action causes the application engine 242 to handle the request. Briefly, if an address has been entered, the geocoder 256 takes the address and determines the latitude and longitude corresponding to the address, and map server 244 then generates a viewable map 300 with UI 254 adding an appropriate interface. The resulting page retrieved after a user typed in a street address of "post" in "san francisco" and pressed the find on map button 370 is shown in FIG. 11.

Various interactions with the client 202 web browser 204 and their results will now be further described.

By clicking on an area within the viewable map 300, a magnification effect will be activated which zooms the viewable map 300 in one level further in the zoom controller 344 as indicated by the current zoom level indicator 346. This newly magnified viewable map 300 will be centered approximately about the location clicked on. There is a button 330 to zoom the map out as well as a button 342 to zoom the map in. There is a set of zooming buttons 331, 332, 333, 334, 335, 336, 337, 338, 339, 340, and 341 that immediately display zoom levels 1, 2, 3, 4, 5, 6, 7, 8, 9, 10, and 11, respectively, on the viewable map 300, with level 1 being the most zoomed out level and level 11 being the most zoomed in level, level 2 being more zoomed out than level 1, and level 3 being more zoomed out than level 2 and so on.

There is also a set of panning buttons 302A, 302B, 302C, 302D, 302E, 302F, 302G, and 302H which are used to change the center of the viewable map 300 without changing the magnification. Clicking on each of the panning buttons pans the map in the direction pointed by the button. For example, clicking on 302A pans the map to the North, clicking on 302B pans the map to the Northeast, clicking on 302C pans the map to the East and so on. Alternatively, the user may select the center map checkbox 328 and then click on a location in the viewable map 300 to center the map about that point without triggering the standard zooming action. The center map checkbox 328 may be deselected or selected to choose the desired click/zoom behavior of the system 200.

Another method for panning the viewable map 300 is to use the reference map 324. The reference map 324 provides an overview of the area displayed on the standard full-size viewable map 300 by showing a map approximately two zoom levels higher than the standard map. This reference map 324 may be seen more easily in FIG. 4 due to the greater zoom level in that figure. The reference map cursor 322 illustrates the viewable area of the standard viewable map 300 by placing a border around the area covered by the standard map on the reference map 324. Clicking on the reference map will change the center of the viewable map 300 to that of the location clicked on in the reference map 324, effecting a pan.

A set of buttons 306, 308, and 310 are provided to quickly navigate to areas of the United States that are geographically distant from each other. These buttons 306, 308, and 310 provide map navigation to Hawaii, the continental U.S., and Alaska, respectively. Clicking on one of these buttons 306, 308, 310 will pan and zoom the viewable map 300 to the corresponding area. Another navigation element of this type is the last map button 348. This button 348 will display the last viewable map 300 shown on the web page 240. This can be especially useful when viewing a web page 240 that does not include the viewable map 300, or when leaving and returning to the site (since the URL referred to by this button 348 may be bookmarked by a web browser 204). Clicks on the viewable map 300, panning buttons 302A-H, zooming buttons 330-342, reference map 324, center map checkbox 328, navigation buttons 306, 308, 310, last map button 348, and address display 1102 may hereinafter be referred to as "interface clicks."

The map scale bar 304 provides a standard cartographic feature for the viewable map 300 for determining distances on the map. The map legend 320 explains certain features present on the viewable map 300 as will be described with reference to FIG. 4.

The web page 240 includes a display of the time represented on the map in the map time display 374. This provides access to the features described more fully hereinbelow.

The web page 240 includes a menu bar 350 which contains the following buttons: Features 352, Notes 354, Set Map Time 356, Bookmarks 358, and My Account 360 which activate the Features, Notes, Time, Favorites, and Account menu items, respectively. These features are further described hereinbelow beginning with reference to FIGS. 15, 22, 13, 20A, and 28, respectively.

The web page 240 also contains Business Signup button 362 and a signin/signout button 380 which provides access to other aspects of this invention, such as the entity account signup and handling described hereinbelow with reference to FIGS. 28-36.

The web page 240 also contains a search criteria form 366, as well as a quick search button 368 which can help to enter common searches without typing, described hereinbelow with reference to FIG. 7. There is also a slide show button 372, the use of which is described hereinbelow with reference to FIG. 9.

A user desiring to find a view of, for example, San Mateo, Calif. would click on viewable map 300 of FIG. 3 on or about the region 390. The user can then continue clicking on the region surrounding the target city of San Mateo on resulting map views. Any of the zooming buttons 331-341 can also be used to assist in the zooming process. The panning buttons 302A-H, reference map 324, or the checkbox to center map 328 may also be used to assist in the selection of the area to view.

Figure 4:
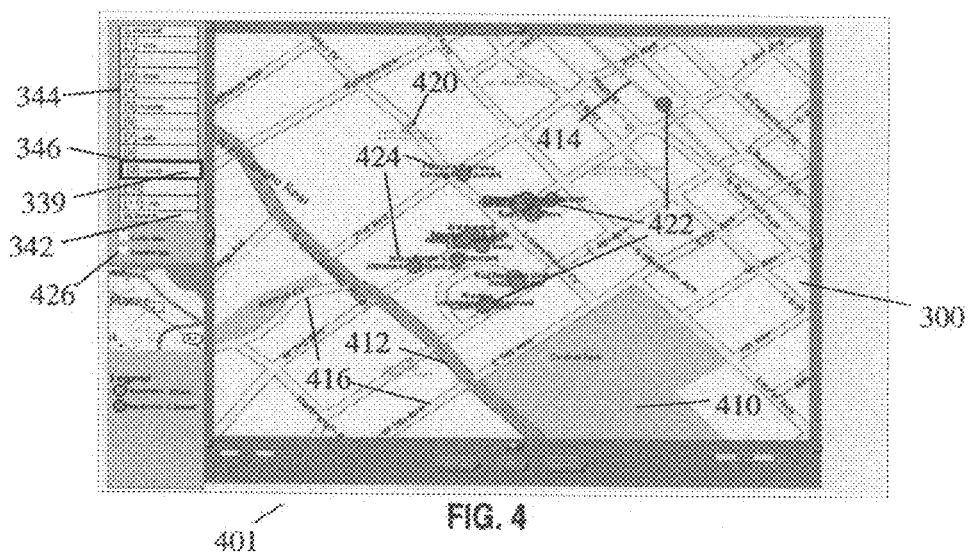
FIG. 4 is a screen shot of an exemplary web page containing a map view of many entities at zoom level 9.

FIG. 4 is a screen shot 401 of an exemplary web page 240 generated by the application engine 242 in response to the navigation steps described immediately above. The web page 240 contains a viewable map 300 showing many entities at zoom level 9. The zoom level may be seen in the appearance of the current zoom level indicator 346 around the zooming button 339 that displays zoom level 9 in the zoom controller 344.

The viewable map 300 drawn by the map server 244 contains several cartographic elements. Landmark element 410, shown in the described embodiment as colored areas (for example, the color green for parks), shows the area landmarks. Large road element 412, shown in the described embodiment in greater width than regular roads and in the color orange, shows the large roads. Railroad element 414, shown in the described embodiment in a track-like legend, shows the railroad tracks. Standard road element 416, shown in the described embodiment in narrower width and in a different color from large road element 412, shows the standard road. Points of interest element 420, shown in the described embodiment as a dot, shows the points of interest. The described legends are described for illustration purposes, and one of ordinary skill in the art will be able to substitute alternative legends for the above described cartographic elements. The cartographic elements help locate information presented on the map more easily.

The primary features on the viewable map 300 are the entity representations 422 and entity names 424. The entity representations are described in the present embodiment as a dot, but one of ordinary skill in the art will appreciate that the entity representation can also be of, without limitation, any other color, shape, form, or image, such as, without limitation, a square, triangle, house, boat, corporate logo, or a sound, or animation, or video clip, or images distinguished by color, shading, intensity, or pattern, or presence or absence of any symbol at all. The entity representations 422 and entity names 424 enable a user to easily browse on web browser 204 of client 202 a region like a neighborhood for all of the relevant businesses in the area that are contained in system 200. In the preferred embodiment, all of the entity representations 422 and entity names 424 are displayed on a web page 240 without the user having to enter a text search query or choose a category. This preferred method of presentation is described more fully hereinbelow with reference to FIG. 49. Although the described embodiment places each entity name 424 on or about the vicinity of the associated entity representation 422, an alternative embodiment of the present invention places a letter or number on the entity representations 422 that requires a lookup in a coded legend which associates each letter or number with an entity.

The web page 240 also includes a checkbox 426 that when checked, can be used to examine the viewable map 300. When checkbox 426 is selected, clicks on the viewable map 300 will highlight the road or road segment nearest to the click and display address information about that road or segment as described more fully hereinbelow with reference to FIG. 6. The selection of checkbox 426 triggers this highlighting behavior instead of the normal zoom-on-click function described above.

Figure 5:
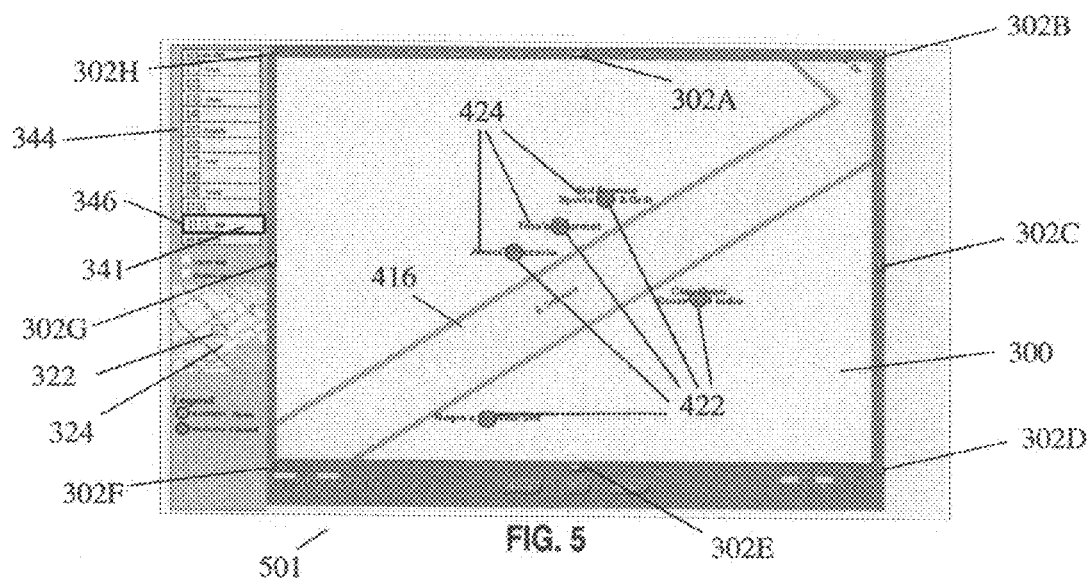
FIG. 5 is a screen shot of an exemplary web page containing a map view of many entities at zoom level 11.

When the map is centered in San Mateo as shown in this FIG. 4, clicking twice on the zoom in button 342 will cause the application engine 242 to generate a more detailed city view of San Mateo, as shown in FIG. 5.

FIG. 5 is a screen shot 501 of an exemplary web page 240 generated by the application engine 242 that contains a viewable map 300 showing many entities at zoom level 11. This web page 240 is the result of the exemplary map clicks described immediately hereinabove with reference to FIG. 4. In this FIG. 5, the zoom level indicator 346 in the zoom controller 344 is located around zooming button 341, which corresponds to zoom level 11, indicating to a user that the current zoom level is 11. In the described embodiment, this zoom level 11 is the full zoom level. In alternative embodiments, additional zoom levels and degree of zoom can be added as necessary. One of ordinary skill in the art will understand that a variety of graphical or textual indicators may be used to represent the current zoom level in other embodiments.

The primary features on the viewable map 300 at this level are still the entity representations 422 and entity names 424. This more detailed version of the map makes it easier to browse a region, such as a neighborhood, for all of the relevant entities in the area in system 200 and more easily ascertain all relevant features like the entity names 424 without overlap. The detailed map features, such as standard road element 416, provide useful context. In the described embodiment of the present invention, the default view of viewable map 300, including at zoom level 11, is to show all the entities representations 422 and entity names 424 available in system 200 so that a user of system 200 can view all the entities in a chosen area available in system 200. The user can then perform a search for a specific entity or a set or category of entities and only the entities matching the search will be displayed on viewable map 300, as further described hereinbelow in relation to FIG. 8. This method of presenting all results with optional filtering is also described more fully hereinbelow with relation to FIG. 49.

As previously noted, the area displayed in this FIG. 5 is a region of San Mateo, Calif. resulting from the exemplary map clicks described hereinabove with reference to FIG. 4. Alternatively, a view such as shown in this FIG. 5 may also be achieved by using any of the zooming buttons 331-341 to assist in the zooming process. Any of the panning buttons 302A-302H may also be used to assist in the selection of the area to view. Another method of navigation is the use of reference map 324 clicks to change the center of the viewable map 300 to that of the location clicked on in the reference map 324 and effect a pan. All of these methods cause the UI 254 to request a new web page 240 from the server 130 and application engine 242 that it is running.

The area within reference map cursor 322 corresponds to viewable map 300. In the described embodiment, the reference map 324 is approximately two zoom levels above that of viewable map 300. In FIG. 5, viewable map 300 is at zoom level 11, which places its reference map 324 at approximately zoom level 9. This is a similar view to the viewable map 300 (also at zoom level 9) shown in FIG. 4.

Figure 6:
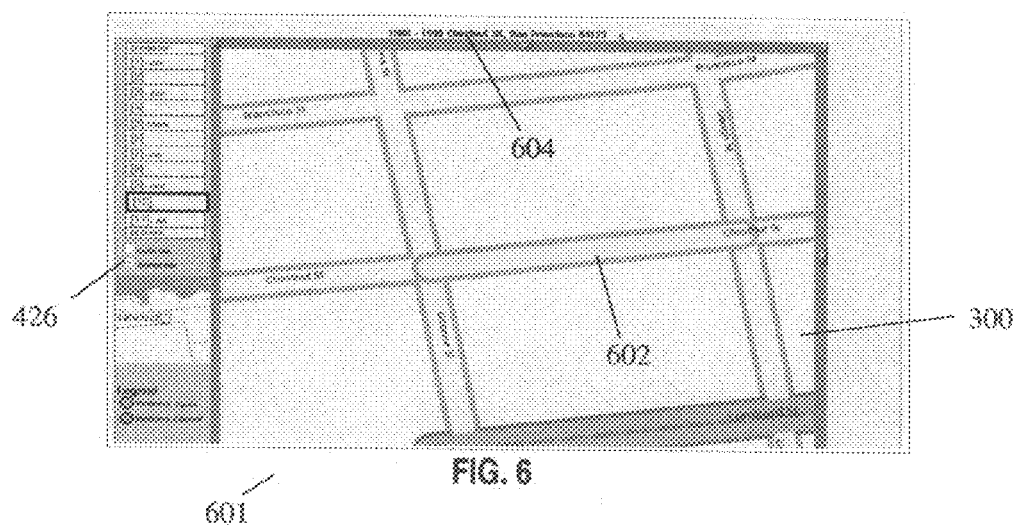
FIG. 6 is a screen shot of an exemplary web page showing the result of an examine map operation.

FIG. 6 is a screen shot 601 of an exemplary web page 240 generated by the application engine 242 that contains a viewable map 300 showing the result of an examine map operation. This web page 240 is the result of a click on viewable map 300 after checkbox 426 was selected, as described hereinabove with reference to FIG. 4. This causes the UI 254 to instruct the map server 244 to render viewable map 300 with the road or road segment nearest to the click drawn in highlight 602 and to display address information 604 about that road or segment. This allows users to find out more detailed information about the area in question. This address information 604 includes the street number range, street name, city, and zip code for the highlighted road segment 602 in the described embodiment. In the described embodiment of FIG. 6, the highlighted road segment 602 corresponds to the address range of 1500-1599 Chestnut St. in San Francisco, Calif. 94123. It will be clear to one of ordinary skill in the art that other embodiments could use information other than street addresses or ranges (e.g., road type) or display information about other items on the viewable map 300, such as water areas or landmarks (e.g., name of water body or landmark).

Figure 7:
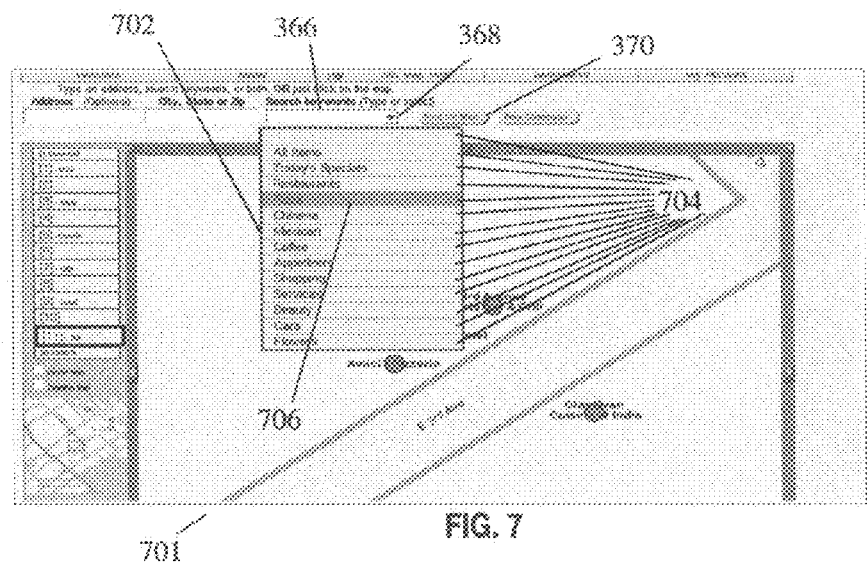
FIG. 7 is a screen shot of an exemplary web page showing the options for the selection of additional search criteria.

FIG. 7 is a screen shot 701 of an exemplary web page 240 demonstrating the options for selection of additional search criteria for the map in FIG. 5. After browsing all of the entities in a location, a user may wish to narrow down their field of interest. The user may do this by entering a search keyword or keywords which will filter the displayed entities.

To enter the search term, a user may type a word or words to become the filter into the search criteria form 366. Alternatively, the user may click the quick search button 368, exposing the quick search list 702. Placing the cursor over a particular quick search item 704 will highlight the particular quick search item 704 and turn it into a highlighted item 706. Clicking the mouse button while the cursor is over highlighted item 706 will select the highlighted item 706.

After choosing the highlighted item 706 or typing an entry into the search criteria form 366 and pressing the find on map button 370 or the enter key (not shown) on the keyboard 122, the search will be submitted to the server 130. The web server 248 of the server application suite 232 will pass the search on to the application engine 242 which will utilize the query engine 252, text search engine 246, and map server 244 to perform the method described more fully hereinbelow beginning with reference to FIG. 41. This method will enable the application engine 242 to return a result page to the client 202 that displays only entities which match the search query on the viewable map 300, such as is shown in FIG. 8.

Figure 8:
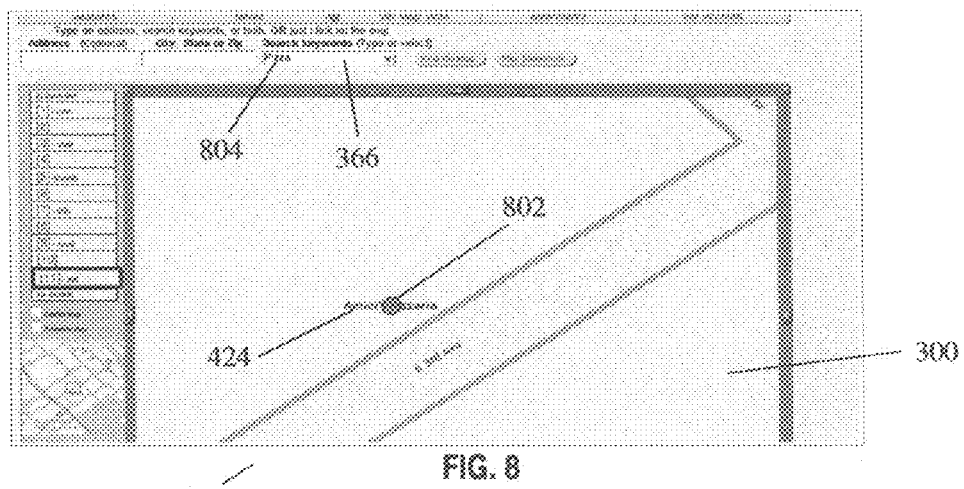
FIG. 8 is a screen shot of an exemplary web page containing the results of a specified search for a given area.

FIG. 8 is a screen shot 801 of an exemplary web page 240 containing the results of a specified search using "pizza" as the search query 804 for the viewable map 300 area shown in FIG. 7. The server 130 has returned this result page 240 to the user's web browser 204 on client 202 with only matching entities 802 of the search query (pizza), visible on the viewable map 300. In this example, the only matching entity 802 is Amici's Pizza. The specified search query 804 remains visible in the search criteria form 366 for reference. Also, in this example, the search match is apparent in the entity name 424, although any portion of the entity's information, as further described hereinbelow with reference to FIG. 43, may provide the match, not just the entity name 424. The application engine 242 uses the text search engine 246 and query engine 252 to perform the search. Alternative embodiments, as described in FIG. 43, may use only the text search engine 246 to perform the search.

If no entities within the area shown on the viewable map 300 match the search, the system 200 may use the method described hereinbelow with reference to FIG. 50 to find matching search results by increasing the area searched until results are found.

Figure 9:
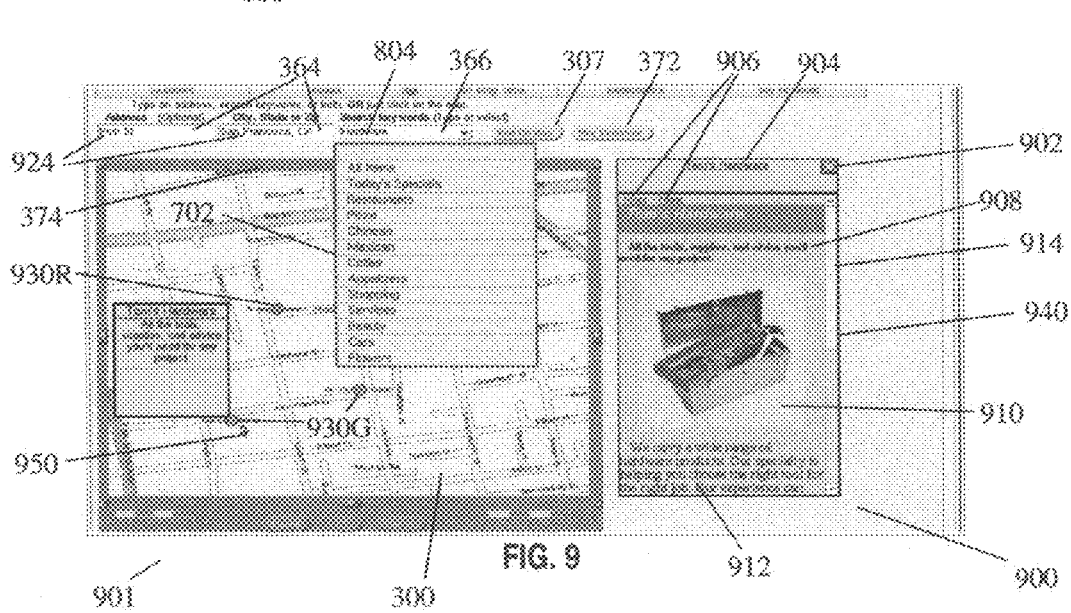
FIG. 9 is a screen shot of an exemplary web page showing the use of address and search queries in order to display information, including the information display, entity popup, and entity dot of an exemplary entity.

FIG. 9 is a screen shot 901 of an exemplary web page 240 showing system 200 for presenting entity information. To display a view like this, a user enters an address query 924 into the address entry form 364 and a search query 804 into the search criteria form 366 and submits the request by pressing the enter key (not shown) on the keyboard 122 or the find on map button 307. The search keywords may be entered using the quick search list 702 as described hereinabove with reference to FIG. 7. While this FIG. 9 displays the quick search list 702, the use of this list is optional and is not required for this purpose. When submitted to the server 130, the application engine 242 uses the method described further hereinbelow beginning with reference to FIG. 41 to generate this web page 240 which is returned to the client 202 for display by the web browser 204. The web page 240 returned to the client 202 contains a viewable map 300 displaying various entities represented by entity dots 930R, 930G.

The UI 254 responds to the user moving a mouse cursor indicator 950 over entity dots 930R, 930G by causing the client web browser 204 to display an entity popup 920 over the viewable map 300. This entity popup 920 contains summary information about the indicated entity, such as the name of the entity and a brief description or tagline. In an embodiment of the present invention, the entity popup 920 is displayed by using Javascript code to change the visibility and positioning properties of an HTML <div> element.

Clicking a mouse cursor indicator 950 over the entity dots 930R, 930G causes the UI 254 to direct the web browser 204 to display an entity information display 940 to the side of the viewable map 300 and the viewable map 300 to be reduced in size. This display 940 contains associated entity information 900 which could be any combination of: an entity URL 904 displaying the name of entity and containing a web page link that, when clicked on, will display the entity information 900 as a full web page, entity information links 906 that, when clicked on, will display other information about an entity such as its business hours or phone number, an entity tagline 908 which briefly introduces the entity, one or more entity pictures 910 to help describe the entity (one picture shown in FIG. 9), an entity description 912, and an entity information scrollbar 914 to provide access to any of these elements that do not fit within the standard window for the entity information display 940. Other information such as keywords, categories, and other entity information may also be included in entity information display 940. The entity information display 940 may be closed by pressing the information close button 902 which removes the display 940 and enlarges the viewable map 300 back to its original size. In the described embodiment, the associated entity information 900 in the entity information display 940 is displayed with HTML coded pages. Many alternatives will be apparent to one of ordinary skill in the art, some of the many include word processing documents, PDF files, Postscript files, or GIF, PNG, JPEG or other bitmapped or vector graphics files, including also animated files such as Macromedia's Flash.

Users do not have to manually click on each entity dot 930R, 930G to activate their entity information display 940. By pressing the slide show button 372, the UI 254 directs the web browser 204 to display a slide show of the entities displayed on the viewable map 300. This slide show shows the associated entity information 900 in the entity information display 940 for each entity represented by entity dot 930R or 930G displayed on the map sequentially. In the described embodiment, the displayed associated entity information 900 is changed approximately every 2.5 seconds in any fixed ordering of the displayed entities (represented by displayed entity dots 930R, 930G) using method 5300 described more fully hereinbelow with reference to FIG. 53.

The web page 240 also contains a map time display 374. This shows the time being represented on the viewable map 300 which is useful in classifying any time-dependent entity characteristic, such as hours of operation. Since it can be difficult to understand textual descriptions of hours of operation for a business, they are displayed graphically. In the described embodiment, the red entity dot 930R represents a business that is closed as of the time shown on map time display 374, while the green entity dot 930G represents a business that is open as of the time shown on map time display 374. Map legend 320 contains the explanations for the entity dots 930R, 930G. One of ordinary skill in the art would recognize that the entity dots 930R and 930G could also represent other entity characteristics, as defined hereinabove. The time that is displayed in the map time display 374 is typically the current time in system 200, however, it may be changed to other times as is demonstrated hereinbelow with reference to FIGS. 13-14. The map time display 374 may display this time in the local time zone of the center of the viewable map 300 or another time zone as is described further hereinbelow with reference to FIG. 59. The current time in system 200 is determined using the system clock 109 of server 130 as described further hereinbelow with reference to FIG. 59. The application engine 242 uses the query engine 252 and classification methods such as the method described more fully hereinbelow with reference to FIG. 44 in order to classify entities and determine whether to display an entity with a red entity dot 930R or green entity dot 930G.

In addition to red and green entity dots 930R, 930G representing hours of operation, other representations may be used for hours of operation or other entity characteristics. This includes, without limitation, different colors, shapes, form, or images, such as, without limitation, squares, triangles, houses, boats, corporate logos, or sounds, animations or video clips, or images distinguished by color, shading, intensity, or pattern, or presence or absence of any symbol at all. See for example, FIG. 12 for one such alternative.

In other embodiments of the present invention, additional features are added to the slide show described above, including noting the entity represented by entity representation 422 that is currently being displayed in the entity information display 940 by highlighting the corresponding entity representation 422 on the map, or connecting the entities on the map in the order of the sideshow by highlighting roads that could be used to drive from one to the next in an animated fashion as the slides are displayed.

Other embodiments of this invention could display these classified results without a map. For example, the described classified search results could be displayed as an icon next to each listing in a textual search engine or Internet Yellow Pages result page where there would a green dot 930G to represent that the entity in the listing is open and a red dot 930R to represent that the entity in the listing is closed.

Figure 10A:
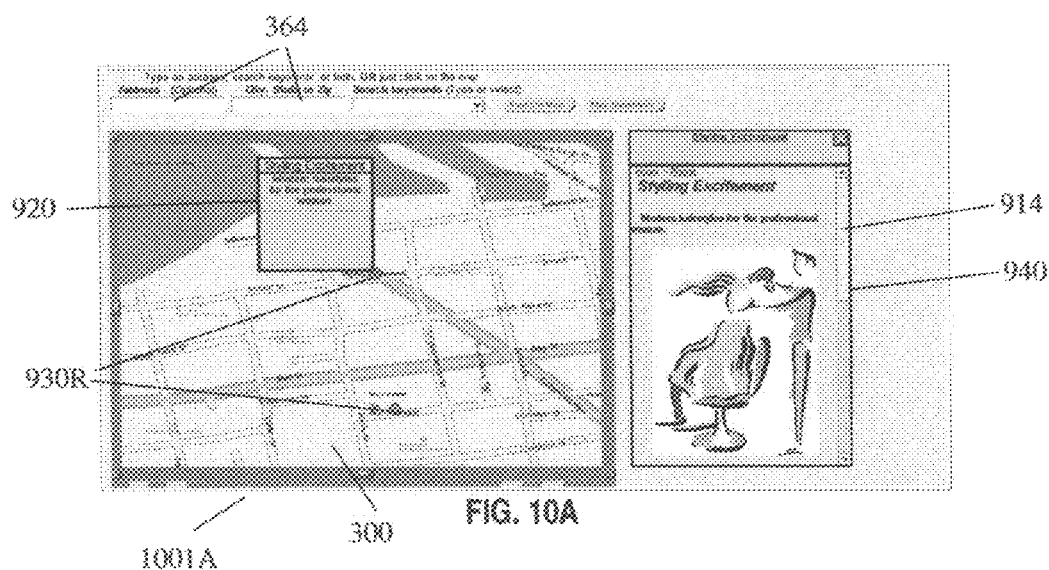
FIGS. 10A and 10B are screen shots of exemplary web pages showing, respectively, the use of navigation elements to display various information about an exemplary entity, and the manipulation of the entity information scroll bar to display additional information in the information display.

FIG. 10A is a screen shot 1001A of an exemplary web page 240 showing a similar view to FIG. 9 that is found using a different method than the one described in FIG. 9 which uses the address entry form 364. It shows instead the use of such interface clicks as described herein with reference to FIGS. 3-5. The results are similar: a viewable map 300 with red entity dots 930R and green entity dots 930G (green not shown). This viewable map 300 also provides access to entity information popups 920 and the entity information display 940 for the displayed entities. All other features are also the same.

Figure 10B:
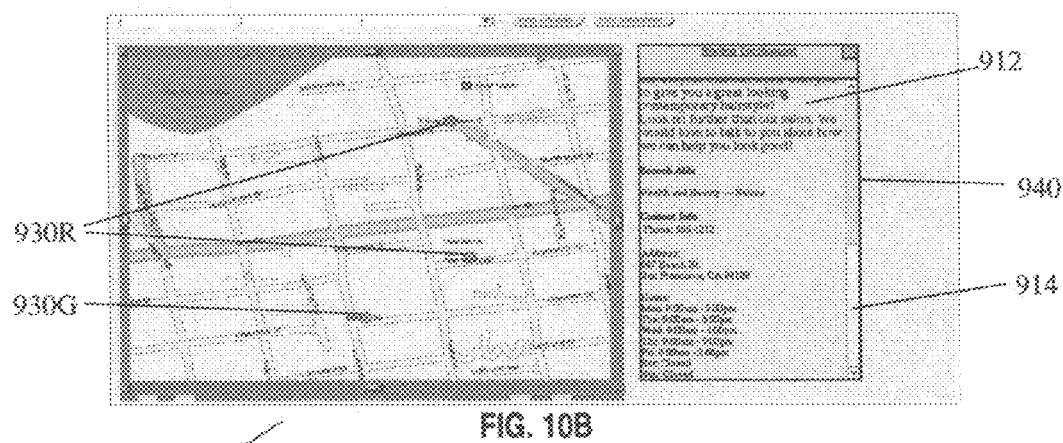

FIG. 10B is a screen shot 1001B of an exemplary web page 240 resulting from manipulating the entity information scrollbar 914 visible in FIG. 10A. This allows further contents of the entity description 912 to be seen that are not visible in the entity information display 940 of FIG. 10A due to space limitations. A green entity dot 930G and red entity dot 930R are also visible in this screen shot.

FIG. 11 is a screen shot 1101 of an exemplary web page 240 containing a viewable map 300 displaying both open businesses represented by green entity dots 930G and closed businesses represented by red entity dots 930R.

This figure also shows an address display 1102 which displays the address of the last successful address search as entered in the address entry form 364. This is achieved by the use of cookies, as is well known in the art. This address display 1102 may be removed by clicking on the address display close button 1104. After navigating to a different geographic area by the use of interface clicks or address query 924, clicking on the address display 1102 will re-display a view of viewable map 300 as if the address in the address display 1102 had been entered as an address query 924. The address query 924 used in the address entry form 364 can be seen to match the address display 1102 in this example.

Figure 12:
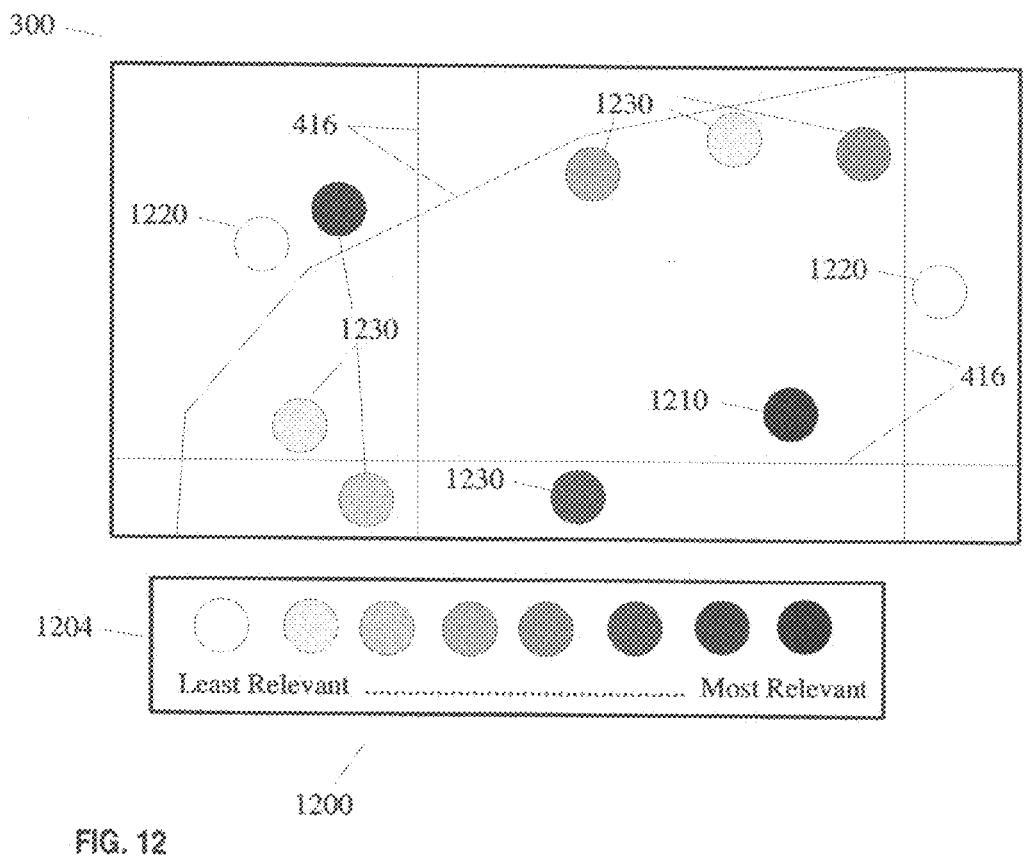
FIG. 12 is an exemplary diagram showing the presentation of graded search query results on a map.

FIG. 12 is an exemplary diagram 1200 of an embodiment of the present invention which shows the result of system 200 being used to present graded search query results on a viewable map 300 containing standard road map elements 416. This diagram 1200 is illustrative of an alternative to the red and green entity dots 930R, 930G (not shown) used to represent entity characteristics. This diagram 1200 shows the result of a search query 804 where a plurality of entities are shown which have differing levels of relevance for the search query 804. For example, the search query 804 may be "golf clubs." In this search query 804, a specialty golf store would have very relevant results, a sporting goods store slightly less relevant results, down through department stores with somewhat relevant results, finishing with unrelated business that are not relevant at all, such as restaurants. The relevancy map legend 1204 graphically depicts this by displaying the most relevant result with the darkest color, the next most relevant result with a lighter color, and so on, down to the least relevant result with the lightest color. The most relevant result 1210 is shown in the darkest color, the least relevant results 1220 in the lightest color, and the graded intermediate results 1230 in different colors between the lightest and the darkest color. Note that among the intermediate results, the results are in a gradient, with more relevant results shown in darker colors and less relevant results shown in lighter colors. This is useful for showing any series of results on the viewable map 300 where the results can be ranked in order. By making the most relevant result 1210 the darkest value and the least relevant result 1220 the lightest value, a user can tell at a glance the relevance of any result.

Other embodiments of this invention could be used to display any other entity characteristics that can be represented by a graded scale, such as quantities of a product available, prices, or any data that can be represented with a numeric value. Multiple graded scales could be displayed on one map by using multiple color grades, for example, using a grade from dark to light of one color for one type of result (e.g., blue to represent stores, such as stores that sell golf clubs in the previous example) and a grade from dark to light of another color for another type of result (e.g., yellow to represent events, such as golf tournaments in the previous example). Other embodiments of this invention could be used to display these graded results without a map. For example, the described graded search results could be displayed as an icon next to each listing in a textual search engine or Internet Yellow Pages result page where they would represent the relevancy of each listing.

The features and functionalities of the menu bar 350 will now be described. In addition to clicking on the viewable map 300, a user can use system 200 by utilizing the menu bar 350 within web browser 204 of client 202. This menu bar 350 provides access to additional features of system 200. Some of the features are available to all users of system 200, while others require a user to first register with the system 200 and then login to system 200 with the identifier and password chosen during registration before they can be used. User registration is handled by the account manager 250. Further information on the methods of the account manager 250 is described hereinbelow with reference to FIG. 47. After a user has registered and logged in, information saved by the user will then be associated with the account ID assigned to or chosen by the user and saved into the database 262 in the user account tables 278.

Figure 13:
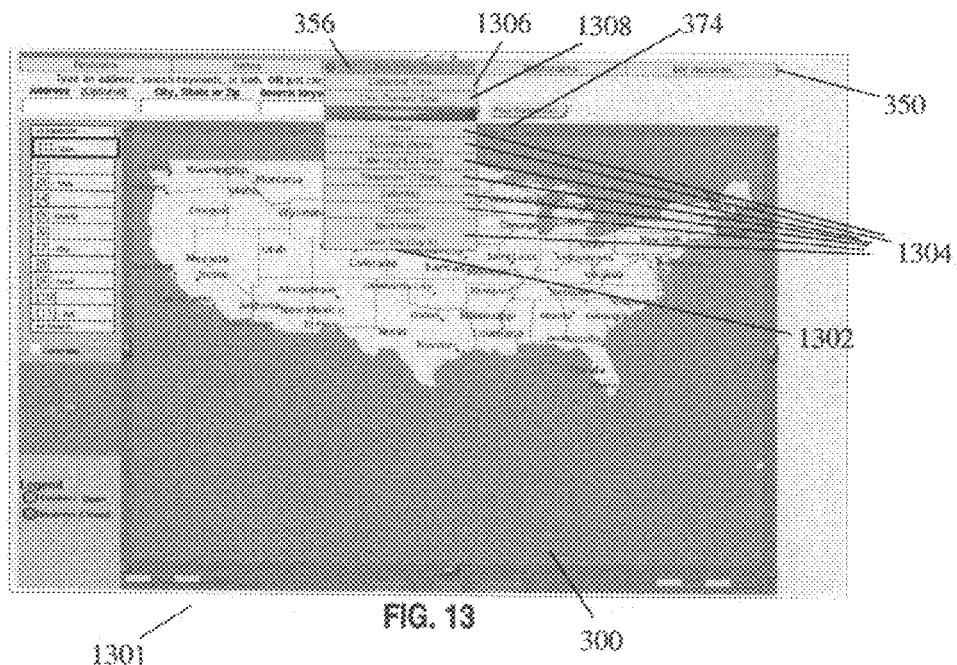
FIG. 13 is a screen shot of an exemplary web page showing the use of the set map time button to change the time on the map.

FIG. 13 is a screen shot 1301 of an exemplary web page 240 demonstrating the use of the set map time button 356 contained in the menu bar 350 in an embodiment of the present invention. Clicking on the set map time button 356 displays the time menu 1302, which contains several preset time options 1304. The options in the time menu 1302 are particularly useful for event occurrences (e.g., finding whether a movie or concert will be playing next Saturday at 1 pm). In the described embodiment, the preset time options 1304 include "Now," Tonight (8 pm)," "Late night (11 pm)," "Tomorrow (10 am)," "Saturday," "Sunday," "Next Holiday." In the described embodiment, choosing "Saturday," "Sunday," or "Next Holiday" sets the map time display 374 to the chosen day, at the current time, adjusted for Daylight Savings Time, if applicable. Other preset times can be added to system 200 (not shown). Clicking one of these preset time options 1304 enables the UI 254 to change the time on the map to the time specified in the preset option 1304 which is reflected in the map time display 374. This causes the application engine 242 to generate a new page using the chosen preset time as it performs the classification method described more fully hereinbelow with reference to FIGS. 44 and 59. This map time change is useful for displaying business hours for entities at a time other than the current time, as described hereinabove with reference to FIG. 9. The different time option 1306 when clicked on, takes the user to a screen that is further described in FIG. 14 below. In other embodiments, the system 200 may be furnished with other graphical methods for setting the time, such as a graphical clock or calendar display, a slider or scrollbar that may be dragged to change a time from one value to another or a value in between them, or other methods.

When a different time has been set other than the current time, the user can click on "use current time" option 1308 to reset the map time to the current time. In an embodiment of the invention, the system 200 uses the current system time of the server 130 as the default time of interest for viewable map 300 as shown in the map time display 374, displayed in the time zone of the center of the viewable map 300. Other embodiments may use the system time of the client 202 or any other available time source for the time of interest.

One of ordinary skill in the art will recognize that the time feature described herein is not limited to hours of operation for an entity but can be applied to any other systems and methods that require information to be classified, using time as a factor, including, without limitation, any entity characteristic. For example, the time feature described herein can be used to display movie theaters that are currently playing the movie "The Matrix," will be playing the movie tonight (8 pm), will be playing it any time within the next half hour, or will be playing it at any other user-determined time. Also, the feature could be used to display the availability of apartments as of a specified date, the availability of hotel rooms on a given date, or many other entity characteristics, some of which are described hereinbelow with relation to FIGS. 31 and 44.

Figure 14:
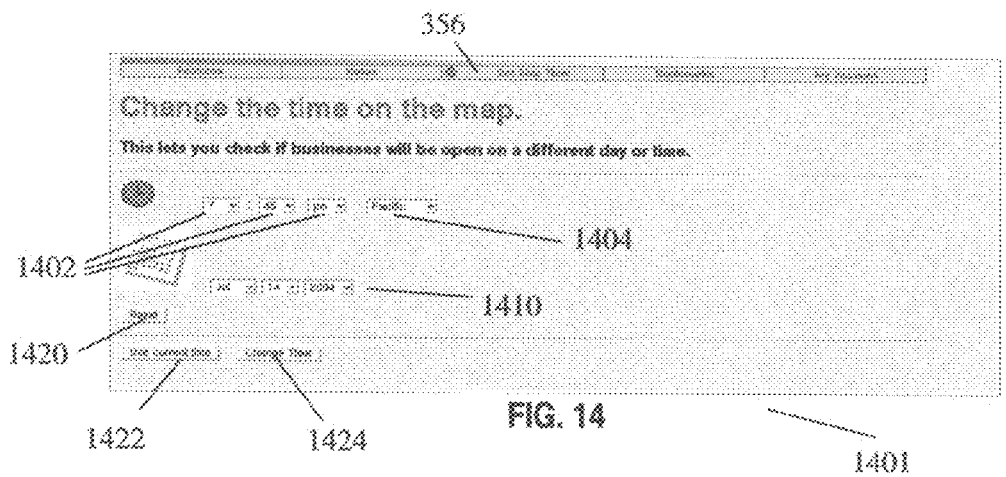
FIG. 14 is a screen shot of an exemplary web page showing the entry of a different time/date for the map.

FIG. 14 is a screen shot 1401 of an exemplary web page 240 demonstrating the entry of a different time and/or date for the viewable map 300. This is necessary when the preset time options 1304 as described in FIG. 13 are not sufficient to represent the time or date of interest. In the described embodiment, this page may be loaded by clicking the set map time button 356 and then selecting the different time option 1306 or by clicking on the map time display 374.

This page contains a time entry form 1402 into which the time of interest may be entered, a time zone entry form 1404 for the time zone of the time of interest, and a date entry form 1410 for the calendar date of the time of interest. Clicking the form reset button 1420 causes the contents of the entry forms 1402, 1404, and 1410 to be reset to their original values, which is the time before the different time option 1306 of set map time button 356 or map time display 374 was clicked on. Clicking the use current time button 1422 causes the contents of the entry forms 1402, 1404, and 1410 to be set to values representing the current time in server 130, displayed in the time zone of the last displayed map time display 374.

The time entry form 1402 may round the time of interest to the level of precision set in system 200 by the service provider for reasonable results. The inventors currently prefer an embodiment that uses a resolution of 15 minutes.

Clicking the change time button 1424 causes the time that will be shown in the map time display 374 of the web browser 204 of client 202 to be set to the values represented in the entry forms 1402, 1404, and 1410. The system 200 then displays the web page 240 that was in view before this web page 240 was loaded by clicking on map time display 374 or on the different time option 1306 of the set map time button 356. using the newly selected time as the time of interest for the viewable map 300.

Figure 15:
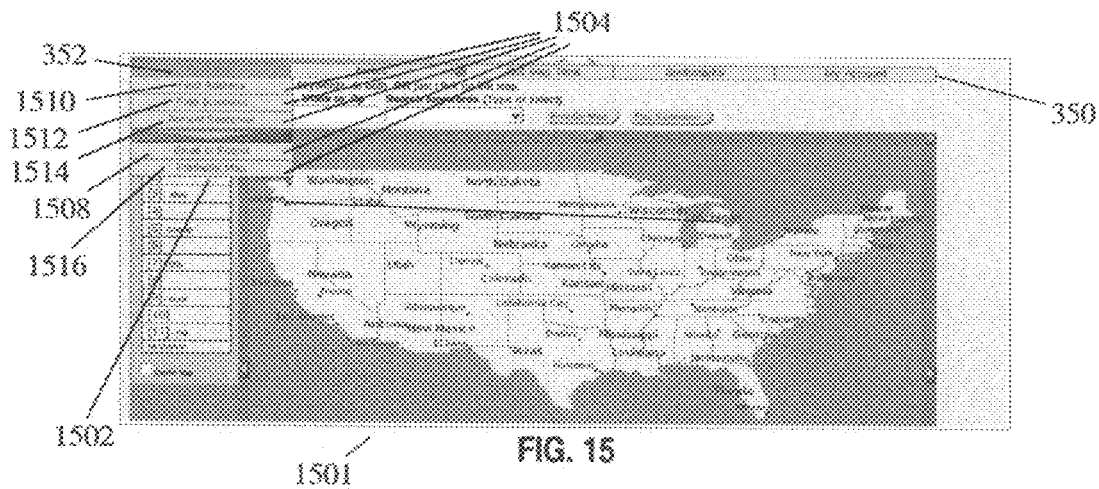
FIG. 15 is a screen shot of an exemplary web page showing the use of the features menu button.

FIG. 15 is a screen shot 1501 of an exemplary web page 240 demonstrating the use of the features button 352 contained in the menu bar 350. Clicking on the features button 352 displays the features menu 1502 which contains several feature menu items 1504. Clicking on email to friend option 1508 allow an user to email a map to a friend, as described in reference to FIG. 16 below. Clicking on the printable map option 1516 provides printable PDF maps. The find address option 1510, find business option 1512, and recent searches option 1514 of feature menu items 1504 are described in FIGS. 17-19.

Figure 16:
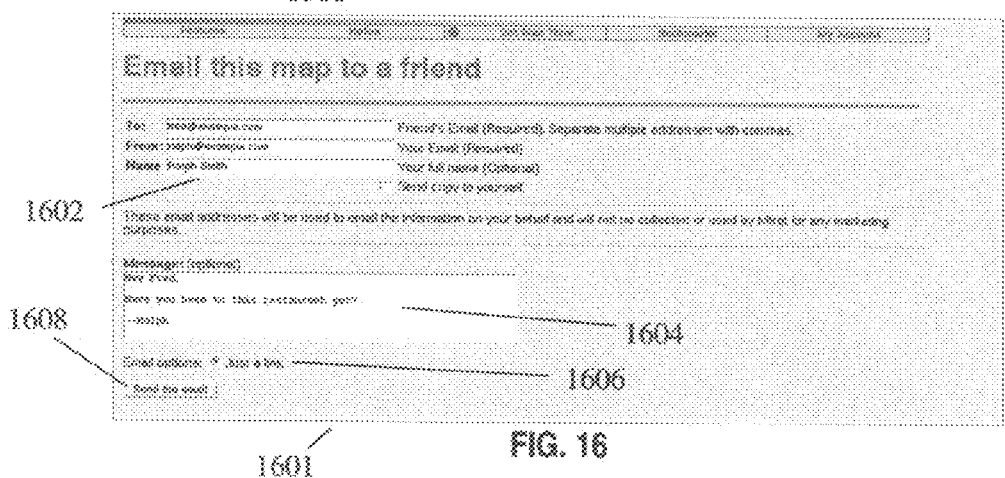
FIG. 16 is a screen shot of an exemplary web page showing entry forms and related options accessed through one of the menu items of the features button to email a given map, map view, or search to someone else.

FIG. 16 is a screen shot 1601 of an exemplary web page 240 showing the ability to email a given map, map view, or search to another entity, which is accessed by choosing the email to friend option 1508 of the feature menu items 1504. The target entity's email address and name are entered into the email contact entry form 1602, the message contents are entered into the email text entry form 1604, and relevant email options are selected with the email options 1606 (for example to determine if the included HTML page should be included directly in the email or simply as a web page link). Upon clicking the send email button 1608, the application engine 242 sends an email message containing the contents of the email text entry form 1604 along with a URL that will display the viewable map 300 and search query 804 that was last visible (before the "email to friend" option 1208 was chosen from features menu items 1504) to the target's email address.

Figure 17:
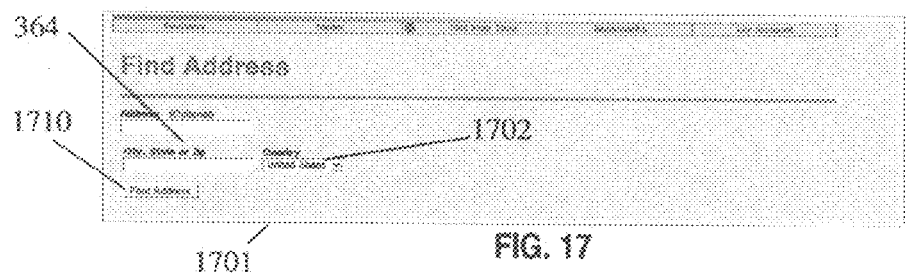
FIG. 17 is a screen shot of an exemplary web page showing entry forms and related options accessed through one of the menu items of the features button to enter an address query to display a specific area on the map.

FIG. 17 is a screen shot 1701 of an exemplary web page 240 that may be used to enter an address query to display a specific area on the viewable map 300. It may be accessed by selecting the find address option 1510 from the features menu items 1504. By entering an address query 924 into the address entry form 364, and a country into the country selector 1702, and pressing the enter key on the keyboard or the find address button 1710, an address search is undertaken by the system 200 and the results are displayed on a viewable map 300 such as that seen in FIG. 11. In the described embodiment, a ZIP code or city and state is required for system 200 to display the results on a viewable map 300, but the street address is optional.

Figure 18:
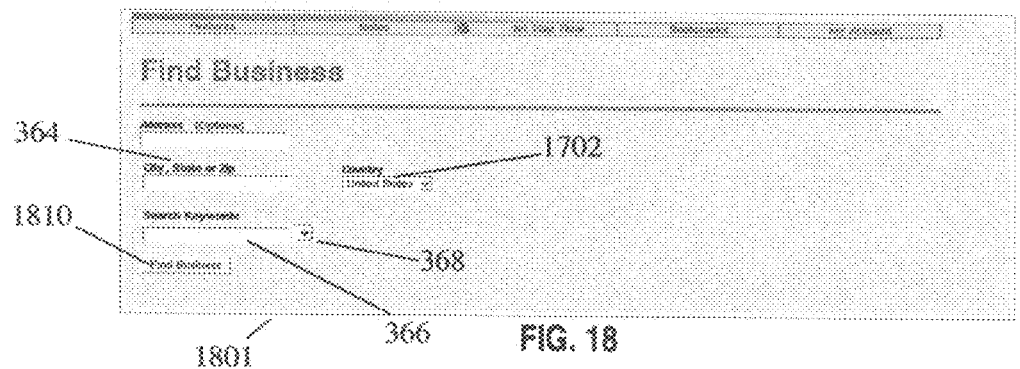
FIG. 18 is a screen shot of an exemplary web page showing entry forms and related options accessed through one of the menu items of the features button to enter address and search queries to display matching entities in a specific area on the map.

FIG. 18 is a screen shot 1801 of an exemplary web page 240 that may be used to enter a combination address query 924 and search query 804 to display matching entities on the viewable map 300 and may be accessed by selecting the find business option 1512 from the features menu items 1504. By entering an address query 924 into the address form 364, a country into the country selector 1702, and the search query 804 into the search criteria form 366, and pressing the enter key on the keyboard 122 or the find business button 1810, a search is undertaken by the system 200 and the results are displayed on a viewable map 300 such as that seen in FIG. 9.

As discussed above in relation to FIG. 17, a ZIP code or city and state is required, but the street address is optional for the address form 364. The search criteria entered into the search criteria form 366 can be one or more words, and one of ordinary skill in the art will see that quotation marks and other search operators could be used.

Figure 19:
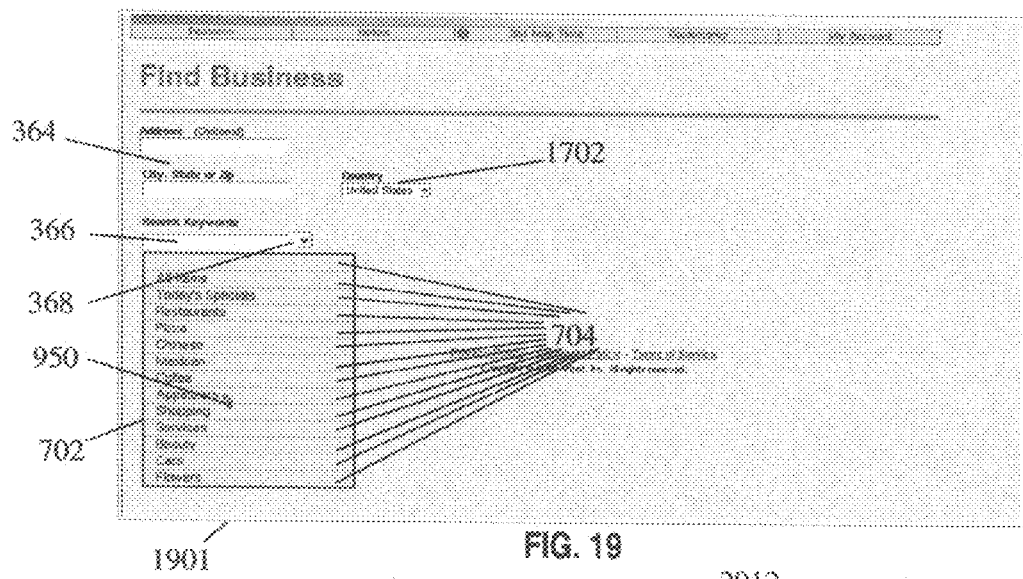
FIG. 19 is a screen shot of an exemplary web page showing entry forms and a drop-down menu accessed through one of the menu items of the features button to enter an address and search query to display matching entities in a specific area on the map.

FIG. 19 is a screen shot 1901 of the same exemplary web page 240 as shown in FIG. 18. It demonstrates the use of the quick search button 368 in order to enter a word or words into the search criteria form 366. Clicking on the quick search button 368 exposes the quick search list 702. Moving the mouse cursor indicator 950 over various preset quick search items 704 will display a quick search highlight 706 (not shown) over the active search item 704 that the cursor is pointing to. Clicking the mouse 123 button while the cursor is over the highlighted active search item 704 will select the highlighted active search item 704. The address query 924 is entered as in FIG. 18 and the query is also submitted as therein.

Figure 20A:
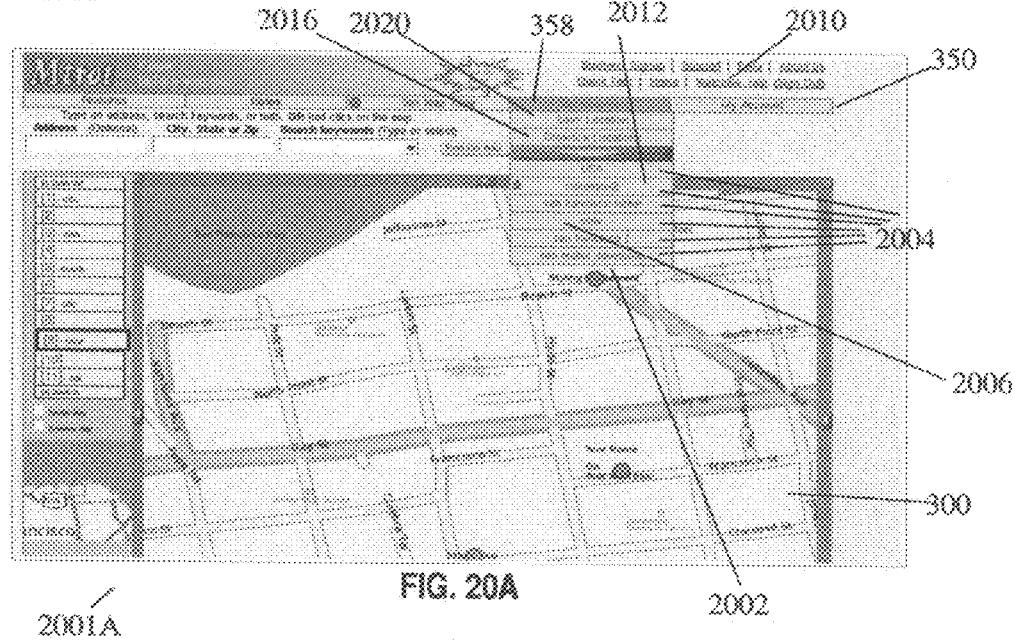
FIGS. 20A and 20B are screen shots of exemplary web pages showing the use of the favorites button to add, organize, or navigate to saved favorite locations by a logged in user and a user that has not logged in, respectively.

FIG. 20A is a screen shot 2001A of an exemplary web page 240 demonstrating the use of the bookmarks button 358 contained in the menu bar 350. Clicking on the bookmarks button 358 displays the Bookmarks menu 2002 which contains favorites menu items 2004. Clicking on the save location option 2020 selects the option that saves the current location as a favorite, selecting the organize locations options 2016 selects an option that manages favorites as described hereinbelow with reference to FIG. 21, while selecting one of favorites menu items 2004 navigates to an already saved favorite.

A user must be registered and logged in to system 200 to take advantage of the functionalities of the bookmarks button 358. The current user identifier 2010 shows the user logged into the system 200. When a user who is logged in clicks the save location option 2020, the coordinates of the viewable map 300 currently being viewed on the web page 240 are noted and stored by the account manager 250 of system 200 in the database 262 in the user account tables 278 and associated with the account ID of the current user (as indicated in current user identifier 2010). The user is also given an opportunity to name the location, said name also being stored in the user account tables 278 and associated with the account ID of the current user. Later, when a user is logged in and selects from one of the favorites menu items 2004 (for example, "ohio" 2006) from the bookmarks menu 2002, the viewable map 300 will switch to a view of the area that was previously saved and stored in the database for the logged in user and named "ohio." The system 200 may also save various other information in the database 262, such as the address query 924 entered by the user, associated search query 804, and filters (not shown) to suppress the display of certain entities on viewable map 300 when displaying subsequent views of the saved location. The saved locations can be organized by selecting the organized locations option 2016 as described hereinbelow with reference to FIG. 21. The method used to save favorite locations is described more fully hereinbelow with reference to FIG. 52. These favorite locations are alternatively referred to as bookmarks.

One of the feature menu items 2004 is the Home map option 2012 which is distinguished by the home map indicator 2014. The home map option 2012 is "columbus2" in our described embodiment of FIG. 20A, but can be any other name or location chosen by a user. This home map item 2012 may be used as a starting point for a user, giving them a reference point for beginning their searches or an easy way to find their own neighborhood within the system 200.

Figure 20B:
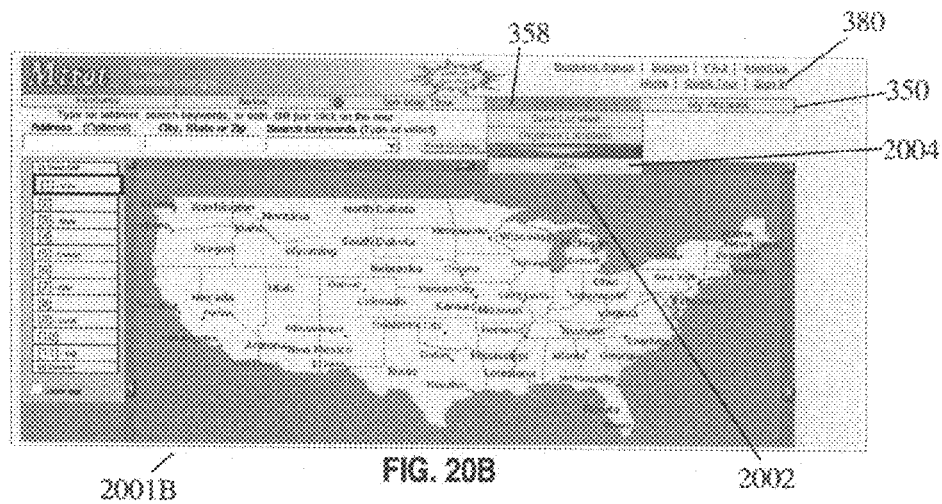

FIG. 20B is a screen shot 2001B of an exemplary web page 240 demonstrating the same features as shown in FIG. 20A.

The signin/signout button 380 displays "sign in" with no current user identifier 2010 next to it, indicating that the logged in user of FIG. 20A has logged out, leaving the bookmarks menu 2002 with fewer favorites menu items 2004.

Figure 21:
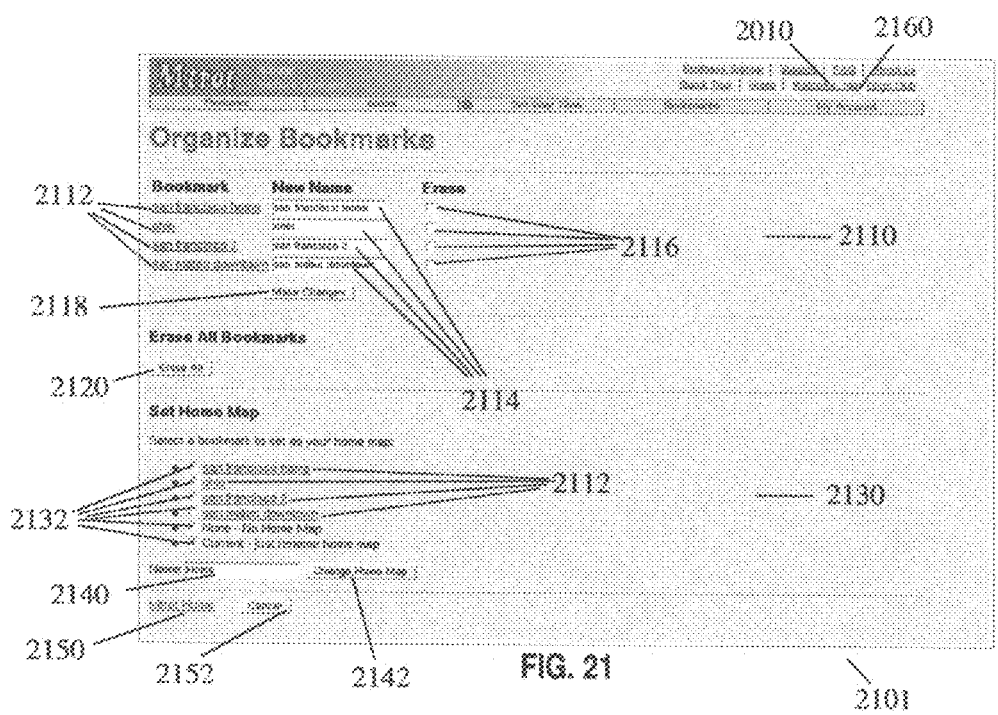
FIG. 21 is a screen shot of an exemplary web page showing the options for management of favorite locations.

FIG. 21 is a screen shot 2101 of an exemplary web page 240 showing the management of favorite locations that have been saved by a user into the database 262 in user account tables 278 by clicking on the save locations option 2020 of bookmarks button 358 as further described hereinabove with reference to FIG. 20A. The web page 240 shown in this FIG. 21 can be accessed by selecting organize location option 2016 of bookmarks button 358.

The embodiment described in FIG. 21 shows a user with account ID ralp 2160 (as displayed in current user identifier 2010) that has previously registered with system 200 and is currently logged in to system 200. The web page 240 shown in FIG. 21 is divided into four areas. The first area is the bookmark organization form 2110 which displays information that have been previously saved by user with account ID 2160 ralp. This bookmark organization form 2110 displays bookmark name URLs 2112 which may be clicked on to display and navigate to the corresponding saved map location on viewable map 300. There are also bookmark name entry forms 2114 which are prepopulated with the current names of each bookmark and allows a bookmark to be renamed. The bookmark erase checkbox 2116 may be used to select individual bookmarks to erase from the database 262. The changes made in bookmark name entry form 2114 and the bookmark erase checkbox 2116 are activated upon clicking the bookmark change button 2118.

The next area contains the erase all button 2120 which, when clicked, removes all saved favorites from the user's account in the database 262.

The next area contains the home map entry form 2130. The home map entry form 2130 also displays the bookmark name URLs 2112 which may be clicked on to display and navigate to the corresponding saved map location on viewable map 300. The home map entry form 2130 is prepopulated with bookmark name URLs 2112. This home map entry form 2130 also displays the home map selector 2132 which may be used to select which of the bookmark URLs 2112 is used as the home map item 2012 as described in FIG. 20A. The home map name entry form 2140 may be used to change the name of the home map item 2012. Any of the changes from home map selector 2132 and home map name entry form 2140 are activated upon clicking the home map change button 2142.

The remaining area contains a navigation link 2150 and a cancel button 2152. When the home page navigation link 2150 is selected, the user leaves this web page 240 and returns to the home page 240 for the system 200 without updating the database 262. The cancel button 2152 also leaves this page without modifying any data; it returns to the last viewed web page 240.

Figure 22:
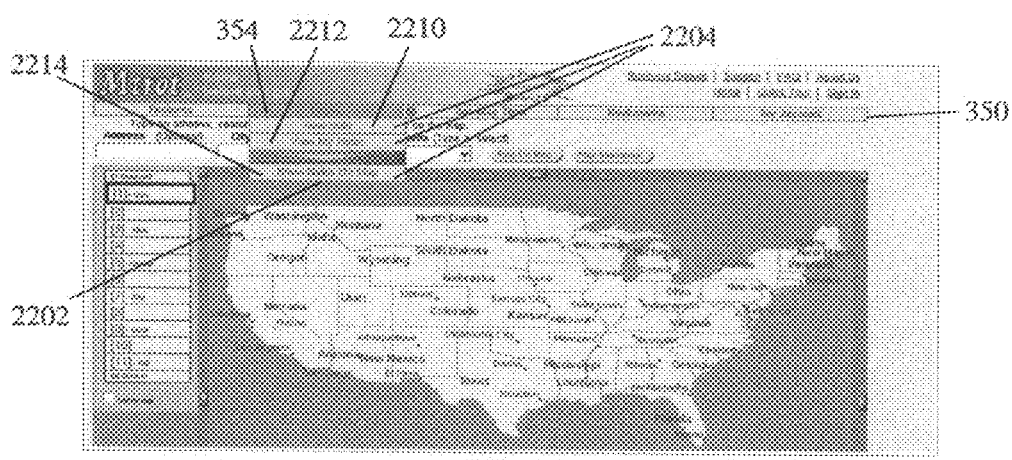
FIG. 22 is a screen shot of an exemplary web page showing the use of the notes button which contains menu items for adding, viewing, and otherwise managing and editing map notes.

FIG. 22 is a screen shot 2201 of an exemplary web page 240 demonstrating the use of the Notes menu button 254 contained in the menu bar 350. Clicking on the notes button 354 displays the Notes menu 2202 which contains several notes menu items 2204. Clicking one of these note menu items 2204 selects various additional system features such as new note option 2210 which is used to enter new notes as described in FIG. 23, view my notes option 2212 which is used to view notes as described in FIG. 27, and note display option 2214 which is used to control the display of notes on a map as described in FIG. 25. These various options 2204 require the user to be registered and logged in to system 200 by the account manager 250 before they can be used.

Figure 23:
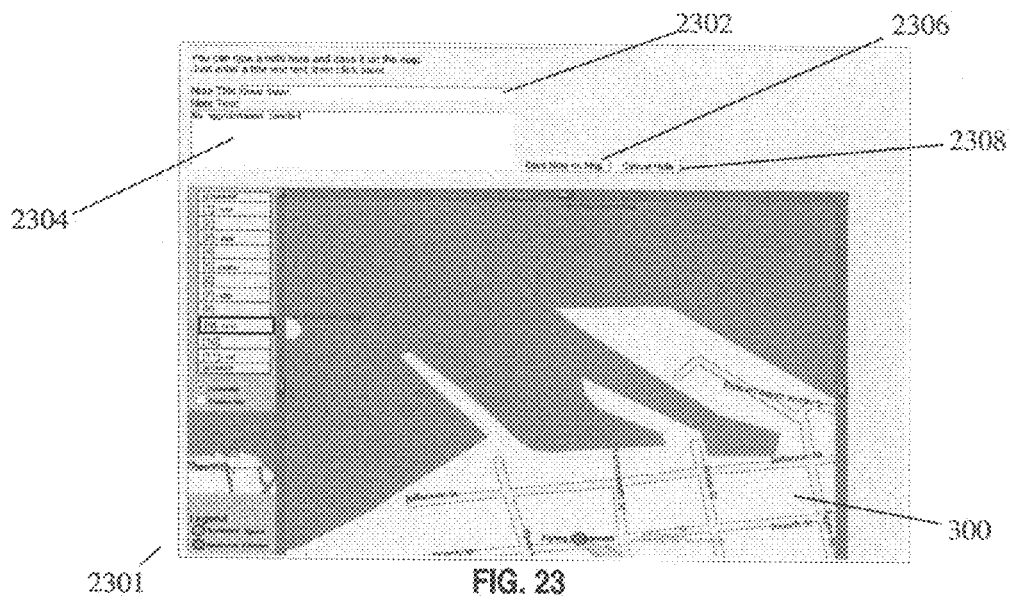
FIG. 23 is a screen shot of an exemplary web page containing an entry form for entering a new map note.

FIG. 23 is a screen shot 2301 of an exemplary web page 240 resulting from selecting the new note option 2210 as described in FIG. 22. This causes the UI 254 to display a note title entry form 2302 and a note text entry form 2304 above the viewable map 300. A user may enter a note title and text into the forms 2302 and 2304, respectively, to be saved in the database 262 in user account tables 278 by the account manager 250 where it is associated with the account ID 2160 of the user that is currently signed in. The form entries 2302 and 2304 are submitted to the system by clicking on the note save button 2306. This note process may be aborted at any time by pressing the note cancel button 2308. This process is described more fully hereinbelow with reference to FIG. 51.

Figure 24:
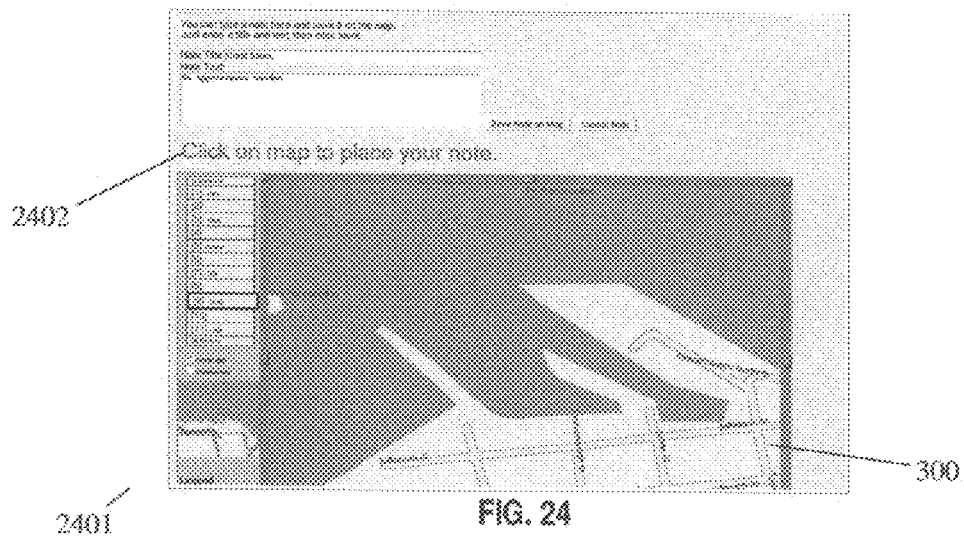
FIG. 24 is a screen shot of an exemplary web page awaiting placement of a new map note.

FIG. 24 is a screen shot 2401 of an exemplary web page 240 resulting from clicking the note save button 2306 of FIG. 23. This causes the UI 254 to display a note placement alert 2402 instructing the user to click on the desired location on the viewable map 300 to place the note.

Figure 25:
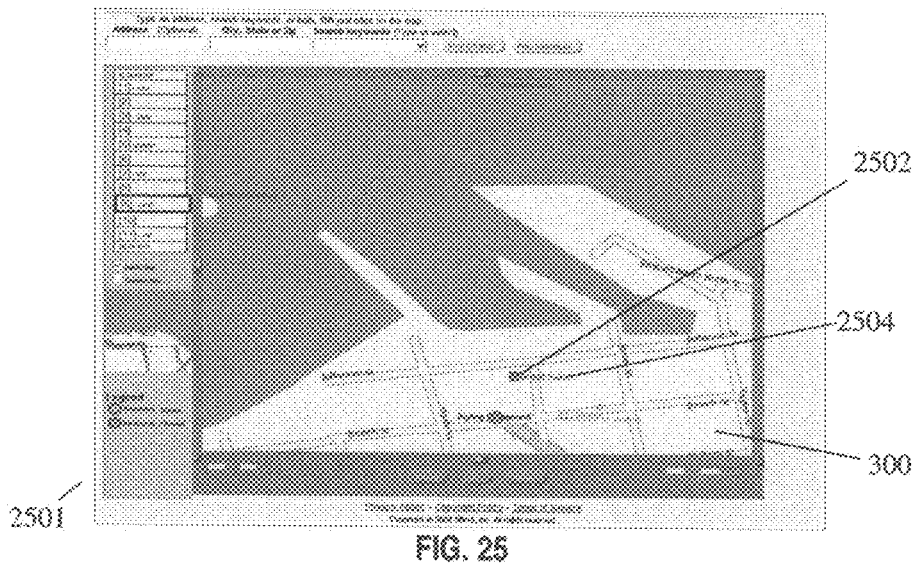
FIG. 25 is a screen shot of an exemplary web page containing a note on the map.

FIG. 25 is a screen shot 2501 of an exemplary web page 240 resulting from clicking on the viewable map 300 of FIG. 24. This causes the note title entry form 2302, note text entry form 2304, and note placement alert 2402 to be removed from display on web page 240. The user's note is now visible on the viewable map 300 where it is represented by a note representation 2502 labeled with the note representation title 2504 and located proximate to the location clicked on. The note representation 2502 in the described embodiment is shown as a blue square, but can be, without limitation, of any color, shape, form, or image, such as, without limitation, a square, triangle, house, boat, corporate logo, or a sound, or animation, or video clip, or images distinguished by color, shading, intensity, or pattern, or presence or absence of any symbol at all.

The notes menu 2202 described hereinabove with reference to FIG. 22 contains a note display option 2214 alternately labeled "Hide Notes on Map" and "Show Notes on Map". When the "Show Notes on Map" option has been chosen, the note display option 2214 shows the option "Hide Notes on Map," and all note representations 2502 and note representation titles 2504 are visible on the viewable map 300. Selecting the option "Hide Notes on Map" removes all of them (hiding them) from view, and the note display option 2214 shows the option "Show Notes on Map". This note display option 2214 allows user notes to be selectively displayed so that the notes are not visible when not needed, making the map more readable.

In one embodiment, the query engine 252 determines which notes should be visible on the viewable map 300, and the note representations 2502 and note representation title 2504 are drawn on the viewable map 300 by the map server 244, as described more fully hereinbelow with reference to FIG. 46.

Figure 26:
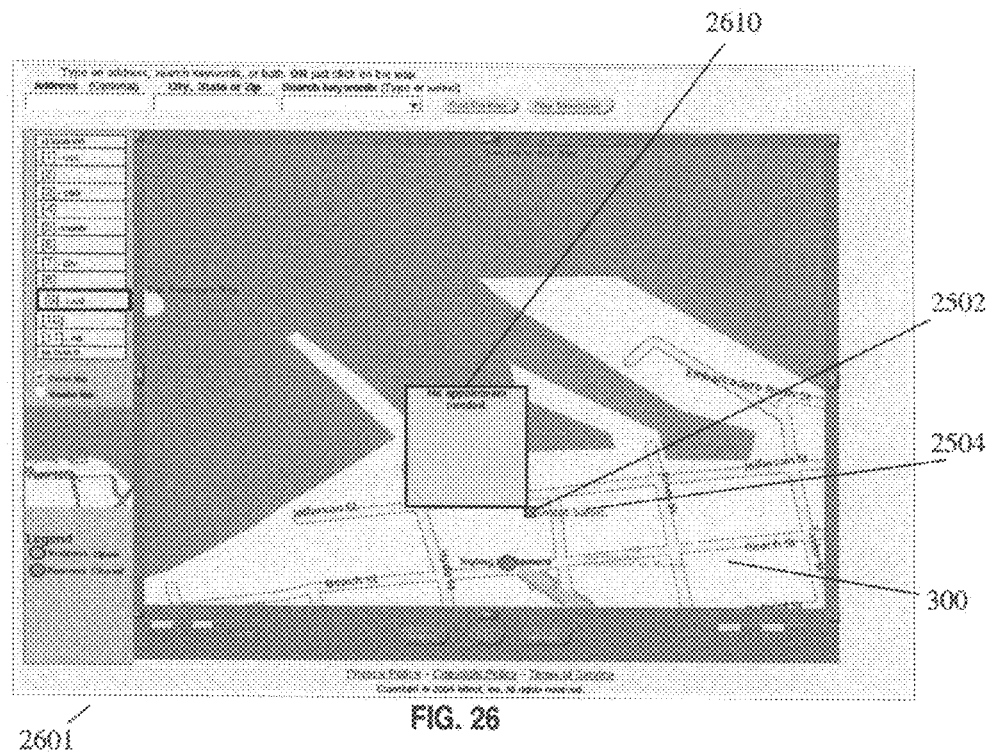
FIG. 26 is a screen shot of an exemplary web page containing a note on the map with associated text.

FIG. 26 is a screen shot 2601 of an exemplary web page 240 showing the display of a note representation 2502 labeled with the note representation title 2504 on the viewable map 300. Moving a mouse cursor indicator 950 (not shown) over displayed note representation 2502 causes the UI 254 to place a note popup 2610 over the viewable map 300. This note popup 2610 contains the text of the note entered by the user as described hereinabove with reference to FIG. 23. In the example described in FIG. 23, the user attached a note to the area in the vicinity of the business called "Styling Excitement," with the title "great salon" and a note specifying "no appointment needed." In an embodiment of the present invention, the note popup 2610 is displayed by using Javascript code to change the visibility and positioning properties of an HTML <div> element.

Figure 27:
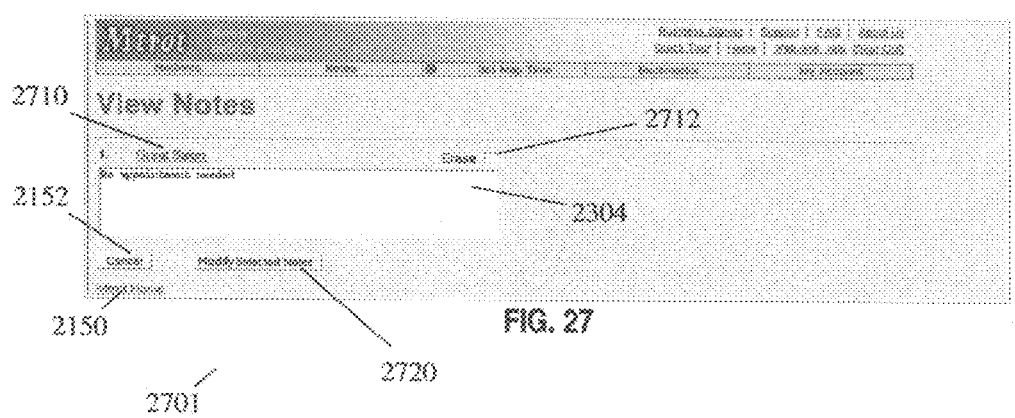
FIG. 27 is a screen shot of an exemplary web page containing a display of all of a user's entered notes.

FIG. 27 is a screen shot 2701 of an exemplary web page 240 resulting from selecting the view my notes option 2212 as described in FIG. 22. This creates a web page 240 displaying all of a user's entered notes. Each note has a note title URL 2710 which displays the title of the note, and may be clicked on to display and navigate to the corresponding location of the note on viewable map 300. Each note also has a note erase checkbox 2712 which may be used to mark a note for removal from the database 262, and a note text entry form 2304 which is prepopulated with the pre-existing text entered by the user for that note and may be used to modify the contents of an existing note. Notes selected with the note erase checkbox 2712 are removed from the logged-in user account entries in the user account tables 278 of the database 262 when the note modify button 2720 is clicked. Similarly, the text inserted or modified in the text entry form is saved into system 200 and associated with logged-in user account ID 2160 in user account tables 278 in the database 262 upon clicking the note modify button 2720.

The remaining area contains a navigation link 2150 and a cancel button 2152. When the navigation link 2150 is selected, the user leaves this web page 240 and returns to the home page for the system 200 without updating the database 262. The cancel button 2152 also leaves this page without modifying any data; it returns to the last viewed page before view my options notes option 2212 was selected.

The entering and modification of information for an entity in system 200 will now be described. Exemplary signup web pages 240 used by the account manager 250 are described below. In the described embodiment, web pages 240 that are used to initially enter entity information with a service provider for system 200 are similar to the web pages 240 used to modify the entity information after the entity has signed up and are therefore described in conjunction with the modification pages. The figures throughout will demonstrate the web pages 240 that are used to modify data, but one of ordinary skill in the art will appreciate that these exemplary pages also show enough detail to fully describe the corresponding initial signup pages during the enrollment process. These exemplary web pages 240 include graphical interfaces for entering certain data; those shown are intended to serve as examples of the types of interface that may be used by such an account manager 250 and can be replaced with many alternatives.

Figure 28:
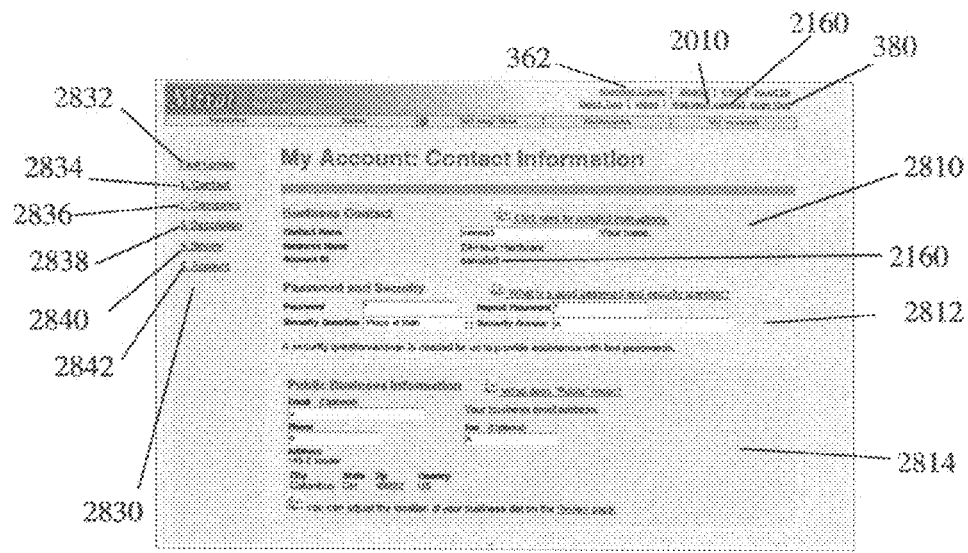
FIG. 28 is a screen shot of an exemplary web page containing forms to enter or update the contact and other information for an entity.

FIG. 28 is a screen shot 2801 of an exemplary web page 240 that, in the described embodiment, is the first web page that a user accesses after clicking on the business signup button 362 during the enrollment process. During the modification process, this page is accessible by the contact URL 2834 after logging in with the signin/signout button 380. This web page 240 includes contact information form 2810, including contact name, business name, and account ID 2160 (in the initial signup pages, the business name and Account ID 2160 are modifiable entry forms), security information form 2812, including password and security answer, and public information form 2814, including phone number, email address, fax number, and address, private information form 2816 (not shown, but similar to public information form 2814) including phone number, email address, fax number, and address, all of which may be entered or updated from this web page 240 and stored in the database 262 and associated with current account ID 2160 in accordance with the data structures demonstrated hereinbelow with reference to FIG. 37 by the account manger 250 when a submit button (not shown) is pressed. In an embodiment of the invention, the address in the public information form 2814 is used to place the entity representation 422 on the viewable map 300 and the address in the private information form 2816 is used for contact information purposes.

This page also includes a set of navigation links 2830, quick update URL 2832, contact URL 2834, categories URL 2836, review URL 2840, account URL 2842, which may be used to quickly navigate to the pages described herein with reference to FIGS. 28-35.

In the modification process, the entry forms of the web pages 240 are pre-populated with entries that the entity previously entered during the signup process or a prior modification process. This screen shot 2801 shows the use of the system 200 by a business that already has an account with the service provider. This business can log in or out of the system by clicking on the sign in/sign out button 380. When logged out, the signin/signout button 380 changes its caption and functions as a signin button. When logged in, the system displays a current user identifier 2010 which shows the account ID 2160 of the logged in entity and the signin/signout button 380 functions as a sign out button. The account manager 250 of the application engine 242 manages this interface using techniques that are well known in the art.

There are other methods that may be used to enter entity information into the system 200 (some described after the discussion of FIG. 59 hereinbelow). Furthermore, the account manager 250 of this system 200 is more fully described hereinbelow with reference to FIG. 47.

Figure 29A:
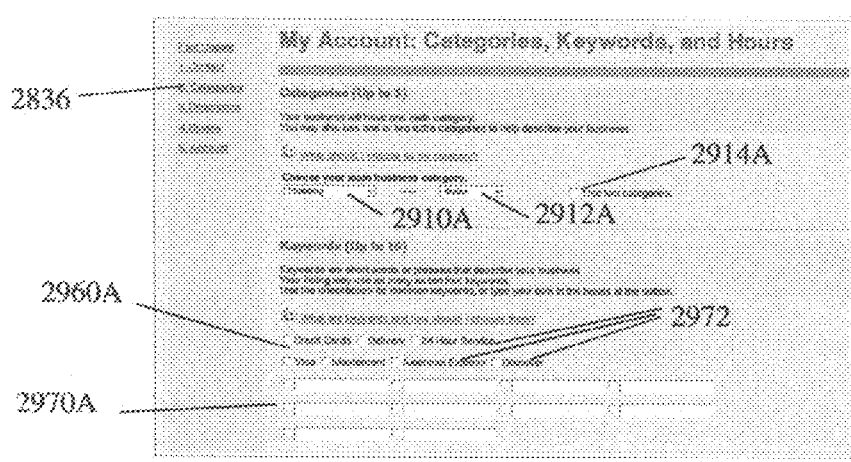
FIGS. 29A and 29B are screen shots of exemplary web pages containing forms to enter or update the categories and keywords for an entity which are used by the system for searches.

FIG. 29A is a screen shot 2901A of an exemplary web page 240 used to enter or update the categories and keywords for entities which are used by the system 200 for search and classification, which, in the described embodiment, is the second web page in the enrollment process and can also be accessed by clicking on categories URL 2836 during the enrollment process or the modification process. An entity is classified by a primary category which is chosen with the main category selector 2910A and a primary subcategory chosen with the main subcategory selector 2912A. In the described embodiment, up to two additional categories may be chosen by selecting the main add category checkbox 2914A as described in FIG. 29B, but one of ordinary skill in the art will appreciate that additional categories may be added. An entity is also classified by a number of keywords 2972 (limited to 17 in the described embodiment, but additional ones can be added) selected via any combination of preset keywords 2960A and user-defined keywords 2970A. This data is stored in the database 262 in accordance with the data structures demonstrated hereinbelow with reference to FIGS. 38-39 when a submit button (not shown) is pressed.

Figure 29B:
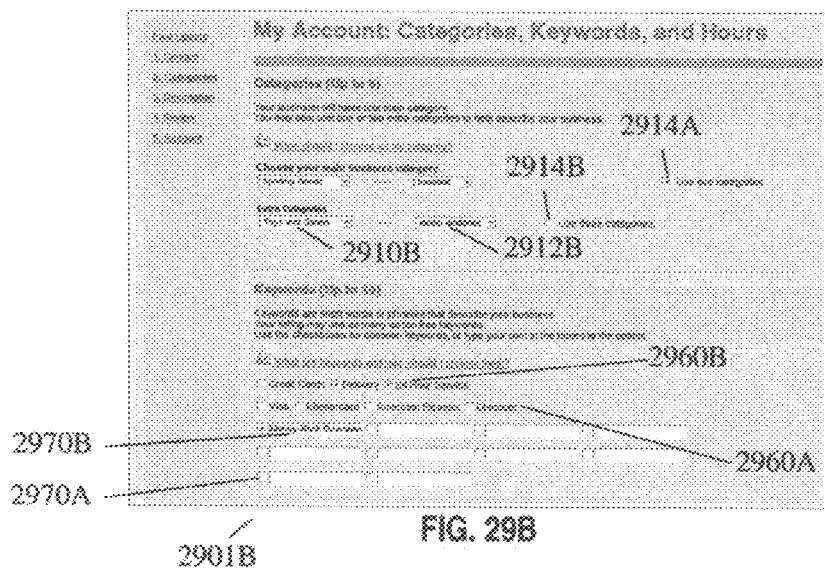

FIG. 29B is a screen shot 2901B of the same exemplary web page 240 of FIG. 29A that shows the addition of a second, additional category selector 2910B, additional subcategory selector 2912B, and additional add category checkbox 2914B displayed due to the selection of the add category checkbox 2914A of FIG. 29A. This web page 240 also shows two preset keywords 2960B selected and a user-defined keyword 2970B entered and selected.

Figure 38:
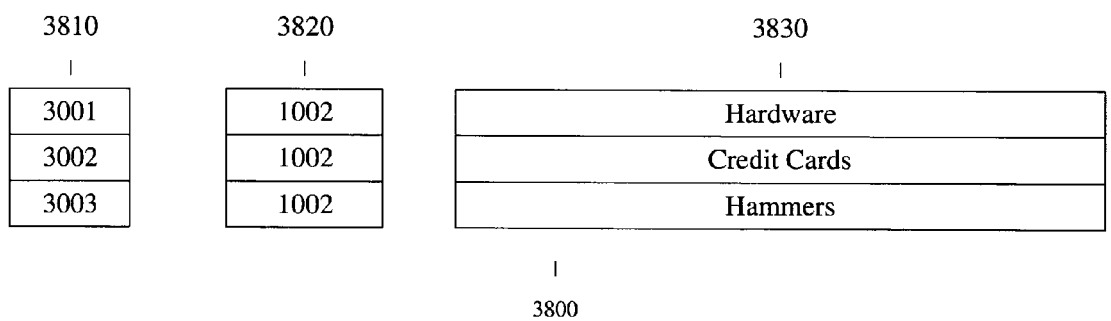
FIG. 38 is an exemplary data structure showing the layout of entries in the keyword table of the database.
Figure 39:
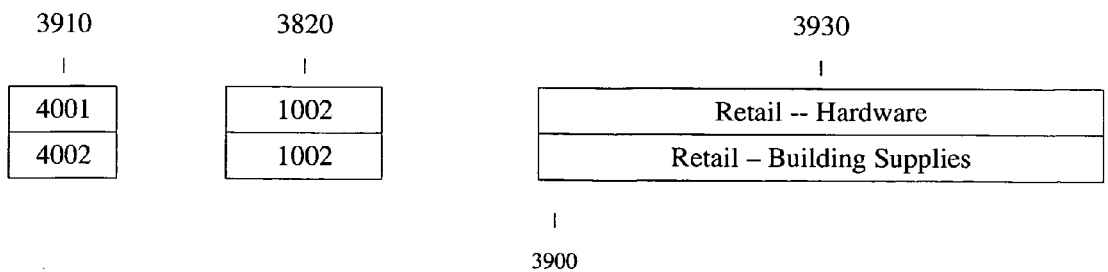
FIG. 39 is an exemplary data structure showing the layout of entries in the category table of the database.

All of this information may be entered or updated on this web page 240 and stored in the database 262 and associated with current account ID 2160 in accordance with the data structures demonstrated hereinbelow with reference to FIGS. 38-39 by the account manger 250 when a submit button (not shown) is pressed.

Figure 30A:
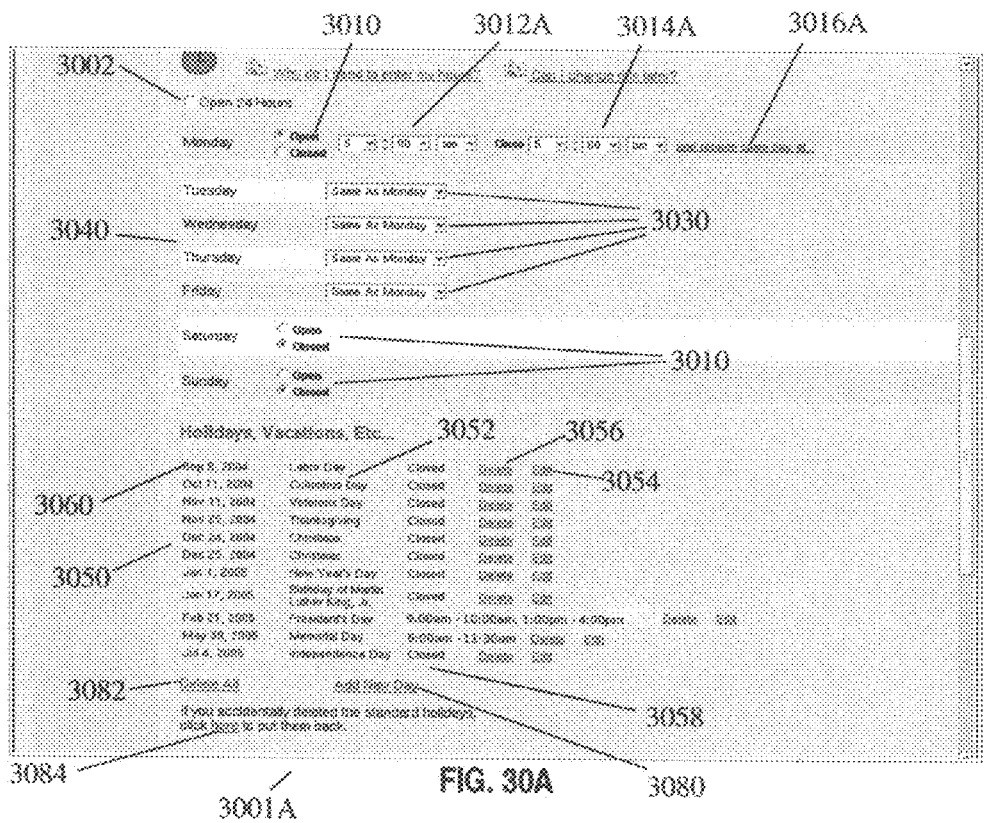
FIGS. 30A and 30B are screen shots of exemplary web pages showing simple and more advanced options, respectively, containing forms and related options to enter or update the information about operating hours for an entity.

FIG. 30A is a screen shot 3001A of an exemplary web page 240 used to enter or update information about operating hours for a entity, which in the described embodiment, is the same web page 240 as the one described in FIGS. 29A-29B. The business may simply select the 24 Hour checkbox 3002 to indicate that it is open around the clock. For businesses that are not open 24 Hours, a daily hours form 3040 can be used to enter the hours of operation for each day. Each of the daily hours forms 3040 includes an open/closed selector 3010 for each day (Monday-Sunday) to indicate if the business is closed for the day or open at some time during the day. The daily hours form 3040 also includes a range 1 opening time entry form 3012A and range 1 closing time form 3014A that specify the first range of standard opening and closing times of the business. This data is stored by the account manager 250 in the database 262 in the hours tables 276 in accordance with the data structures demonstrated hereinbelow with reference to FIG. 40. The handling of businesses that close and reopen later on the same day is described hereinbelow with reference to FIG. 30B.

The daily hours form 3040 for Tuesday, Wednesday, Thursday, and Friday all contain a "Use Monday hours" selector 3030 that marks these weekdays as all having the same hours as Monday, simplifying their data entry.

The bottom of the web page 240 contains an exceptional hours form 3050 used to enter business hours information for dates that do not follow the regular hours of operation specified in the daily hours form 3040. This exceptional hours form 3050 includes a display of the date, date name, and business hours for the exceptions in the exceptional day date display 3060, exceptional day name display 3052, and exceptional day hours display 3058, respectively. New dates may be added by clicking the new exceptional day button 3080 while existing dates may be modified or deleted by clicking on the exceptional day edit button 3054 or exceptional day delete button 3056 for the corresponding day, respectively. This process is described further hereinbelow with reference to FIG. 31. All of the special dates may be deleted at once with a click of the delete all exceptional days button 3082. The insert standard holidays button 3084 provides a method to mark this entity as closed on the standard holidays programmed into the system 200. Any non-standard holiday closings for the business may then be edited with the editing means described in this paragraph. This data is stored by the account manager 250 in the database 262 in the hours tables 276 in accordance with the data structures demonstrated hereinbelow with reference to FIG. 40 when a submit button (not shown) is clicked on.

Figure 30B:
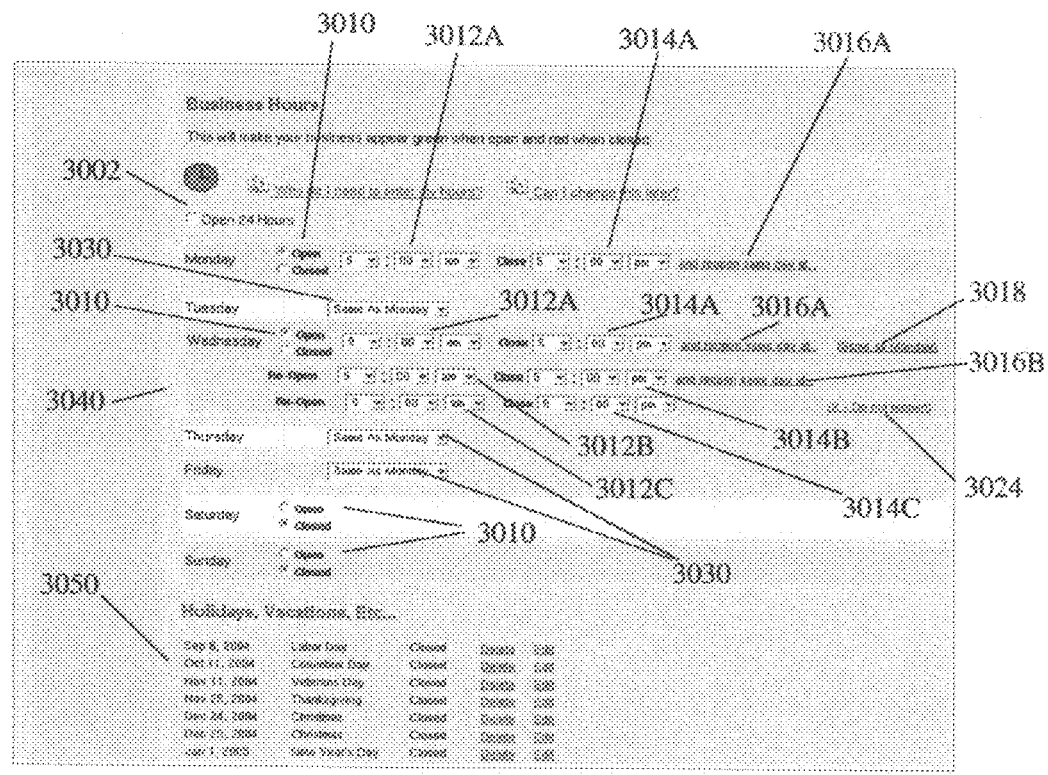

FIG. 30B is a screen shot 3001B of the same exemplary web page 240 as in FIG. 30A showing additional input options to enter or update operating hours information. Clicking on the range 2 reopen button 3016A causes the daily hours form 3040 for the same day to include a range 2 opening time form 3012B and range 2 closing time form 3014B that specify an additional time range that the business is open during the same day. Also, clicking the range 3 reopen button 3016B causes the daily hours form 3040 for the same day to include a range 3 opening time form 3012C and range 3 closing time form 3014C that specifies another additional time range that the business is open. Additional time ranges may be added as necessary. The use of these ranges allows the specification of complex business hours in which business open, close, and reopen multiple times on the same day. If such additional opening time ranges are not needed, they may be removed with the cancel reopening button 3024. When the cancel reopening button 3024 is pressed, if the range 3 opening time range is visible, it will be canceled and removed, leaving only the range 2 opening time range. If the range 3 opening time range is not visible, pressing the cancel reopening button 3024 will cancel and remove the range 2 opening time range, leaving only the range 1 opening time range. This data is also stored by account manager 250 in the database 262 in accordance with the data structures demonstrated hereinbelow with reference to FIG. 40 when a submit button (not shown) is pressed. In other embodiments, additional time ranges may be added, or some ranges removed.

This same FIG. 30B also illustrates the "Same as Monday" button 3018 which can be used to duplicate the hours of operation from the hours used on Monday for another day.

Figure 31:
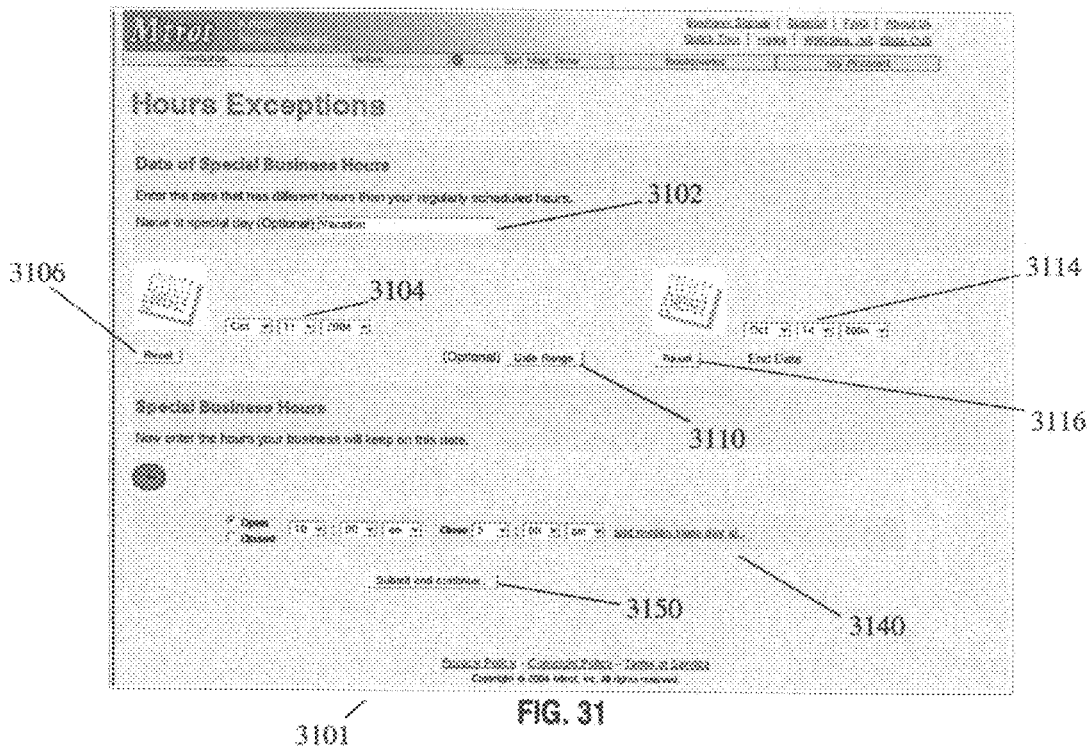
FIG. 31 is a screen shot of an exemplary web page containing forms and related options to enter or update the information about operating hours for exceptional dates (such as holidays or vacations) for an entity.

FIG. 31 is a screen shot 3101 of an exemplary web page 240 resulting from clicking the new exceptional day button 3080 or the exceptional day edit button 3054 in FIG. 30A. This page allows entities to enter or update business hours information for dates that do not follow the regular hours of operation specified in the daily hours forms 3040, such as holidays or vacations. The date in question may be given a name, such as the name of the holiday, by entering it in the exceptional day name form 3102. The business hours for the exceptional date are entered using the exceptional hours form 3140, which works the same way as daily hours forms 3040. A typical use of this feature is to mark business as closed on holidays and vacations.

The special date is entered in the exceptional begin date form 3104. In the case of a range of consecutive days, such as a vacation closing, the use date range button 3110 may be clicked, making the exceptional end date form 3114 appear (as shown in FIG. 31). In this case of a date range, the exceptional begin date form 3104 specifies the starting date of the range and the end date entry form 3114 specifies the end of the range. Ranges share the same hours of operation, as specified in the exceptional hours form 3140. If the hours of operation within the range are not the same, then additional exceptional day entries should be used. The exceptional begin date reset button 3106 and exceptional end date reset button 3116 may be used to reset the exceptional begin date form 3104 and end date form 3114 to the original values they held before the user clicked on the new exceptional day button 3080 or the exceptional day edit button 3054. The date and time inputs shown in FIGS. 30-31 are merely examples of the types of interface that can be used to enter such values. A popup calendar or clock can be used as alternative inputs, as could a textual entry form or other mechanisms.

If the exceptional day edit button 3054 was pressed to get to this web page 240, then the exceptional day name form 3102 is prepopulated with the name of the exceptional day being edited, and begin date 3104, end date 3114, and exceptional hours 3140 are prepopulated with the date(s) and times previously entered for the exceptional day being edited.

The submit button 3150 is used to enter the exceptional date information into the system 200 for storage in the database 262 where it is associated with the current account ID 2160 and stored by the account manager 250 in the hours tables 276 in accordance with data structures similar to those demonstrated hereinbelow with reference to FIG. 40.

In other embodiments, other information, in addition to or in lieu of hours of operation, can be added by the account manager 250 and stored in database 262. For example, an entity can enter the name of a product, along with the availability of the product (or the quantity available). Alternatively, an entity can enter the availability of a service (e.g., a vacant hotel room). One of ordinary skill in the art will recognize that other entity characteristics can be added by account manager 250 and stored in database 262. In such cases, the system 200 may store information such as can be represented in a table or by a rule that can be evaluated to automatically classify the entity based on user queries. For example, a movie theater may specify the dates and playing times of various movies, an apartment complex may enter the number of apartments of various types available as of a given date, a hotel may enter the number of rooms available as of certain dates, a store may enter a quantity available of certain products, employers may enter the number of job openings available as of given dates, event sponsors may enter dates and times for events at certain venues or the number of tickets still available, garage sales or open houses may have their times of operation entered in a manner similar to the regular business hours of a business, and many other such forms of varying information may be entered or updated by entities.

Figure 32:
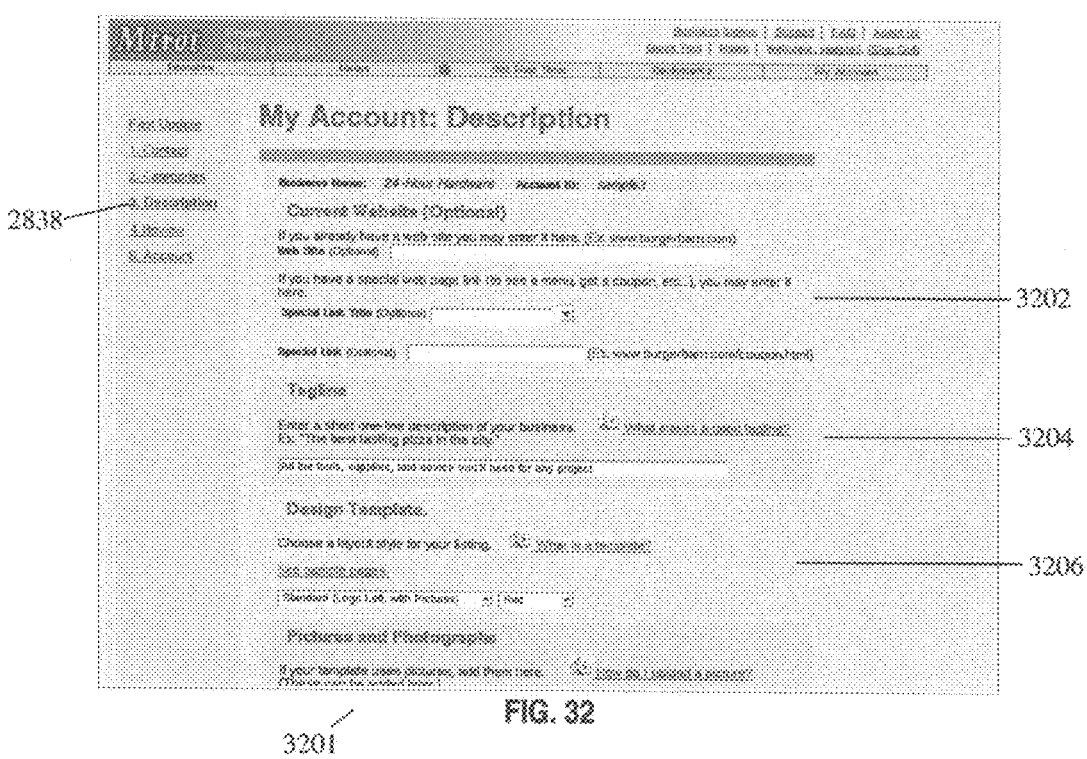
FIG. 32 is a screen shot of an exemplary web page containing forms and related options to enter or update website links, tag lines, and design templates for an entity.

FIG. 32 is a screen shot 3201 of an exemplary web page 240 used to view and update website links, taglines, and design templates for an entity. In the described embodiment, this is the third web page in the enrollment process and after enrollment, can be accessed by logging in and clicking on the description URL 2838. This web page 240 includes a web link form 3202 for entering URLs to associated web pages and titles to such URLs, a tagline form 3204, used to enter a tagline for the entity, and a design template form 3206 which may be used to describe the graphic design of an entity's information display 940, all of which may be updated and stored in the database 262 where they are associated with the account ID 2160 that is currently logged in or registering with the system 200 when the save button 3350 (shown in FIG. 33) is pressed.

Figure 33:
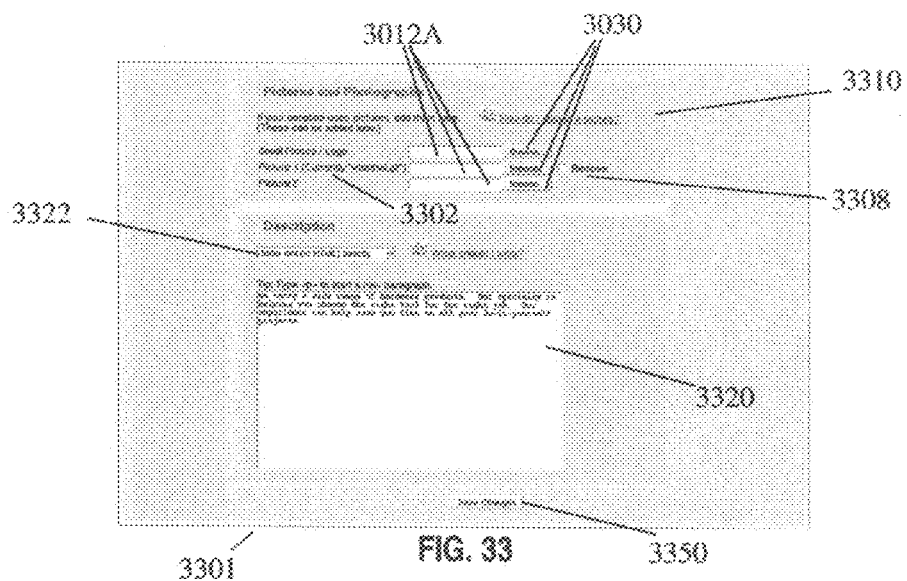
FIG. 33 is a screen shot of an exemplary web page containing forms and related options to enter or update the pictures, photographs, or description of an entity.

FIG. 33 is a screen shot 3301 of the second part of the exemplary web page 240 described in FIG. 32 above and is used to view and update pictures, photographs, or the description of an entity. The picture form 3310 is used to upload pictures and photographs into the system 200 where they are stored in either the database 262 (as done in the preferred embodiment) or in the secondary storage 107. When the picture is stored in secondary storage 107, associated information such as the picture file name and dimensions may still be stored in the database 262. To upload a picture, the picture file browse button 3306 is used to select a digital image file from the storage medium of client 202 in a well known image format such as JPEG, GIF, PNG, or other image format, thereby entering the filename in the picture filename entry form 3304. The current picture name display 3302 displays the name of the picture that is currently stored in database 262 and associated with account ID 2160. To remove an already loaded picture from the system 200, the remove picture button 3308 is used to select the picture for removal. In the example shown in FIG. 33, only the second picture form 3310 has an associated file and is the only form associated with a remove button 3308.

The description form 3320 is used to enter a text description of the entity. In the described embodiment, this description may be in plain text or HTML format (with appropriate limitations as necessary for security) and can be loaded from existing files or web sites or entered directly, as specified by the entity in the description format selector 3322. The description is additionally passed by the account manager 250 to the text search engine 246 which stores an index in the database 262 to enable subsequent searches and classifications of entities based on their descriptions.

The save button 3350 is used to enter the information and picture entered or updated into the system 200 for storage in the database 262 or secondary storage 107 where it is associated with the current account ID 2160.

The last web page 240 (not shown) in the enrollment process (which can be accessed by account URL 2842) is the page in system 200 for the entity to submit payment.

Figure 34A:
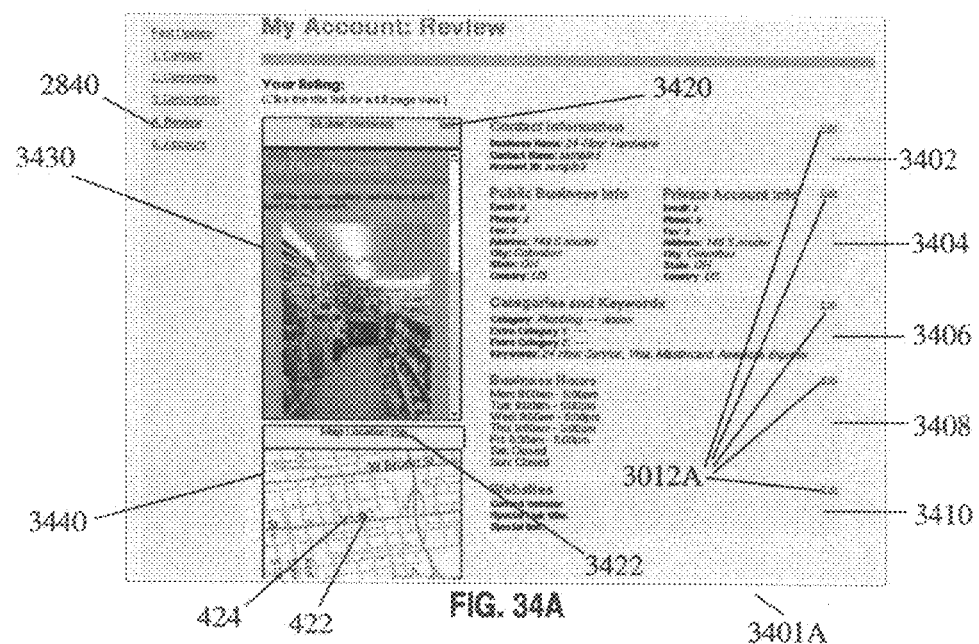
FIGS. 34A and 34B are screen shots of different aspects of an exemplary web page containing a summary of information associated with an exemplary entity.

FIG. 34A is a screen shot 3401A of an exemplary web page 240 for viewing a summary of the information associated with an entity and in the described embodiment, is the fourth web page in the enrollment process and can also be accessed by clicking on review URL 2840. It includes a contact summary 3402 which summarizes the contact information, business summary 3404 which summarizes the private and public information for the entity, classification summary 3406, which lists the categories selected by the entity and keywords selected and/or entered by the entity, hours summary 3408, which lists the standard hours of operation for the entity, web link summary 3410, which lists the web links to associated web pages and associated titles to the web links, entity listing summary 3430, which shows what the entity's listing will look like in the entity information display 940, and a thumbnail map 3440, which shows the location of its entity representation 422 and entity name 424 on the map. All of these summaries provide a quick glance at the information entered in the web pages 240 described in FIGS. 28-33 so that entities may review their information for correctness and completeness. Entity listing summary 3430 contains entity tagline 908 and entity description 912 as well as categories and keywords (not shown) which are also displayed in classification summary 3406, standard hours of operation 3408 (not shown) which are also displayed in hours summary 3408, web links and titles (not shown) which are also displayed in web link summary 3410, and public business info (not shown) which are also displayed in business summary 3404, all of which will be displayed in entity information display 940 as it appears in the entity listing summary 3430. Alternative embodiments may include additional summaries of entity information (e.g., exceptional days and hours) or exclude certain summaries of information.

If any changes are needed in any of the summaries 3402, 3404, 3406, 3408, 3410, or 3430, then the corresponding edit button 3420 may be clicked. Clicking on one of these edit buttons 3420 loads one of the corresponding web pages 240 described in FIGS. 28-33 to make the necessary editing changes. Exceptional day hours can be edited through the edit button 3420 on hours summary 3408. If the entity desires to change the location of its entity representation 422 as shown on the thumbnail map 3440, the associated edit button 3422 will bring up a graphical interface for selecting the geographic location of the entity by clicking on a viewable map 300. This interface and the method for selecting the geographic location of the entity are described more fully hereinbelow with reference to FIGS. 54-58.

Figure 34B:
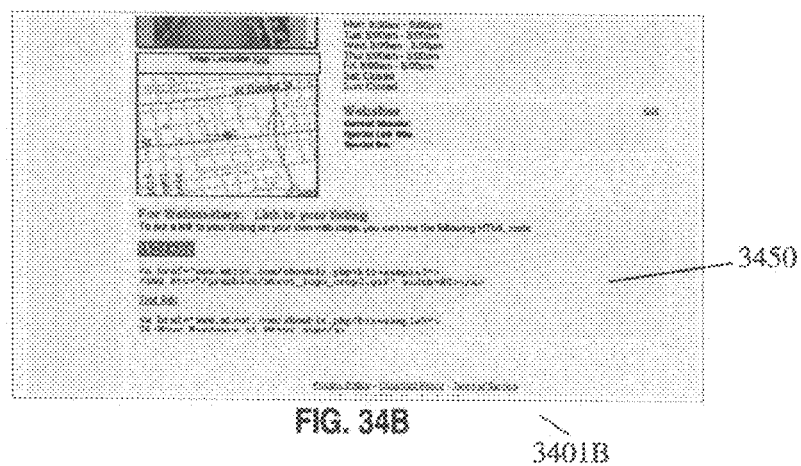

FIG. 34B is a screen shot 3401B of the same exemplary web page 240 as shown in FIG. 34A which shows the bottom of the web page 240. It shows the display of the integration information 3450 that may be used by web site developers to link to or display entity listings on their web sites. In the described embodiment, this integration information 3450 is displayed on this web page 240 by system 200 whenever this web page 240 is loaded.

Figure 35:
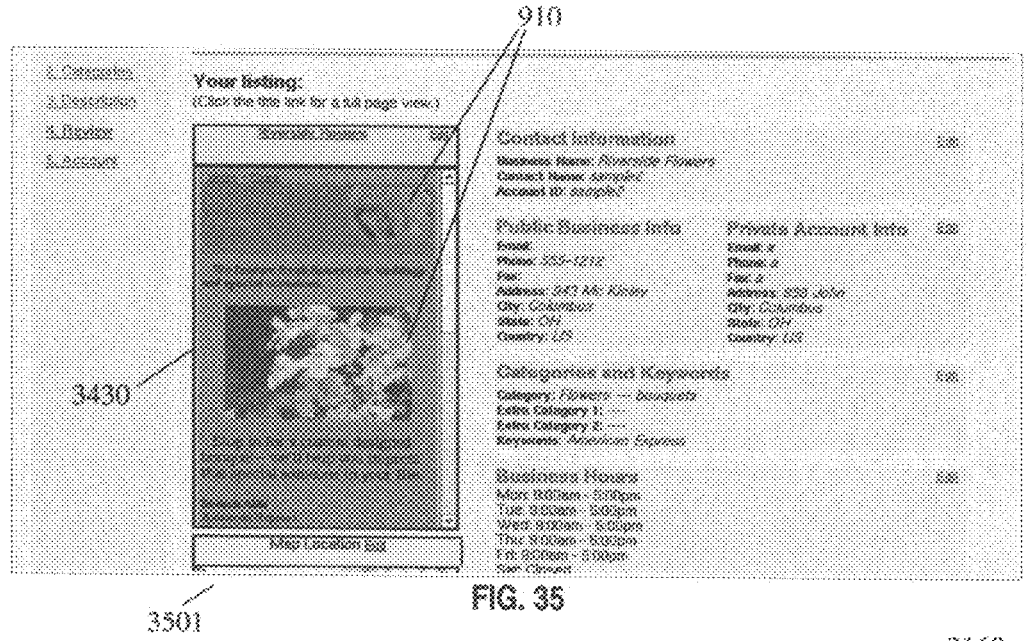
FIG. 35 is a screen shot of an exemplary web page containing a summary of information associated with an exemplary entity.

FIG. 35 is a screen shot 3501 of an exemplary web page 240 used to view a summary of the information associated with an entity. It shows an entity listing summary 3430 for an entity that specified two entity pictures 910.

Figure 36:
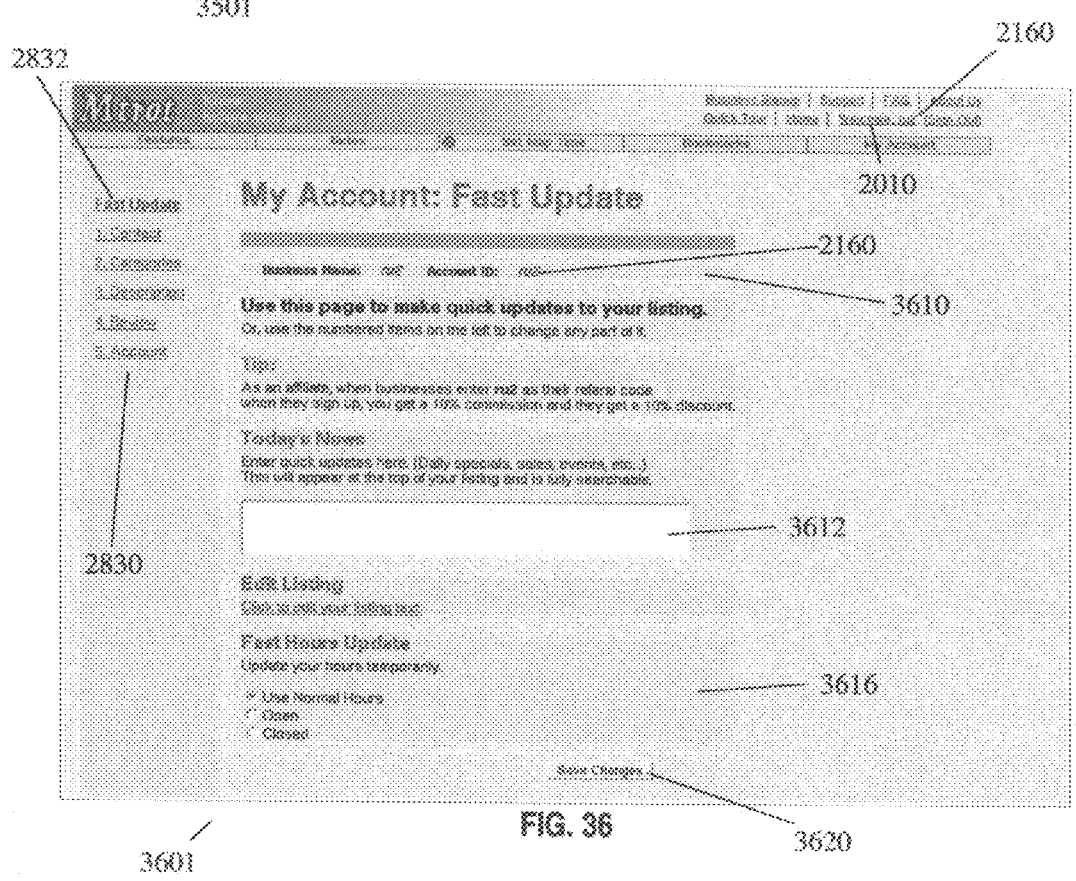
FIG. 36 is an exemplary screen shot of an exemplary web page containing forms and related options to quickly update the information about entities.

FIG. 36 is a screen shot 3601 of an exemplary web page 240 used to quickly update the information for an entity that has an account with the service provider for system 200. This web page 240 is shown when the entity successfully logs in to the system account manager 250. The page includes a current user account identifier 2010 to remind users of the account ID 2160 being managed, an account name summary 3610 to show the business name and account ID 2160, a quick update entry form 3612 into which may be entered updates for the entity's information (such as daily sales, special events, etc . . . ), and a normal/open/closed selector 3616 which allows an entity to use normal hours or mark their business hours as open or closed until further notice. The values of the normal/open/closed selector 3616 may be stored in the hours table 276 of the database 262 in the Currently Open indicator 4032 and Currently Closed indicator 4034 as ("TRUE" or "FALSE") as described hereinbelow with relation to FIG. 40. All of these inputs 3612 and 3616 are activated upon clicking the save button 3620 and will be stored in the database 262 and associated with current account ID 2160 in accordance with the data structures demonstrated hereinbelow with reference to FIG. 37 by the account manger 250.

The foregoing is a description of how an entity can login and modify the information associated with the entity in system 200. The process by which the entity can enroll is similar. In the described embodiment, in the modification process, the quick update URL 2832 is also displayed as part of the set of navigation links 2830.

The enrollment of a user and modification of user information, in the described embodiment, may be managed by account manager 250, accessed through the My Account button 360, which contains functionalities for changing passwords, enrollment, and other user account options (not shown).

Figure 37:
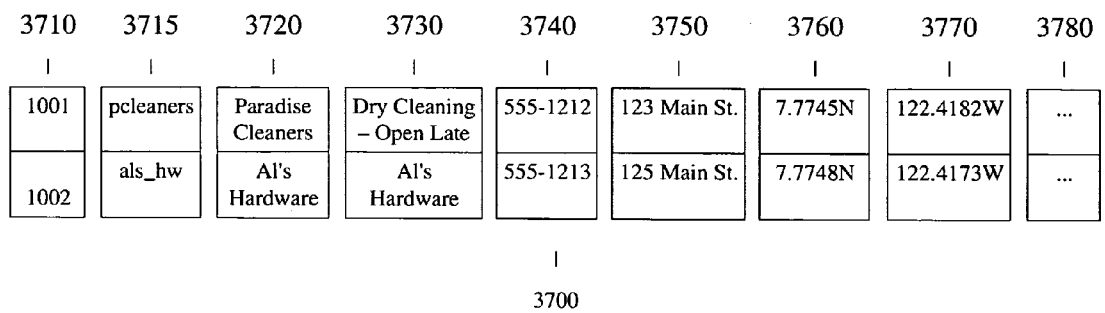
FIG. 37 is an exemplary data structure showing the layout of entries in the business table of the database.

When an entity enrolls through the process described in FIGS. 28-35 or when system 200 gathers information about entities, the data entered by the entity is stored in database 262. FIG. 37 is an exemplary data structure showing the layout of exemplary entity entries 3700 of entities in the business table 270 of the database 262 of the system 200 in FIG. 2. In the exemplary embodiment shown in FIG. 37, each entry 3700 consists of an entity numeric ID field 3710, account ID field 3715 (for account ID 2160), business name field 3720, tagline field 3730 (for tagline 908), public phone number field 3740, public address field 3750, latitude field 3760, longitude field 3770, and additional data fields 3780 associated with the corresponding entity, such as, without limitation contact name, password, security question and answer, public email and fax, private contact information, web links and titles, design template, pictures, description of entity, fast update text, and entity-chosen location of entity representation. These additional data fields can include any other data collected from or about the entity. One of ordinary skill in the art will readily understand how any additional entity data can be stored in database 262 with standard methods. The numeric ID field 3710 values are randomly or sequentially assigned for each entity and provide a unique number for identifying each entity. In an embodiment of the present invention, the values for account ID field 3715, business name field 3720, tagline field 3730, public phone number field 3740, public address field 3750, and additional data fields 3780 are entered by the entity during the enrollment process (and optionally updated later by the entity using the modification process) shown hereinabove with reference to FIGS. 28-36. The latitude field 3760 and the longitude field 3770 values are calculated by the geocoder 256 using the value of the public address field 3750 of the entity and the geographic data 280 of system 200 before they are stored in the entry 3700. An embodiment of the present invention uses the address entered in public information form 2814 in FIG. 28 as the value of the public address field 3750. The latitude field 3760 and the longitude field 3770 values may also be modified using the interface and method for manually selecting geographic locations described more fully hereinbelow with relation to FIGS. 54-58.

The keywords 2972 entered and/or selected by the entities during the sign up process or otherwise gathered by system 200 are also stored in database 262 in the keyword tables 272. In an embodiment of the present invention, keywords 2972 may be entered as preset keywords 2960A or user-defined keywords 2970A during the enrollment process or modification process, as shown in FIG. 29A. These keywords 2972 can be any word or phrase that is useful to describe an entity or a product or service that it offers. FIG. 38 is an exemplary data structure showing the layout of exemplary keyword entries 3800 in the keyword table 272 of the database 262 of the system 200 in FIG. 2. Each keyword entry 3800 consists of a keyword numeric ID field 3810, entity reference ID field 3820, and keyword field 3830 (for keywords 2972). The value in keyword numeric ID field 3810 is used to give each keyword used a unique identifier in the database 262. The value in entity reference ID field 3820 is equal to a value in entity numeric ID field 3710 of an entity in the business tables 270 of the database 262 so that each of the values in keyword field 3830 may be related to a specific entity and linked with other information about the entity, such as that described hereinabove with reference to FIG. 37. In the described embodiment, each of the keywords 2972 Hardware, Credit Cards, and Hammers in keyword field 3830 of FIG. 38 correspond to entity reference ID fields 3820 having the value 1002 which all relate to the entry 3700 in FIG. 37 for Al's Hardware (identified by entity numeric ID 3710 with the value 1002). Each of the keywords 2972 may also be related to a different entity in the business table 270. For example, if Paradise Cleaners accepts credit cards, there may be an additional entry in the keyword table 272 with a unique value in keyword numeric ID field 3810 (such as 3004), an entity reference ID field 3820 with the value 1001, and a keyword field 3830 with the value "Credit Cards".

The present invention is not limited to any particular implementation of a registration process or to any specific set of information that may be associated with an entity. The screen shots, data structures, and flowcharts described herein are intended only to illustrate some of the many types of information that may be associated with an entity. In alternate embodiments, more or less information may be associated with entities.

The categories entered by the entities during the sign up process or modification process or otherwise gathered by system 200 are also stored in database 262 in the category tables 274. FIGS. 29A-B show an example of how an entity may enter categories using the main category selector 2910A-B, main subcategory selector 2912A-B, and main add category checkbox 2914A-B. FIG. 39 is an exemplary data structure showing the layout of exemplary category entries 3900 in the category table 274 of the database 262 of the system 200 in FIG. 2. Each category entry 3900 consists of a category numeric ID field 3910, entity reference ID field 3820, and category field 3930. In the described embodiment, the main category and subcategory are entered in the same category field 3930. In alternative embodiments, they may be entered in separate fields in category entries 3900. Furthermore, additional levels of subcategories to the subcategory may be added. The value in category numeric ID field 3910 is used to give each category used a unique identifier in the database 262. The value in entity reference ID field 3820 is equal to a value in entity numeric ID field 3710 of an entity in the business tables 270 of the database 262 so that each entry in the category fields 3930 may be related to a specific entity and linked with other information about the entity, such as that described hereinabove with reference to FIGS. 37-38.

Figure 40:
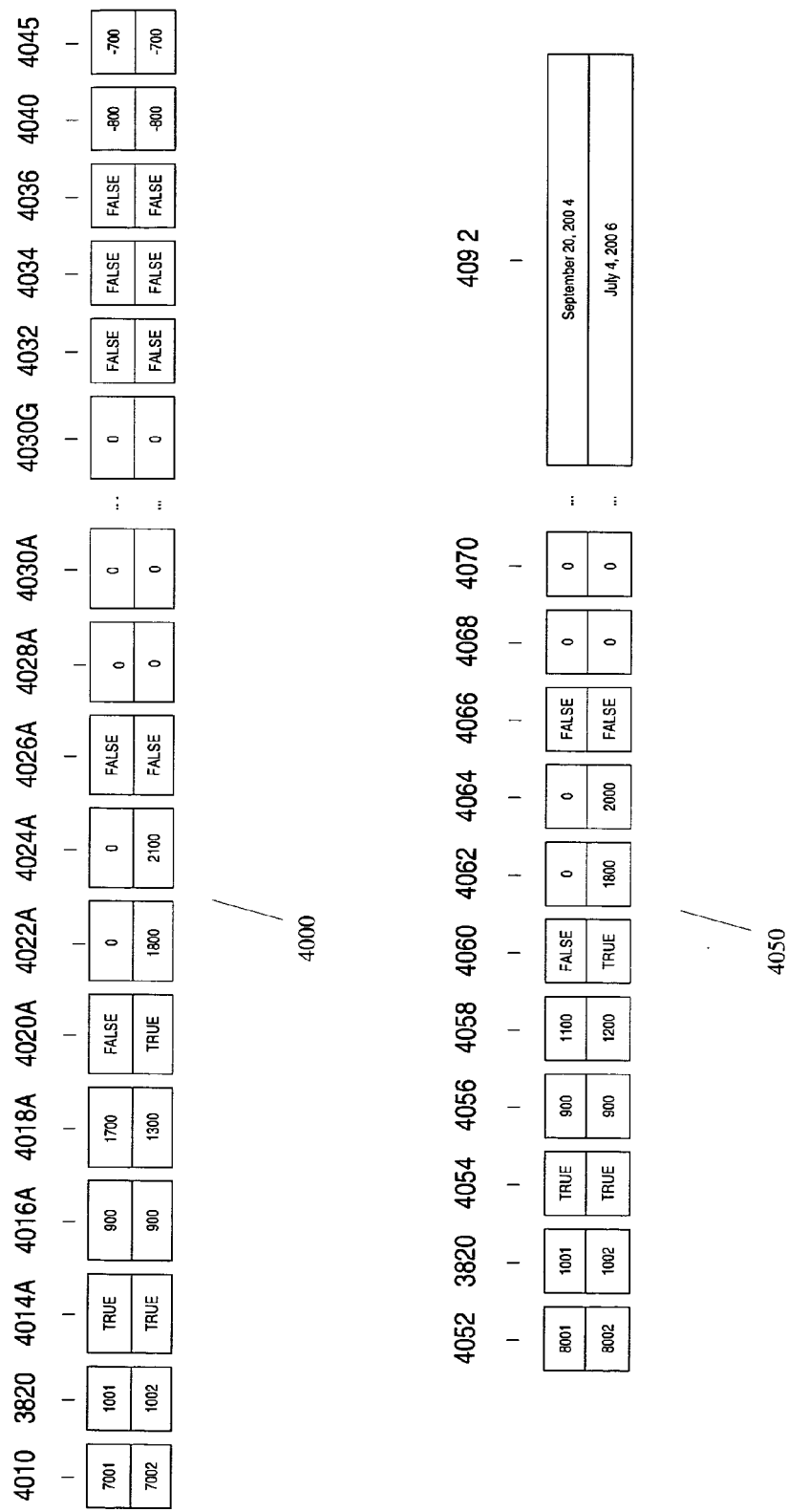
FIG. 40 is an exemplary data structure showing the layout of entries in the hours table of the database.

FIG. 40 is an exemplary data structure showing the layout of exemplary standard hours entries 4000 and exemplary exceptional hours entries 4050 in the hours table 276 of the database 262 of the system 200 in FIG. 2. In the described embodiment, each entry 4000 and 4050 contains fields for three opening and closing times for each day of the week, and fields for indicators describing which of the three time ranges for which the entity is open. This allows entries that describe operating hours of entities that open for business, close, and then re-open again in the same day, handling cases such as lunchtime closings or special evening hours. In other embodiments, additional fields may be added to accommodate additional time ranges or some ranges may be removed. All times are stored as local times in the time zone of entity. In the described embodiment, the times are stored as integers with one minute resolution in 24 hour format, so that 9:00 am is 900, 8:59 am is 859, 3:30 pm is 1530, midnight is 0, noon is 1200, etc . . . . All times may be stored as values greater than 2359, in which case they are taken modulo 2400, so that 2400 is equivalent to 0 or midnight, 2600 is equivalent to 200 or 2:00 am, 3800 is equivalent to 1400 or 2:00 pm, etc . . . . Using values greater than 2359 can be useful when an operating hour range crosses days, for example a store that is open from 9:00 pm to 2:00 am may be represented as 2100-2600. Such a range can also be stored as 2100-200 and handled as a special case.

Each standard entry 4000 consists of the following fields: a standard hours numeric ID 4010, entity reference ID 3820, Monday IsOpen 1 indicator 4014A (which indicates whether the entity is open on Monday), Monday Open 1 time 4016A (which indicates the range 1 open time for Monday), Monday Close 1 time 4018A (which indicates the range 1 close time for Monday), Monday IsOpen 2 indicator 4020A (which indicates that Monday has a range 2 open/closing time), Monday Open 2 time 4022A (which indicates the range 2 open time for Monday when applicable), Monday Close 2 time 4024A (which indicates the range 2 close time for Monday when applicable), Monday IsOpen 3 indicator 4026A (which indicates that Monday has a range 3 open/close time), Monday Open 3 time 4028A (which indicates the range 3 open time when applicable), Monday Close 3 time 4030A (which indicates the range 3 close time for Monday when applicable) and similar entries for the rest of the week, with a suffix B for Tuesday, C for Wednesday, D for Thursday and so on, ending with Sunday Close 3 4030G.

Each standard entry 4000 also includes an offset from Greenwich Mean Time (GMT) 4040, and a Daylight Savings Time offset from Greenwich Mean Time 4045 which are used to adjust the operating hours of entities (stored in the local time zone of the entity's location), such as for use in different time zones. When Daylight Savings Time is in effect, the Daylight Savings Time offset from Greenwich Mean Time 4045 is used to adjust GMT time to local time, and when Daylight Savings Time is not in effect, the offset from Greenwich Mean Time 4040 is used to adjust GMT time to the local time. To adjust from local time to GMT time, the values are subtracted (instead of added) to the local time. The two values are the same for entities located in areas that do not observe Daylight Savings Time. The system 200 may assign these offsets 4040 and 4045 to an entity based on its location (determined from its public address by the geocoder 256 or manually selected by the entity as described hereinbelow beginning with reference to FIG. 55) and information in the geographic data 280 which contains the locations of timezones and Daylight Savings Time areas of the country or world. The locations of all U.S. Time zones, including Daylight Savings Time status, are freely available in the well-known shapefile format from the U.S. Geological Survey. The entity may also simply enter the timezone and/or Daylight Savings Time observation information of their location when they enroll in the system 200 through account manager 250 (this is not shown in the enrollment web pages 240 of FIGS. 28-36). In one embodiment of the present invention, the server 130 determines if and when Daylight Savings Time is in effect (and therefore, which offset to use) for an entity at its geographic location based on its system clock 109, the time zone of the center of the viewable map 300, and well known operating system or programming language library function calls like gettimeofday( ) and localtime( ); other embodiments may read information on when Daylight Savings Time is in effect from a file, database, or other source.

Each standard entry 4000 further includes a Currently Open indicator field 4032, a Currently Closed indicator field 4034, and an Open 24 Hours indicator field 4036. These indicator fields 4032, 4034, and 4036, when containing values "True" indicate that the entries in the three time range fields for each day (4014A-G, 4016A-G, 4018A-G, 4020A-G, 4022A-G, 4024A-G, 4026A-G, 4028A-G, 4030A-G) for the entity are not to be followed, but are superseded by the values of these higher priority indicator fields 4032, 4034, and 4036, which may be updated by the entity through normal/open/closed selector 3616.

Exceptional entries 4050 are used to store the operating hours for dates that do not follow the standard operating hours for an entity. This can happen for holidays, vacations, and any other special occasion. Not all entities will have an exceptional entry 4050, and those that do may have any number of them, or a limited number of them (such as 50) as the service provider of system 200 may stipulate. These dates with exceptional hours are hereafter sometimes referred to as SpecialDay. Each exceptional entry 4050 consists of the following fields: a unique exceptional hours numeric ID 4052, entity reference ID 3820, exceptional date indicator 4092 (which indicates the date of the Special Day described in the exceptional entry 4050), SpecialDay IsOpen 1 indicator 4054 (which indicates whether the entity is open on Special Day), SpecialDay Open 1 time 4056 (which indicates the range 1 open time for Special Day), SpecialDay Close 1 time 4058 (which indicates the range 1 close time for SpecialDay), SpecialDay IsOpen 2 indicator 4060 (which indicates that SpecialDay has a range 2 open/closing time), SpecialDay Open 2 time 4062 (which indicates the range 2 open time for SpecialDay when applicable), SpecialDay Close 2 time 4064 (which indicates the range 2 close time for SpecialDay when applicable), SpecialDay IsOpen 3 indicator 4066 (which indicates that SpecialDay has a range 3 open/close time), SpecialDay Open 3 time 4068 (which indicates the range 3 open time when applicable), and SpecialDay Close 3 time 4070 (which indicates the range 3 close time for SpecialDay when applicable). The entry may also have an exceptional day name field 4098 (not shown), which can store the name of the exceptional day. In another embodiment, the exceptional date indicator field 4092 may be replaced by two indicator fields, the exceptional date range begin indicator field 4094 and the exceptional date range end indicator field 4096 (neither are shown) which may be used to indicate the dates of the Special Day described in the exceptional entry 4050. When these two range indicators are used, all dates between (and including) the two indicators will share the SpecialDay opening and closing times of the exceptional entry 4050; in the case of exceptions of a single day, the two indicators are both set to the same value.

The value in entity reference ID field 3820 is equal to a value in entity numeric field ID 3710 of an entity in the business tables 270 of the database 262 so that the hours for the entry 4000 and 4050 may be related to a specific entity and linked with other information about the entity, such as that described hereinabove with reference to FIG. 37. In the example shown in the described embodiment, Paradise Cleaners is open from 9:00-17:00 on Mondays, using the local time at the public address of Paradise Cleaners. When Daylight Savings Time is in effect, this local time is −7 hours offset from GMT, and when Daylight Savings Time is not in effect, this time is −8 hours offset from GMT. Paradise Cleaners is open from 9:00-11:00 on Sep. 20, 2004, and has no overriding currently open/closed indicator (since the values in Currently Open indicator 4032 and Currently Closed indicator 4034 are both "FALSE"). Al's Hardware is open from 9:00-13:00 and 18:00-21:00 on Mondays, local time at the public address (which is −8 hours offset from GMT regularly and −7 hours offset from GMT during Daylight Savings Time), and is open from 9:00-12:00 and 18:00-20:00 on Jul. 4, 2006, and has no overriding currently open/closed indicator (since the values in Currently Open indicator 4032 and Currently Closed indicator 4034 are both "FALSE").

In an embodiment of the present invention, the values of the exemplary standard hours entries 4000 may be entered through a web page 240 such as is shown hereinabove in FIGS. 30A-30B, and the values of the exemplary exceptional hours entries 4050 may be entered through a web page 240 such as is shown hereinabove in FIG. 31. Values for open/closed indicator 3010 for Monday is stored in Monday IsOpen 1 indicator 4014A. The values for the opening and closing times in 3012A and 3014A, respectively, are stored in Monday Open 1 time 4016A and Monday Close 1 time 4018A, respectively. The values for the opening and closing times in 3012B and 3014B, respectively, are stored in Monday Open 2 time 4022A and Monday Close 2 time 4024A, and the opening and closing times in 3012C and 3014C are stored in Monday Open 3 time 4028A and Monday Close 3 time 4030A, respectively. The values in Monday IsOpen 2 indicator 4020A and Monday IsOpen 3 indicator 4026A are "true" if the corresponding times in 3012B and 3014B or 3012C and 3014C are filled. If "Same as Monday" is selected in "Use Monday hours" selector 3030 for Tuesday, then the fields 4014B, 4016B, 4018B, 4020B, 4022B, 4024B, 4026B, 4028B, and 4030B are filled with the corresponding values for Monday. The values entered in FIG. 30A for other days of the week and the fields in standard entry 4000 correspond in a similar fashion. Value for the 24 hour checkbox 3002 is stored in the open 24 hours indicator field 4036. The value selected by normal/open/closed selector 3616 is stored in Currently Open indicator 4032 (the value is true if "open" is selected in normal/open/closed selector and false otherwise) and Currently Closed indicator 4034 (the value is true if "closed" is selected in normal/open/closed selector and false otherwise).

The values for the exceptional hours correspond similarly to the standard hours values, except that the value for the exceptional date entered in exceptional begin date form 3104 (and displayed in the exceptional day date display 3060) is stored in exceptional date indicator field 4092, and the value for the exceptional day name entered in exceptional day name form 3102 (and displayed in the exceptional day name display 3052) is stored in the exceptional day name field 4098 (not shown), and if the exceptional consists of a range, the values entered in exceptional begin date form 3104 and exceptional end date form 3114 are stored in the exceptional date range begin indicator field 4094 and the exceptional date range end indicator field 4096, respectively.

Figure 41:
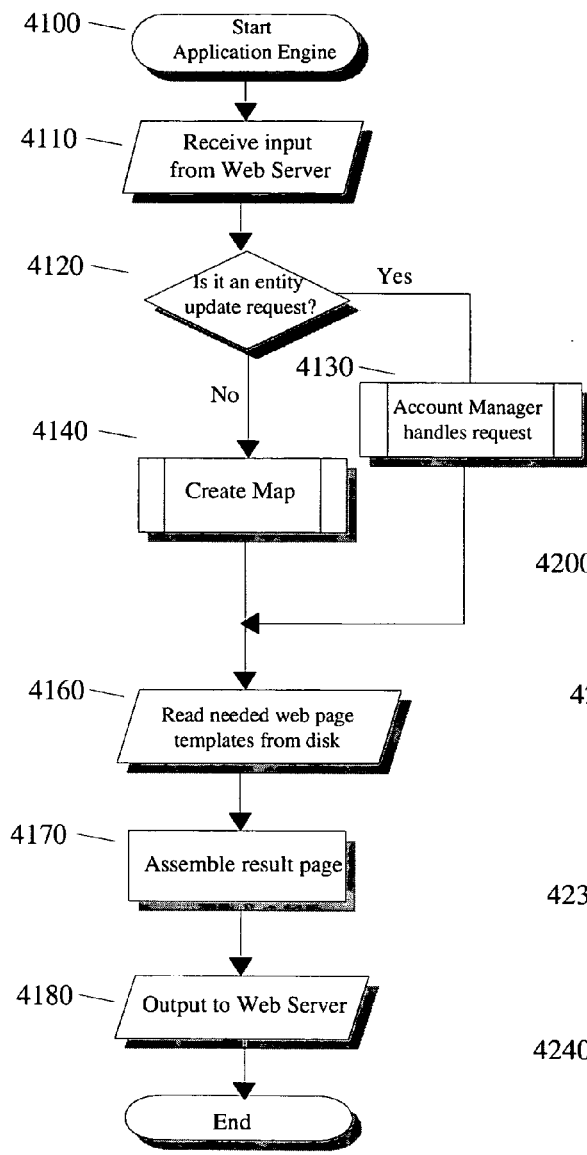
FIG. 41 is an exemplary flow diagram of a method for managing a request and presenting entity information.

FIG. 41 is an exemplary flow diagram of a method 4100 for presenting or managing entity information for use in an application engine 242 (shown in FIG. 2) in accordance with the present invention. The application engine 242 receives input from a web server 248 which received a request from a client 202 web browser 204 (block 4110) through internetwork 220 or intranetwork 222. In an embodiment of the present invention, a request may include such elements as an address query 924, a search query 804, interface clicks, a queried time, updates (such as in the enrollment or modification process) or requests for entity or user information, session identifiers or session information, or combinations of these items. Session information is data from the client 202 web browser 204 that is preserved across subsequent accesses. Session identifiers are unique identifiers assigned to users when they first access the web server 248. The session identifier for a user is either stored in a cookie on the user side or is propagated in the URL. The session information (such as the current latitude and longitude of the viewable map 300, the current zoom level, the account ID 2160 of the logged-in user, . . . , etc.) is preserved across requests in a cookie or URL string, or by storing the data in the database 262 or secondary storage 107 along with the session identifier. When a user accesses the web server 248, the server 130 will check whether a specific session identifier has been sent with the request. If this is the case, the prior saved data can be retrieved. Session management may be implemented using the PHP session management routines which are currently available (including source code) from the web site www.php.net. If the request is for an update or request of user or entity information (block 4120), then an account manager 250 handles the request using method 4700 demonstrated hereinbelow with reference to FIG. 47 (block 4130) and the method continues with block 4160. If the request is not for an update or request of user or entity information (block 4120), then a map is created to present the entity information using method 4200 demonstrated hereinbelow with reference to FIG. 42 (block 4140). In the described embodiment of the invention, this map is created using the query engine 252 and the map server 244 to generate the viewable map 300 in accordance with the method described in FIG. 42.

The application engine 242 then reads web page templates needed to produce a web page 240 from the secondary storage 107 of the server 130 (block 4160). These web page templates consist of portions of the HTML code (including Javascript) necessary to produce the needed presentations. Only the parts of the presentation that are the same for each request are included in the web page templates. The HTML elements of the web page templates are not fully functional at this step; the elements will be made functional in the next step, block 4170. For example, in an embodiment of invention, the North panning button 302A will include an image of a North-facing arrow, but will not yet include the necessary Javascript code to effect the pan (since that code will have parameters that depend on the latitude and longitude boundaries of the viewable map 300). One of ordinary skill in the art will appreciate this standard usage of templated HTML pages. In an embodiment of the present invention, these web page templates include (request independent portions of) the elements of the presentation other than the viewable map 300 (e.g., request independent portions of zooming buttons 330-342, panning buttons 302A-H, center map checkbox 328, reference map 324, reference map cursor 322, map time display 348, map scale bar, 304, navigational buttons 306, 308, 310, last map button 348, menu bar 350 and all the associated buttons and options, address entry form 364, find on map button 370, zoom controller 344, zoom level indicator 346, signup button 362, signin/signout button 380, search criteria form 366, quick search button 368, quick search list 702, quick search items 704, highlighted item 706, entity information display 940, slide show button 372, examine map checkbox 426, display address information 604, entity popup 920, address display 1102, display close button 1104, note popup 2610, elements and forms in FIGS. 28-36, . . . , etc.) such as those necessary to produce the web pages 240 described hereinabove with reference to FIGS. 3-36, 54, and 56-58.

The controller 243 of the application engine 242 then assembles the resulting web page 240 by combining the web page templates that were read with both the request dependent information from the database 262 and the remaining portions of the HTML code needed to complete the presentation elements and activate them, and adding an HTML image tag or another type of reference that will display the viewable map 300 (block 4170). This request dependent information from the database 262 includes the information read by the account manager 250, query engine 252, or text search engine 246 (e.g., all the information in entity information display 940, information in all the entity popups 920, contents of note popup 2610 as well as saved favorites for the current user, and all the entity account information displayed in the web pages 240 shown in FIGS. 28-36, including contact name, business name, account ID 2160, passwords, security answer, private and public phone numbers, email addresses, fax number, and address, categories, keywords, standard and exceptional hours of operation, website links, website link titles, taglines, design templates, pictures or photographs, and entity descriptions, . . . , etc.) that is needed to produce the requested web page 240. The remaining HTML code needed to complete the presentation elements consists of the portions of the presentation that vary with each request based on user input and are stored in the session information (e.g., user-selected time, user ID, latitude and longitude of the viewable map 300, the current zoom level, the current search query 804, the address query 924, . . . etc.). For example, the Javascript code necessary to effect the pan of the North panning button 302A may require the latitude and longitude boundaries of the viewable map 300; these values can be read from the session information and added to the web page 240 at this step to complete the presentation. One of ordinary skill in the art will be able to apply this example to the other presentation elements of the web page templates. Finally, the application engine 242 sends the resulting web page 240 back to the web server 248 (block 4180) which then sends the result back to the client 202 for display with the web browser 204. An exemplary product of this method 4100 may be seen in FIG. 11.

One of ordinary skill in the art will readily understand that this method 4100 and the other methods used by it may be modified or merged with other methods, such as the method 4600 for displaying notes on a map, described hereinbelow with relation to FIG. 46, in order to create presentations by the application engine 242.

Multiple servers 130 may be used in a distributed version of the system. In this system, each server 130 (or set of servers 130) would handle a portion of the client requests. In an embodiment of the present invention, the client requests to the servers 130 are geographically distributed, wherein each server 130 runs a map server 244 that handles requests for a specific geographic area. This allows the individual servers 130 to be specialized for a particular area, such as being loaded with geographic data 280 specific to a region of the country or world.

Figure 42:
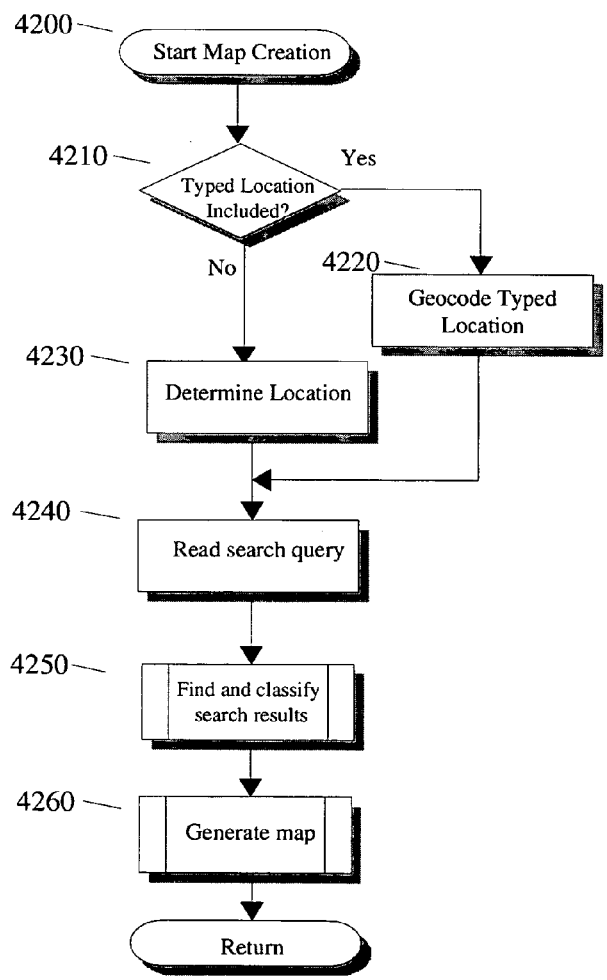
FIG. 42 is an exemplary flow diagram of a method for creating a map for presenting entity information in accordance with the present invention.

FIG. 42 is an exemplary flow diagram of a method 4200 for creating a map, such as for use in the method of FIG. 41 (where it follows block 4120). In the described embodiment, this method 4200 is performed using a request from client 202. In other embodiments, the request may not come from a client 202, but will instead be passed into this method as a function call or subroutine parameter or parameters. If the request includes a typed location (block 4210), such as the address query 924 entered into the address entry form 364 as shown in FIG. 9, the address is converted into latitude and longitude coordinates (block 4220), known in the art as geocoding. The geocoder 256 may be used to perform this step, as is described more fully hereinabove with relation to FIG. 2. If the request does not include a typed location (block 4210), the location of the queried area is determined from the request by the controller 243, using details such as the previous location or the user interface clicks demonstrated hereinabove with relation to FIGS. 3-5 (block 4230). Next, the search query 804 is read from the request if one is included (block 4240), such as the search query 804 entered into the search criteria form 366 shown in FIG. 8. The search results are then found and classified using method 4300 demonstrated hereinbelow with reference to FIG. 43 (block 4250). This method 4300 will use the location and search query 804, if any, previously read by this method 4200. A viewable map 300 is then generated using method 4500 demonstrated more fully hereinbelow with reference to FIG. 45 (block 4260). This viewable map 300 contains a useful presentation of entity information.

By properly following the descriptions of this method 4200 and method 4300, many types of client requests may be handled by system 200, including (but not limited to) those containing only one or more interface clicks, those containing one or more interface clicks and a search query 804, those with only a search query 804, those containing only an address query 924, those containing one or more interface clicks and an address query 924, those containing an address query 924 and a search query 804, or other combinations.

FIG. 43 is an exemplary flow diagram of a method 4300 for performing searches and classifying search results of entity information, such as can be used in the methods of FIGS. 41-42 (where it follows block 4240). In the described embodiment, the query engine 252 and text search engine 246 (shown in FIG. 2) perform this method 4300 to search for entity information using an optional search query 804 from the requesting client 202. In other embodiments, the search query 804 may not come from a client 202, but will instead be passed into this method as a function call or subroutine parameter or parameters. All entities in the geographic area within the search area boundaries (hereinafter referred to as "qualified entities") are found in the database by comparing the latitude 3760 and longitude 3770 of each entity in the data structure described hereinabove with reference to FIG. 37 with the latitude and longitude of the search area boundaries (block 4310). If the entity's latitude and longitude are within that of the search area boundaries, the entity is found. In an embodiment of the invention, when "show notes on map is selected from the note display option 2214, a similar comparison is made to determine which, if any, user notes for the logged-in user are within the search area boundaries using data structures such as the one described hereinbelow with reference to FIG. 51B. In an embodiment of the invention, the search area boundaries are determined by interface clicks and/or address query 924, the zoom level of the viewable map 300, and the width and height of viewable map 300, as set by system 200; in the described embodiment, the search area boundaries are the rectangular area within the viewable map 300. In the preferred embodiment, this search is made faster by the use of a spatial index on the location data (e.g., values in the latitude and longitude fields 3760 and 3770) of the business tables 270 within the database 262. The use of this spatial index is a well known technique in the art, and eliminates many otherwise needed comparisons.

If a search query 804 was not included in the request by the client 202 (block 4320) then control continues with block 4360. If a search query 804 was included in the request by client 202 (block 4320) then, in one embodiment of the invention, the data structures described hereinabove with reference to FIGS. 37-40 are used to find results that match any system-determined search field (block 4330). The value of each keyword field 3830 in keyword entries 3800 for each qualified entity is compared to the search query 804, and if a match is found, the entity within table 3700 whose entity numeric ID field 3710 value is equal to the value of entity reference ID field 3820 of the keyword entry 3800 containing the matching keyword field 3830 value is a matching entity for the search. Similarly, each category and subcategory in category field 3930 in category entries 3900 for each qualified entity is compared to the search query 804, and if a match is found, the entity within business table 270 whose entity numeric ID field 3710 value is equal to the value of entity reference ID field 3820 of the category entry 3900 containing the matching combination of category and/or subcategory field 3930 values is a matching entity for the search.

In order to perform such operations in a database query language (such as the well known SQL language), queries like this may be used (various hardware store queries are shown in the example):

```
Select * from business_table where business_table.id =
keyword_table.ref_id and keyword_table.keyword = 'Hardware' ;
or
Select * from business_table where business_table.id =
category_table.ref_id and category_table.category =
'Retail -- Hardware' ;
```

One of ordinary skill in the art will understand that these query implementations are merely exemplary and can be easily varied to search many different types of data. After searching the keyword tables 272 and category tables 274, all tables with searchable fields are similarly searched; these tables may include other searchable fields such as product availability or web site names. Also, the business name and all other searchable fields in business entries 3700 of each entity in business table 270 is directly compared to the search query 804, and if a match is found, that entity is a matching entity for the search. Such direct comparisons may use a query such as this for each searchable field, where the '%' character is a wildcard that matches any string:

```
Select * from business_table where
business_table.name = '%Hardware%' ;
```

The example shows use of the "name" field of the business table 270, but one of ordinary skill in the art will understand that any other field or combination of fields using the OR operator may also be used to perform the query.

In an embodiment of the present invention, the selection of entities based on geographic area (as in block 4310) may be combined with these queries. This will combine blocks 4310 and 4330 into a single step. One of ordinary skill in the art will understand that there are standard mechanisms for selecting only those entities within a geographic area. Here is an exemplary modification of the previous example that also accounts for a geographic search area, where the area is a rectangular search area bounded within the latitudes min_y and max_y, and longitudes min_x and max_x (e.g., the area within viewable map 300):

```
Select * from business_table where
business_table.name = '%Hardware%' and
(min_y <= business_table.latitude and
business_table.latitude <= max_y and min_x <= business_table.longitude
and business_table.longitude <= max_x);
```

The other exemplary queries may also be enhanced with geographic components in a similar manner. Spatial indexes and other methods may be used to speed up the location comparisons.

The text search engine 246 (shown in FIG. 2) is used to find results where a portion of the information in the entity information display 940 (such as the entity description 912 and entity tagline 908) matches the search query 804 (block 4340). Every matching entity for the search is retained and the rest are discarded (block 4350). This step may also be performed simultaneously with blocks 4330 and/or 4340.

In another embodiment of the present invention, the text search engine 246 is used to find results that match any search field in business tables 270, keyword tables 272, category tables 274 (e.g., entity name, categories, keywords, web site names, . . . , etc.), and all other tables as well as results where a portion of the information in the entity information display 940 matches the search query 804, thus combining blocks 4330 and 4340 into a single step. In this embodiment, the text search engine 246 is used to index all the other searchable fields (e.g., entity name, categories, and keywords, web site names, etc . . . ) in addition to the description in the entity information display 940. In one embodiment, this indexing occurs when the entity enters or modifies their information using the account manager 250, as shown in FIGS. 28-36. Upon submitting the newly entered or modified information, the text search engine 246 indexes all the searchable fields for later searching, such as is done for the entity description as described hereinabove with relation to FIG. 33. In an embodiment of the present invention, this operation may be performed by concatenating the contents of all of the searchable fields into a single document, giving different weights to the various indexed information, and then indexing this combined document. This weighting can be performed by weighting each word in the entity name the highest (such as counting each word as if it appeared 10 times in the combined document), weighting each word in the category or keywords the next highest (such as counting each word as if it appeared 4 times in the combined document), weighting each word in the tagline field 3730 the next highest (such as counting each word as if it appeared 2 times in the combined document), and weighting the entity description the lowest (such as by counting each word as if it appeared once in the combined document). Furthermore, this step (the combination of blocks 4330 and 4340) may be performed using the previously described combination of blocks 4310 and 4330 in place of block 4330, or the previously described combination of blocks 4310 and 4330 may be performed using this combination of blocks 4330 and 4340 in place of block 4330, in order to implement the method in even fewer steps in some embodiments. When this step (the combination of blocks 4330 and 4340) is performed, the text search engine 246 can find all results that match any search field or the information in the entity information display 940 (including entity names, website names, keywords and categories), due to the indexing described. Every matching entity for the search is retained and the rest are discarded (block 4350). This step may also be performed simultaneously with the combination of blocks 4330 and/or 4340 described earlier.

Each matching entity is then classified for presentation based on its associated information (block 4360) using the method demonstrated hereinbelow with reference to FIG. 44 or a similar method. This classification is based on the hours of operation for a business in one embodiment, however any other entity characteristic or relevance of search query results may be used. Finally, this routine returns the set of classified search results (block 4370) and the method completes. In one embodiment, such as is described hereinbelow with reference to FIG. 49, all the entities located geographically in the viewable map 300 in system 200 are displayed on a map using this classification.

One of ordinary skill in the art will see that the data structure of FIGS. 37-40 are easily extended or implemented in alternative forms to enable one to store further types of search data about entities such as (but not limited to) product information, names, titles, email, pictures, contact information, or any entity characteristics, and that the query engine 252 or the text search engine 246 can be used to perform searches of this data. Database tables are only one of many embodiments and can be replaced with any data structure that is able to store information and associate it with a related entity.

FIG. 44 is an exemplary flow diagram of a method 4400 for classifying business hours, such as for use in the method of FIG. 43 (where it follows block 4350). In the described embodiment, the query engine 252 (shown in FIG. 2) performs this method 4400 using a request from client 202. In other embodiments, the request may not come from a client 202, but will instead be passed into this method as a function call or subroutine parameter or parameters. The queried time (which, in the described embodiment, is the date and time displayed in map time display 374 when the request is submitted) is parsed from the given request, for later use (block 4410). The user can query another time by changing the time on viewable map 300, as described hereinabove with reference to FIGS. 13-14. The method described hereinbelow with reference to FIG. 59 has further details about using times other than the present for the queried time and classifying hours while taking different time zones into consideration. The parsed values of the queried time are then compared with values previously stored in the business tables 270 and hours tables 276 of database 262 (shown in FIG. 2) for each qualified entity, or if a search query 804 is included, each matched entity in the search area boundaries, using the data structures described hereinabove with reference to FIGS. 37 and 40. Based on the results of a computation that compares the parsed search values from block 4410 with the values stored in the structures of the database 262, a classification decision is made (block 4420). This comparison may be done using an SQL query similar to the following pseudocode (the examples use a queried time of Monday, Sep. 20, 2004 at 9:45 am for the entity shown in FIG. 37 with id 1001).

The following is a simplified piece of pseudocode that handles standard hours only:

```
Select * from business_table, hours_table, value where
        business_table.id = 1001 and
        business_table.id = hours_table.ref_id and
    if
                (MondayIsOpen1 = true and (MondayOpen1 <=
                 945 < MondayClose1))
            or (MondayIsOpen2 = true and (MondayOpen2 <=
                 945 < MondayClose2))
            or (MondayIsOpen3 = true and (MondayOpen3 <=
                 945 < MondayClose3))
    then
        value = 'Open'
    else
        value = 'Closed'
    end
;
```

The pseudocode above classifies an entity by finding the standard hours entry 4000 for the entity (the entry 4000 that contains a value for entity reference ID field 3820 that equals the value in entity numeric ID field 3710 for the entity entry 3700 of the entity) and then determining if the queried time falls within any of the time ranges for the day of the week (in the entity's local time zone) of the queried time. One of ordinary skill in the art will understand that all the times and time comparisons referred to in the preceding and subsequent queries will be adjusted to properly account for different time zones and Daylight Savings Time adjustments in some embodiments. This may be done in various standard ways, such as by converting all compared times into a common time zone (like GMT or the local time of the entity being compared) or adding an appropriate offset to each time as necessary, using modular arithmetic to normalize times as required. Special handling may also be needed for other unusual circumstances that may be supported, such as allowing a time range that crosses two separate days, such as from 10:00 pm until 2:00 am. Further descriptions of such methods are described hereinbelow with reference to FIG. 59.

The next piece of pseudocode demonstrates further operating hours related functionality, including exceptional dates, current normal/open/closed indicators, and entities open around the clock as described hereinabove with relation to FIGS. 30-32. All of the pseudocode can be implemented with relational database techniques that are well known in the art, such as can be done in the SQL language; the portions that refer to the existence of matching entries can be implemented with outer joins. One of ordinary skill in the art will see that various database indexes may be used to improve the performance of such queries.

```
Select * from business_table, hours_table, value
            where business_table.id = 1001
    and
        if ( business_table.id = hours_table.ref_id and
            (hours_table.currentlyOpen = true or
            (hours_table.currentlyClosed = false and hours_table.open24Hours = true )) )
        then
                    value = 'Open'
        else if (business_table.id = hours_table.ref_id and hours_table.currentlyClosed = true)
        then
                    value = 'Closed'
        else
```

```
        if
            (
                no_matching_entry_exists(special_hours_table.specialDate = ' 2004-09-20' )
                        and business_table.id = hours_table.ref_id and
                (
                    (MondayIsOpen1 = true and (MondayOpen1 <= 945 < MondayClose1))
                    or (MondayIsOpen2 = true and (MondayOpen2 <= 945 < MondayClose2))
                    or (MondayIsOpen3 = true and (MondayOpen3 <= 945 < MondayClose3))
                )
            )
            or
            (
                matching_entry_exists(special_hours_table.specialDate = ' 2004-09-20' )
                        and business_table.id = special_hours_table.ref_id and
                (
                    (SpecialDayIsOpen1 = true and (SpecialDayOpen1 <= 945 < SpecialDayClose1))
                    or (SpecialDayIsOpen2 = true and (SpecialDayOpen2 <= 945 < SpecialDayClose2))
                    or (SpecialDayIsOpen3 = true and (SpecialDayOpen3 <= 945 < SpecialDayClose3))
                )
            )
        then
            value = ' Open'
        else
            value = ' Closed'
        end
end
;
```

The key steps of this pseudocode to classify an entity are to first see if the entity has been explicitly marked currently open (if the value in Currently Open Indicator field 4032 is "true"), currently closed (if the value in Currently Closed Indicator field 4034 is "true"), or open 24 hours (if the value in Open 24 Hours Indicator field 4036 is "true"), in that order, in the standard hours entry 4000 for the entity. If so, the entity is classified as such. If not, a search is carried out for the entity to see if there are any exceptional hours entries 4050 that contain an entity reference ID field 3820 with a value that is equal to the value of the entity numeric ID field 3710 of the entity. If there is such a matching exceptional hours entry 4050, and the value in the exceptional date indicator 4092 of the matching entry 4050 matches the date of the queried time, then the queried time is checked to see if it falls within the any of the open time ranges of the special date. If it does, then the entity is classified as open; if not, the entity is classified as closed. If there are no matching exceptional hours entries 4050, or if the date of the queried time does not correspond to the value in the exceptional date indicator 4092 for any matching exceptional hours entry 4050, then the matching standard hours entry 4000 is examined. There is a standard hours entry 4000 for each entity in the system 200, so there will always be such a match. If the queried time falls within the open time ranges of the day of the week of the queried time in the entity's standard hours entry 4000, the entity is classified as open; if not, the entity is classify as closed.

The time ranges for exceptional hours entry 4050 are searched by evaluating whether any of the values of the indicator fields 4054, 4060, or 4066 are "true," and whether for any of the indicator fields 4054, 4060, 4066 whose value is "true," the corresponding time ranges 4056, 4058, 4062, 4064, 4068, and 4070 include the queried time. If so, the entity is classified as open. If not, the entity is classified as closed. The hours for the standard hours entry 4000 are searched in a similar manner by checking to see if any of the values in the indicators 4014, 4020, and 4026 that correspond to the day of the week of the queried time are "true," and whether if for any of the indicator fields 4014, 4020, and 4026 whose value is "true," the corresponding time ranges 4016, 4018, 4022, 4024, 4028, 4030 include the time of the queried time. In embodiments where the exceptional date indicator field 4092 has been replaced by the exceptional date range begin indicator field 4094 and exceptional date range end indicator field 4096, as described hereinabove with relation to FIG. 40, then the comparison (special_hours_table.specialDate='2004-09-20') is replaced by the comparison (special_hours_table.specialDateRangeBegin<='2004-09-20' and '2004-09-20'<=special_hours_table.specialDateRangeEnd).

In alternative embodiment, the Open 24 Hours Indicator field 4036 does not take precedence over the exceptional hours entry 4050. Rather, the order of precedence is as follows: Currently Open Indicator field 4032, Currently Closed Indicator field 4034, fields in the exceptional hours entry 4050, Open 24 Hours Indicator field 4036, and then the standard hours fields 4014A-G, 4016A-G, 4018A-G, 4020A-G, 4022A-G, 4024A-G, 4026A-G, 4028A-G, and 4030A-G. Alternative embodiments may use other orders of precedence.

Alternatively, one of ordinary skill in the art will appreciate that a similar method could be used to classify any other form of information associated with an entity. Such similar methods would replace or supplement the Day and Time of block 4410 with other relevant criteria for an entity characteristic or search criteria relevance, the decision of block 4420 with an appropriate decision based on the relevant criteria, and the classifications of blocks 4430 and 4440 with appropriate classifications for the relevant criteria. The data structures of FIGS. 37 and 40 that provide a mechanism for storing hours of operation for a business are easily modifiable by one of ordinary skill in the art to store any other type of information desirable for classifying entities. In particular, they can be modified to store information such as can be represented in a table or by a rule that can be evaluated to automatically classify the entity based on user queries. For example, a movie theater may specify the dates and playing times of various movies for storage in the database 262. The system 200 can then classify and display the theater as a green dot when a user-queried movie has a starting time within half an hour, and as a red dot when the queried movie is not starting in the next half hour. Multiple movies may be represented on the viewable map 300 by multiple symbols or a textual listing of them. Or as another example, an apartment complex may enter the number of apartments of various types available as of a given date for storage in the database 262. A user could then query for all available two-bedroom apartments on a given date, and see a green dot or a numeric representation of the number available when there is availability, and a red dot when there is no availability. By storing the availability dates, even if there are no apartments available today, a user can still check availability for a date in the future. As another example, a store may enter a quantity available of a certain product. This quantity can then be lowered each time a sale is made of the product and reported to the system 200 using a computer readable message, such as a specially formatted email, HTTP message, or any other method.

The following is a description that summarizes the modifications necessary to produce an embodiment of the invention that uses product availability as a classification criteria and may help clarify the modifications needed for other types of classifications as well. In one such embodiment, block 4410 would parse the desired product from the search (such as a search for a "hammer"). The decision of block 4420 would use a classification method like this (assuming a search for a "hammer"):

```
Select * from business_table, current_availability from
availability_table where
    business_table.id = availability_table.ref_id and
    availability_table.available_product='hammer'
;
```

In such an embodiment, the database would be modified to include product availability tables with entries like the keyword entries 3800 described hereinabove with reference to FIG. 38. The entries would be modified so that the keyword field 3830 is changed to an available_product field and a new field (current_availability) representing the current availability of the product would be added and would contain such values as "Available" or "Not Available" as appropriate. The classifications of blocks 4430 and 4440 would then search these availability tables and return these values of "Available" or "Not Available". The remainder of the method would be unchanged.

Alternate embodiments that use event times for the classification criteria could use a similar method. This could be used, for example, to find all the movies that are starting in the next half hour. In one such embodiment, after block 4410 parses the time and date, a new step would be added. This step would parse any additional parameters the user has sent (such as the desired length of the time range the user is interested in). The embodiment would have an additional table, the event_table, with fields including the name of the event (such as the name of a movie or concert), a reference ID to refer to an entity in the business tables 270, a begin_time and end_time (for storing the starting and ending times of the event in a similar manner to the times in the hours tables 276 described hereinabove with reference to FIG. 40), and a DateRangeBegin and DateRangeEnd (to store the beginning and ending dates of the event, stored in the same manner as the exceptional date range begin indicator field 4094 and the exceptional date range end indicator field 4096 described above). Multiple begin_time and end_time fields could be implemented to account for events (such as movies) that occur multiple times in the same day, while multiple entries (each with their own date fields) could be used for events that occur multiple times on different days. Such embodiments may present a list of the events (such as movies) that match, with event times or driving time estimates, to the user, such as could be shown in the entity popup 920 or entity information display 940 of entities that have matching results.

The following exemplary pseudocode uses a queried time of Monday, Sep. 20, 2004 at 6:00 pm for a movie theater entity (not shown in FIG. 37) with id 1006, and desired time range length of half an hour:

```
length := 30 minutes; // length of time period user interested in
Select * from business_table, event_table, value where
    business_table.id = 1006 and
    business_table.id = event_table.ref_id and
    if
        (event_table.DateRangeBegin <= '2004-09-20' <=
        event_table.DateRangeEnd)
        and
        (Time <= event_table.begin_time < Time + length )
    then
        value = 'Open'
    else
        value = 'Closed'
    end
;
```

This pseudocode will add the desired half hour length of 30 minutes to the queried time, and find all the events on September 20 that start between 6:00 and 6:30.

In other embodiments dealing with time queries (including events and hours of operation), the travel time needed to arrive at the entity may be accounted for. This is advantageous because a user may not be able to attend an event starting immediately, or for business hours, the user may be most interested in whether or not the business will be open when they arrive at the business, not whether it is open right now, particularly if the business is far away and near closing time. This travel time may be accounted for as a fixed time that is given by the user or assigned by the system. For example, 20 minutes may be added to each queried time. Or, a more accurate estimate can be made based on either the distance or estimated driving time. In some embodiments, this distance is approximated as a straight line distance between two latitude longitude points using geometric formulas and multiplied by a rate factor (as shown in the pseudocode below) to determine the estimated travel time. This factor could be determined by the user or system; values like 20 minutes/mile for walking or 2 minutes/mile for driving are possible values. Other embodiments may use an estimated driving time based on a driving route (instead of a straight line distance) from the user's location to the location of the entity or estimates based on airline flight times for very distant events or entities. Other embodiments may use other estimation methods or combinations of methods. The system may also add a constant value to the travel time to account for errors and user preferences; more conservative users may use a higher value, while more aggressive users may use a smaller or even negative value to lower the travel time estimate. The following is a modified version of the previous exemplary pseudocode, adding the travel time accounting just described:

```
// find approximate distance in miles between two
latitude/longitude pairs
approx_distance(location0, location1) {
    x := 69.1 * (lat2 - lat1);
    y := 69.1 * (lon2 - lon1) * cos(lat1/57.3) ;
```

-continued

```
        return sqrt(x * x + y * y);
    }
    location := center of viewable map 300 or other latitude/longitude
        point of user
    factor := 2; // minutes per mile for driving time
    drive_time := factor *
    approx_distance(entity_location, queried_location)
    comfort_time := 10 minutes
    offset := drive_time + comfort_time; // or fixed value, like 20 minutes
    length := 30 minutes; // length of time period user interested in
    Select * from business_table, event_table, value where
            business_table.id = 1006 and
            business_table.id = event_table.ref_id and
        if
            (event_table.DateRangeBegin <= ' 2004-09-20' <=
                event_table.DateRangeEnd)
            and
            (Time + offset <= event_table.begin_time < Time +
                offset + length)
        then
            value = 'Open'
        else
            value = 'Closed'
        end
    ;
```

This pseudocode will add the desired half hour length of 30 minutes to the queried time, and also add the estimated travel time to the entity. So, for a movie theater that is approximately 11 miles away from the user's queried location, a drive time of 2*11, or 22 minutes is calculated, and an additional 10 minutes is added for comfort, giving an offset of 32 minutes. This finds all the movies on September 20 that start in the half hour between 6:32 and 7:02. For a movie theater that is approximately 27 miles away from the user, an offset of 27*2+10, or 64 minutes, is calculated and movies with starting times from 7:04 to 7:34 are returned for the user. These examples show how a user can simply query for a movie at 6:00 pm using their home address, and find all the movies with show times they can easily make it to.

For operating hours queries, the travel time offset calculated is simply added to the user's queried time. All the hour range comparisons are then modified to use this new time. The following is an example for an entity that is 11 miles away from a user's location and is open from 9:00 am until 5:00 pm. Without accounting for travel time, a user query at 4:45 pm would classify the entity as open. Using the method described above to account for travel time with a comfort time of ten minutes, the queried time of 4:45 pm would be offset by 11*2+10 minutes to 5:17 pm (which is when the user can expect to arrive at the entity), causing the entity to be classified as closed.

Other modifications are possible. For example, if a user wishes to find all the events they can attend and still be home by a certain time, the begin_time can be replaced by the end time in the previous methods, and the formula changed to this: event_table.end_time<=Time−offset. To be home by the same time, but maximize the length of time out, the query can still use a time range length duration, like this: Time−offset−length<=event_table.end_time<=Time−offset, where length is the difference between the time when the user must be home and the earliest time they would like to be home.

Some exemplary comparisons are now shown. For a user who needs to be home by 11 pm, the time comparisons for these cases would be (for an entity 11 miles away, and so offset by 11*2+10, or 32 minutes):

event.end_time<=10:28 pm or

9:58<=event.end_time<=10:28 pm, for a user who would like to be home no earlier than 10:30 (length=30 minutes).

When the travel time offsets are not used, the comparisons are made like this:

event.end_time<=11:00 pm or

10:30 pm<=event.end_time<=11:00 pm.

These methods may also be combined in a straightforward manner to answer a question like: If I leave at a queried time (e.g., 8 pm), what movies can I make it to and still be home by 11:00 pm? For an entity with an offset of 32 minutes, the comparison would then be:

(8:32<=event.begin_time<=9:02) and (event.end_time<=10:28).

Other time comparisons may be made in a similar manner that will be clear to one of ordinary skill in the art.

FIG. 45 is an exemplary flow diagram of a method 4500 for generating viewable maps 300 for use in the method of FIG. 42. In the described embodiment, this method 4500 for creating viewable maps 300 is performed by map server 244 (shown in FIG. 2). The map server reads the necessary geographic data 280 from any combination of files stored in secondary storage 107 or the database 262 as necessary. The map server 244 uses this geographic data 280 to render map features (such as landmark elements 410, large road element 412, railroad element 414, standard road element 416, points of interest 420, city and state boundaries, bodies of water, . . . , etc.) into an image (block 4520). If the note display option 2214 is currently labeled "Hide Notes on Map", which means "Show Notes on Map" is currently selected (as described in FIG. 25), the note representations 2502 are also rendered at this time, as described in block 4690 of the method 4600 shown in FIG. 46. If previously classified entity data is available, such as that produced by the methods described hereinabove with relation to FIGS. 43-44, (block 4530) then this classified data is rendered into the image with appropriate distinguishing symbols, such as a red or green entity dot 930R or 930G as described in FIG. 9 (block 4540), otherwise this step is skipped. The map labels for the map features (such as road names, city names, landmark names, entity names 424, note representation titles 2504, . . . , etc.) are then rendered into the image (block 4550). Finally, the map server 244 outputs the map image (block 4550), which is a PNG formatted image file in the preferred embodiment. This image is later displayed as a viewable map 300 on a web page 240 after the controller 243 of the application engine 242 adds an HTML image tag referencing the image when it assembles the web page 240 (as described with reference to the block 4170 shown in FIG. 41). FIG. 4 shows such a rendered image as its viewable map 300 (without search query 804).

This description covers the method of the preferred embodiment of a map server 244. Alternative embodiments will be apparent to one of ordinary skill in the art. For example, different forms of geographic data 280 may be placed in either of the secondary storage 107 or the database 262, depending on the data's characteristics. In the embodiment described above, some maps are able to be drawn solely with geographic data 280 from secondary storage (those that do not contain entity data), while others include data from the database 262. In alternative embodiments, any combination of geographic data 280 repositories may be used to create the maps, including but not limited to secondary storage 107, databases 262, main memory 104, system memory, or repositories connected over a computer network. Alternative embodiments may also draw the map features, classified data, or map labels in any order, possibly interleaving the items of these types in any order, while the geographic data 280 may be read wholly or in part at any step of the process. The map image may be output in any common digital image format, including raster formats such as GIF or JPEG as well as vector formats such as Postscript, PDF, Flash, SVG, or VRML.

Another embodiment of the present invention is one in which the map server 244 does not generate a map image to be rendered by the client web browser 204 but instead creates the directives necessary to instruct a program running on the client 202 (possibly as a plugin within the web browser 204) to render the image directly from geographic data 280 transmitted over the network 220. In such a version, much of the functionality of the map server is run on the client 202 instead of the server 130, but such an embodiment would be seen as analogous to the described embodiment of FIG. 44 by one of ordinary skill in the art.

Additionally, the map server 244 may include a caching mechanism as is well known in the art. This caching mechanism consists of storing maps and their identifying data (e.g., their latitude and longitude boundaries, search query, and map creation time) in the secondary storage 107 after they have been drawn. Then, these previously drawn map images are returned immediately from secondary storage 107 when a request for a map with the same identifying characteristics (e.g., map boundaries and search query) is received, instead of being drawn at the time of the request. The images of maps that have been partially drawn may also be stored in the cache and used as the starting point for map rendering as well. For example, maps of areas with no entities rendered on them may be stored in the cache and used as a starting point to create maps of the same areas with different entities on them, as could be used for different search queries for the same area. The cache may have older map images removed periodically based on the map creation time. As an optimization technique, the map server 244 may also determine to return a cached map for a nearby area (such as an area covering more than 90% of the requested area) if one exists, instead of drawing an entire new map for the requested area. These caching mechanisms would be especially useful in the distributed, geographically partitioned system described hereinabove with reference to FIG. 41, as this would make the cache more effective since it is easier to cache the maps for a smaller area than for a larger one.

FIG. 46 is an exemplary flow diagram of a method 4600 for displaying notes on a map in accordance with the present invention. In one embodiment, it is initiated upon a user selecting the "show notes on map" option of view my notes option 2212 discussed in reference to FIG. 22. First, the account manager 250 (shown in FIG. 2) checks to see if a user is currently logged in to the system 200 (block 4610). In an embodiment of the present invention, this check is performed by examining the session information stored in the database 262 that is associated with a session identifier stored in a cookie transmitted from the client web browser 204 to the server 130. One of ordinary skill in the art will recognize that saving a session identifier in a cookie that uniquely identifies session information in a database is a standard method for handling user logins. If a user is not logged in (block 4610), a login screen is presented (block 4620). An attempt is then made to authenticate the user's login, and the user is logged in if the attempt is successful (block 4630) and the method continues with block 4610. In the preferred embodiment, this authentication is performed using a username and password, however other methods will be apparent to one of ordinary skill in the art.

If the user is correctly logged in (block 4610), a further check is performed by the query engine 250 (shown in FIG. 2) to see if the user has any notes saved in the system (block 4640). In an embodiment of the invention, the notes are stored in the note entries 5105 (shown in FIG. 51) of the user account tables 278 of the database 262. A user's notes can then be found by searching for note entries 5105 whose value in the account ID field 5125 matches the account ID 2160 of the logged in user. If the user does not have any notes saved, the method completes (block 4650). If the user does have saved notes, the query engine 250 determines if any are within the search area boundaries (e.g., the viewable area of the viewable map 300) by comparing the locations associated with the stored notes (such as are in the latitude field 5135 and longitude field 5145) with the location of the search area boundaries (block 4660). If no notes are within the search area boundaries, the method completes (block 4670). If there are user notes within the search area boundaries, the locations and contents of those notes are retrieved from the matching note entries 5105 of the user account tables 278 of the database 262 (block 4680). The map server 244 then draws a map with the included user notes on it, such as with the note representation 2502 and note title 2504 shown in FIG. 25 (block 4690). In alternate embodiments, the map server 244 may also independently determine which notes are in the area of the viewable map 300. The UI 254 also adds further elements for presenting the user notes, such as the note popup 2610 (including its contents) shown in FIG. 26. The value of the note title field 5155 may be used for the note title 2504, and the value of the note content field 5165 may be used to populate the note popup 2610. The method then completes.

This method 4600 may be merged with the other methods described herein to combine the features described. In one such embodiment of the invention, the portions of this method 4600 described with reference to blocks 4610 through 4680 are performed between the steps described with reference to blocks 4510 and 4520 of method 4500 (shown in FIG. 45). The steps performed by the map server 244 in block 4690 are then performed during block 4550 of method 4500, while the steps performed by the UI 254 in block 4690 are performed in blocks 4160 and 4170 of the method 4100 shown in FIG. 41, completing this merged embodiment.

Figure 47:
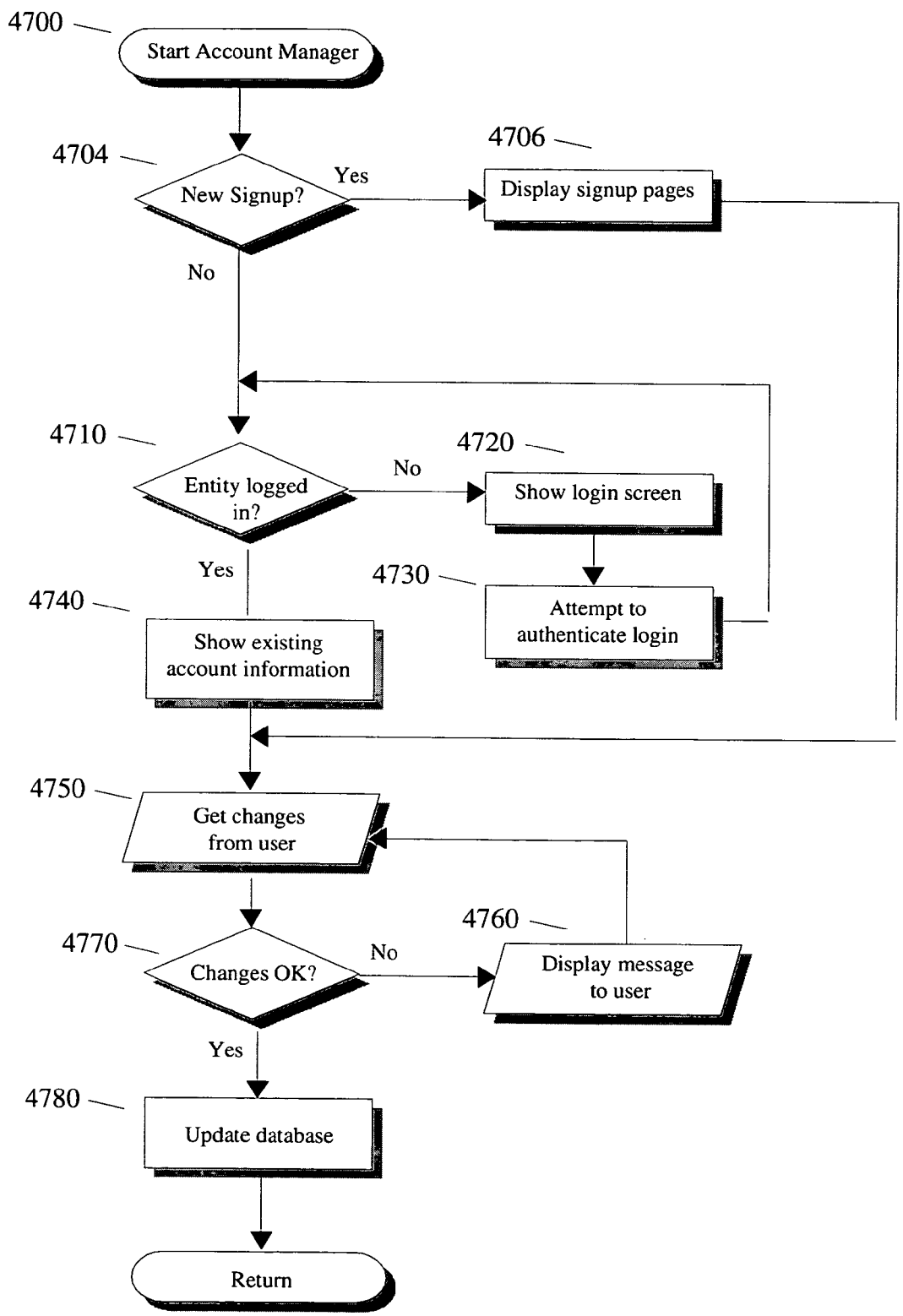
FIG. 47 is an exemplary flow diagram of a method for managing entity accounts in accordance with the present invention.

FIG. 47 is an exemplary flow diagram of a method 4700 for enrolling and managing entity and user accounts for use by an account manager 250 (shown in FIG. 2) for use in the method of FIG. 41. This method can be used to enter new information, or view or modify existing information for an entity or user of the system. Generally, the following descriptions apply to entities, but one of ordinary skill in the art will be able to create sign up and modification pages for users, such as are well known in the art. If the request is for a new entity signup (block 4704) (as can be triggered by an entity clicking on business signup button 362), the signup pages are displayed as described hereinabove with reference to FIGS. 28-35 (block 4706) and the method continues with block 4750. If the request is for an account modification (not a signup) (block 4704) (as can be triggered by an entity clicking on signin/signout button 380), the entity is checked to see if it is currently logged in to the system 200 (block 4710). In the preferred embodiment, the application engine controller 243 performs this check by examining the session information stored in the database 262 that is associated with the identifier stored in the cookie transmitted from the client web browser 204 to the server 130. If the entity is not logged in (block 4710), a login screen is presented (block 4720). An attempt is then made to authenticate the user's login, and the user is logged in if the attempt is successful (block 4730) and the method continues with block 4710. In the preferred embodiment, this authentication is performed using a username and password, however other methods will be apparent to one of ordinary skill in the art.

If the entity is logged in (block 4710), existing account information is shown (block 4740). Any changes are entered by the entity using web pages 240 such as those shown in FIGS. 28-36 (block 4750). As discussed with reference to FIGS. 28-36, an entity is able to, among other operations, enter names, categories, keywords; enter hours information including multiple opening and closing times within the same day, exceptional day hours, including ranges for exceptional days; mark the current day as open or closed until further notice; and move the entity representation 422 and entity name 424 to a location desired by the entity. The changes are stored in database tables as described hereinabove with reference to FIGS. 37-40. The system verifies the user's changes (block 4770). If the changes contain improper or invalid values, an error message is displayed to the user (block 4760) and the method continues with block 4750. If the changes are valid, they are associated with the account ID 2160 that is currently logged in or chosen (as in the case of new enrollments), the database 262 is updated (block 4780), and the method completes.

The account manager 250 may also be used to manage an entire group of entities at the same time. For example, the manager of a chain of stores may log in to a single account to manage the information for all of the chain's stores at once. In this case, the web pages 240, such as those shown in FIGS. 28-36, would update multiple records in the database 262, for every entity being managed by the logged in user.

Figures 48, 49:
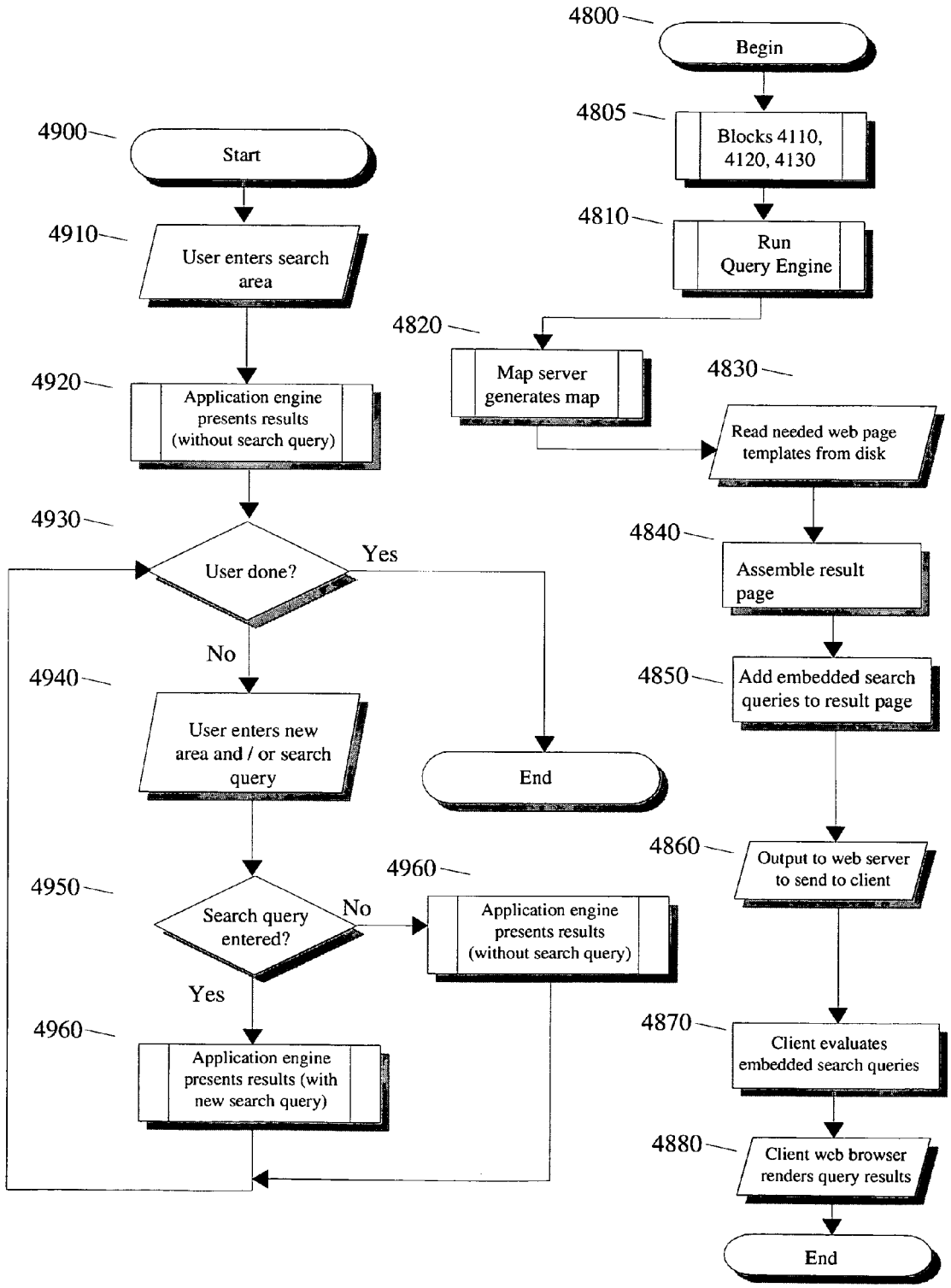
FIG. 48 is an exemplary flow diagram of an alternative method to that of FIG. 41 for presenting entity information which provides a distributed query mechanism.
FIG. 49 is an exemplary flow diagram of a method for presenting entity information wherein a plurality of result entities are placed on a map for browsing in accordance with the present invention.

FIG. 48 is an exemplary flow diagram of an alternative method 4800 for presenting entity information for use in an application engine 242 (shown in FIG. 2) wherein classified information for a plurality of result entities is displayed symbolically on a map in accordance with the present invention. This method 4800 is useful for providing a distributed query mechanism to potentially lower the search query load on the server 130, as well as potentially providing more or better control of detailed entity information by allowing the entities to store it on their own computers.

This alternative method begins identically to the method 4100 described hereinabove with reference to FIG. 41. First, method 4100 is used until control reaches its block 4140 (block 4805). Control then continues with the corresponding block 4810 of this method 4800. A query engine 252 is run for the request using the method demonstrated hereinabove with reference to FIG. 43, modified, however, to skip blocks 4360 and 4370 which are used to classify the results (block 4810). The request and results from the query engine 252 (which, if no search query 804 is included, consists of all the qualified entities after completion of block 4320, or if a search query 804 is included, consists of all matching entities within the search area boundaries after completion of block 4350) are sent to the map server 244 to generate a viewable map 300 using the method demonstrated hereinbelow with reference to FIG. 45, noting that classified data is not available (block 4820). The application engine 242 then reads web page templates needed to produce the presentation from the secondary storage 107 of the server 130 (block 4830). This is done in the same manner as block 4160 of method 4100. The controller 243 of the application engine 242 then assembles the resulting web page 240 by combining the web page templates that were read with any request dependent information, in the same manner as block 4170 (block 4840). The application engine 242 then adds embedded search queries and corresponding evaluation instructions (described below) to the resulting web page 240 that will allow the client 202 to add further information to the page later (block 4850). These embedded queries are added by the query engine 252 for entities of interest. In the described embodiment, one corresponding embedded query is added for each entity, however any number may be added, including zero. These entities of interest may be determined by the query engine 252 by simply choosing all the qualified entities, by choosing all the matching entities in the search area boundaries, by choosing all the entities that are in the same category as the category of the search query, or by another method. The application engine 242 sends the resulting web page 240 back to the web server 248 to return the result to the client 202 (block 4860). The client receives the result page, and evaluates the embedded search queries by connecting over a network to retrieve additional information (block 4870). These connections are made to servers run by the entities corresponding to the embedded search queries; the servers are typically web servers connected to the Internet. Based on the results returned from the servers run by the entities, which contain query results such as product or service availability encoded in computer readable form, the client 202 web browser 204 evaluates the results using the included instructions, and then renders images or symbols representing the results onto the viewable map 300 (block 4880), and the method completes.

In the preferred embodiment of the present invention, the actions of blocks 4870 and 4880 are performed by Javascript code in the web page that is triggered when the page loads using the Javascript OnLoad( ) method. This code uses the embedded search queries to connect to a plurality of server computers corresponding to entities on the map (such as server computers for the various retail stores), retrieves appropriate responses from them, and then replaces various place holders on the map with appropriate distinguishing symbols, such as a red or green entity dot 930R or 930G as described in FIG. 9, or any other representation discussed with reference to FIG. 9.

In the preferred embodiment, the embedded search queries are represented by a web site URL or URLs that return a well known result for the search query 804, such as "http://www.example.com/cgi-bin/availablity.pl?product=tennis+racket" (using "tennis racket" as search query 804) for an entity whose domain name is www.example.com. The response is a coded HTML document containing a Javascript string variable named "www_example_com_result", set to a well known string value, such as ("1" or "0") for available and not available, respectively, although an XML document describing the availability also is appropriate. This variable name is the domain name of the entity, with invalid Javascript variable name characters replaced by an underscore and the string "_result" appended to the end. The client 202 may do a Javascript include source of each of the embedded search queries in order to evaluate their results. The client can then evaluate each of the embedded query results by comparing the corresponding result string variable for each result to "0" and "1", and based on this evaluation, replace the source of various corresponding <img> tags positioned over the map image in the HTML document with URL references to images of either red or green dots that are present on the web server 248. This causes a display similar to the one shown in FIG. 11 to be created with the red and green dot images acting as entity dots 930R and 930G; however, the red and green dots are additional images within the resulting web page 240, and are not rendered into the viewable map 300 as the entity dots 930R and 930G are in the method shown in FIG. 41. One of ordinary skill in the art will understand that this method is but one of many similar methods that may be used to cause clients 202 to evaluate embedded search queries from the server 130 and display an appropriate result.

An example of how this method can be used will now be described. A user selects a viewable map 300 that contains within the map area two entities: the retail stores Walmart and Target. The user then enters "tennis racket" as search query 804, and a new web page with a viewable map 300 and embedded search queries for Walmart and Target is generated and sent to the client 202 by the application engine 242. The viewable map 300 does not yet include any classified results or entity displays for the entities Walmart and Target. The client web browser 204 then connects to Walmart and Target servers to search for availability of tennis rackets by evaluating the embedded search queries. Separate servers for Walmart and Target each then return documents containing a result variable set to "0" or "1", with "1" symbolizing that the entity has one or more tennis rackets available and "0" symbolizing that the entity has no tennis rackets available. The web browser 204 evaluates these results, and then renders a green entity dot 930G on top of the viewable map 300 at the location of the entity with a tennis racket available, and a red entity dot 930R on top of the viewable map 300 at the location of the entity without a tennis racket available.

In one embodiment of the invention, the query "tennis racket" is evaluated by the query engine 252 to determine which entities receive a corresponding embedded search query for the client 202 to evaluate. This can be decided based on entity preferences. For example, each entity may select a number of search queries it wishes to receive queries for, possibly by purchasing the queries it wishes to respond to from the service provider of system 200. Entities may not wish to respond to all queries since some are not relevant (e.g., restaurants would not want to respond to a query for "tennis rackets") and responding to many queries may be cost prohibitive. Other embodiments of the invention may not return a result value (such as "0" or "1") to be evaluated by instructions on the client 202, but will instead directly return a URL for a graphical image representing the status of the query, such as a red or green dot, an image of the product or service being queried in the search query 804, or other text or symbol for the client 202 to display. This URL may refer to a file on the server of the entity or any other server the client 202 can connect to view the graphical image.

This alternative method 4800 can be used in conjunction with the standard method 4100 in any combination in order to render classified data from the database 262 onto the map by the system's server 130 as in 4100, or by to have data from servers run by entities rendered onto the map by the client 202 as in method 4800. Also, in alternative embodiments, the embedded search queries may refer to the system server 130 and do not have to refer to distinct servers 130 run by entities.

FIG. 49 is an exemplary flow diagram of a method 4900 for presenting entity information wherein a plurality of result entities are placed on a map for browsing, in accordance with the present invention. As demonstrated hereinabove with reference to FIGS. 3-5 and 9, a user enters the search area either textually as an address query 924 into the address entry form 364 or via user interface clicks. The application engine 242 presents the results without using a search query 804 through the use of the method described hereinabove with reference to FIG. 41 (block 4920). An example of such a result is shown in FIG. 11. The user can now peruse the viewable map 300 to examine the presented information. If the user is done viewing the results (block 4930) the method is complete. If the user is not done viewing the results, the method continues with block 4940. The user then enters a new search area using the graphical elements described previously or an address query 924, a search query 804 as shown in FIG. 8 to filter the results using the search criteria form 366, or both a new search area and a search query 804 (block 4940). The user may also click the quick search button 368 to expose the quick search list 702 and select one of the quick search item 704 as described hereinabove with relation to FIG. 7. If a search query 804 was entered by the user, the application engine 242 presents the new results using the new search query 804 using the method of FIG. 41 (block 4950). If a search query 804 was not entered by the user, the application engine 242 presents the new results without using a search query as in block 4920 (block 4960). The method continues with block 4930 until the user is done.

FIG. 50 is an exemplary flow diagram of a method 5000 for finding matching search results when no matches are apparent on a viewable map 300 (as shown in FIG. 2) in a system for presenting entity information 200 according to an embodiment of the present invention. An initial search is performed by the application engine 242 of FIG. 2 using the method shown in FIG. 41, relying in particular on the query engine 252 and the text search engine 246 and their associated method shown in FIG. 43 (block 5010). If any matching listings are found (block 5020) the resulting viewable map 300 is displayed (block 5030) and the method completes. If no matching listings are found (block 5020) then the search area is increased by changing it to an area centered at the same location but with a larger radius (block 5040). If the resulting search area is too large for the system (block 5050) a message is shown indicating that no results could be found (block 5060) and the method completes. If the area is not too large (block 5050) then the search is performed again (block 5070) by the application engine 242, using the method shown in FIG. 41, and the method continues with block 5020. For example, if a search for "Japanese restaurants" in the area shown in the viewable map 300 in FIG. 5 finds no results, then the search area may be automatically increased to a view showing an area of viewable map 300 at zoom level 10, or to an area of ever larger radius at zoom level 9, as shown in FIG. 4.

FIG. 51A is an exemplary flow diagram of a method 5100 for adding notes 2502 (as described with reference to FIGS. 23-26) to a given location in accordance with the present invention. To use this method, the user must have already registered an account with the account manager 250 and be currently logged in to system 200. The user chooses the new note" option 2210 as shown in FIG. 22 (block 5110). The user then enters the note title in note title entry form 2302 and note text in note text entry form 2304 as shown in FIG. 23 (block 5120). If the user is not satisfied with the note, the note cancel button 2308 is pressed (block 5130) and the method completes. If the user is satisfied with the note, the note save button 2306 is pressed (block 5130) and the user clicks on the viewable map 300 to enter the note location (block 5140). The current user's account is found in the database 262 (block 5150). The note title and content and its corresponding location are then stored in the database 262, associated with the account ID 2160 of the user that is logged in, in accordance with the data structures demonstrated hereinbelow with reference to FIG. 51B (block 5160).

FIG. 51B is an exemplary data structure showing the layout of exemplary note entries 5105 in the user account tables 278 of the database 262 of the system 200 in FIG. 2. In the exemplary embodiment shown in FIG. 51B, each entry 5105 consists of a note numeric ID field 5115, account ID field 5125 (for account ID 2160), latitude field 5135, longitude field 5145, note title field 5155, and note content field 5165. Each entry 5105 may also have additional data fields which can include any other data collected relating to a user note. One of ordinary skill in the art will readily understand how any additional note data desired for use by the system 200 can be stored in the note entries 5105 of database 262 with standard methods. The numeric IDs are randomly or sequentially assigned for each note and provide a unique number for identifying each note. In the described embodiment, the values of the note title field 5155 (entered in note title entry form 2302) and note content field 5165 (entered in note text entry form 2304) are entered using method 5100, as described hereinabove with reference to FIG. 51A. The values of the latitude field 5135 and the longitude field 5145 are calculated by the controller 243, based on the user interface clicks used to place the note on the viewable map 300. The account ID field 5125 is filled with the value of the account ID 2160 of the currently logged in user. In another embodiment of the present invention, the latitude field 5135 and longitude field 5145 values may also be modified using the interface and method for manually selecting geographic locations described more fully hereinbelow with relation to FIGS. 54-58. In the described embodiment, the user with the account ID 2160 of "jane" has stored a note titled "Parking" with the contents "Street parking is easy to find." This note has a note numeric ID field 5115 with the value 12002 and can be displayed on the viewable map 300 whenever the viewable map 300 includes the location 7.8512N, 122.5378W and the user "jane" is logged in.

Figure 52:
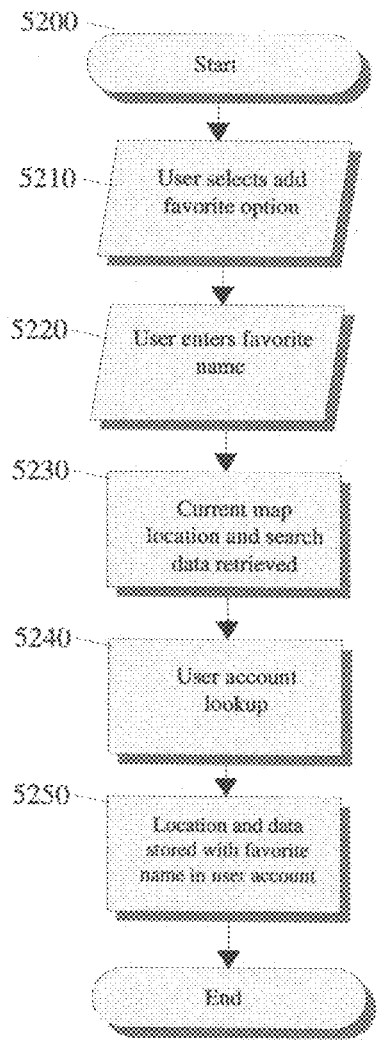
FIG. 52 is an exemplary flow diagram of a method for saving favorite locations in accordance with the present invention.

FIG. 52 is an exemplary flow diagram of a method 5200 for saving favorite locations in accordance with the present invention. This method only applies to users that have already registered an account with the account manager 250 of the system 200, and are currently logged in to the system. The method begins with the user pressing the save location" option 2220 as shown in FIG. 20A (block 5210). The user enters the favorite name (block 5220). The application engine controller 243 retrieves the current location and search area boundaries of the viewable map 300 and the current search data (such as the address query 924 and search query 804, if any) from the server's 130 memory 104 or the session information (as described hereinabove with reference to FIG. 41) (block 5230). The current user's account is found in user table 278 in database 262 (block 5240). The favorite name entered, location, and search data are stored in the user account information in the database 262, associated with the account ID 2160 of the user that is logged in (block 5250) in a data structure similar to the one shown in FIG. 51B.

Figure 53:
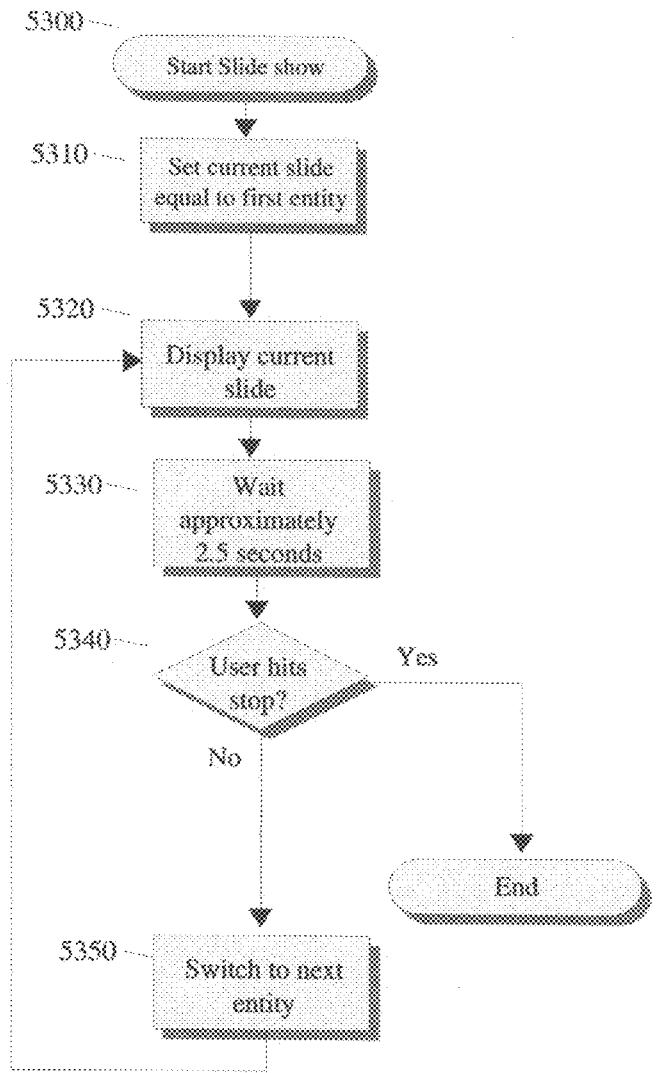
FIG. 53 is an exemplary flow diagram of a method for presenting entity information in the form of a slide show of a plurality of result entities in accordance with the present invention.

FIG. 53 is an exemplary flow diagram of a method 5300 for presenting entity information in the form of a slide show of a plurality of result entities (as described hereinabove with reference to FIG. 9) in accordance with the present invention. In an embodiment of the present invention, the use of this method is triggered by the user pressing the slide show button 372. The application engine UI 254 sets the current slide to the entity information display 940 of the first entity in a fixed ordering of the displayed entities, represented by entity representations 422 in one embodiment (block 5310). This ordering can be any fixed ordering of the entities; in one embodiment the entities are ranked in order by length of time they have been entered into the system, with the oldest entity first. The UI 254 displays the current slide which display the entity information display 940 of the current entity (block 5320). The UI 254 then waits for a delay period (block 5330). This delay can be any comfortable amount, possibly based on a user's preference. An embodiment of the present invention uses a delay of approximately 2.5 seconds. The user may stop the slide show by clicking the entity information close button 902 (block 5340) and the method completes, or else the UI 254 sets the current slide to the entity information display 940 of the next entity in the ordering (block 5350). The method then continues with block 5320. In other embodiments of the present invention, additional features are added to the slide show, such as those described hereinabove with reference to FIG. 9.

In creating map-based presentations such as those in accordance with the present invention, sometimes the entity representations 422 and entity names 424 may be placed quite close together, as can be seen in FIG. 4. One way to alleviate this situation is to provide more zoomed in views of the viewable map 300, such as that seen in FIG. 5. In addition to this, enhanced entity placements may be used.

Figure 54:
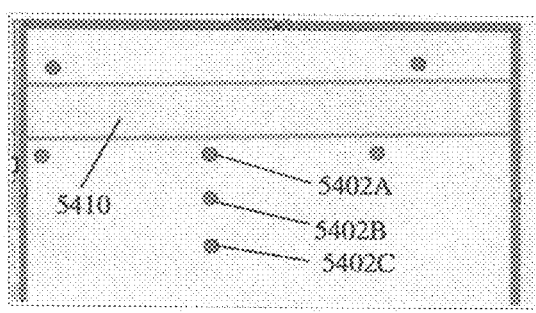
FIG. 54 is a screen shot of an exemplary web page showing an enhanced entity representation placement technique.

FIG. 54 shows one such exemplary entity placement technique. All of the entity representations 5402A, 5402B, and 5402C share the same address. This can occur when, for example, the entities are in different suites within the same building. The system 200 has automatically placed the first entity representation 5402A near the street 5410. When later entities with the same address enroll in the system 200, the controller 243 of the application engine 242 automatically places their entity representations 5402B and 5402C perpendicular to the street 5410 back at a distance from the first entity representation 5402A. This may be done by using well known geometric techniques for calculating line slopes. An alternative embodiment of the present invention reads the suite numbers of entities with the same address (e.g., # 301A, # 302B, #305A, etc . . . ) and places the entity representations 5402A, 5402B, 5402C in the order of the suite numbers, with the suite with the lowest number or letter closest to the beginning of the alphabet closest to the street, and the suite with the highest number or letter closest to the end of the alphabet farthest from the street, with the number taking precedence over the letters, and so on. For example, the suite numbers in the above example would be arranged as follows, with the first suite being placed closest to the street 5410: #301A, #302B, #305A. Alternative embodiments may use alternative methods of arrangement.

Figure 55:
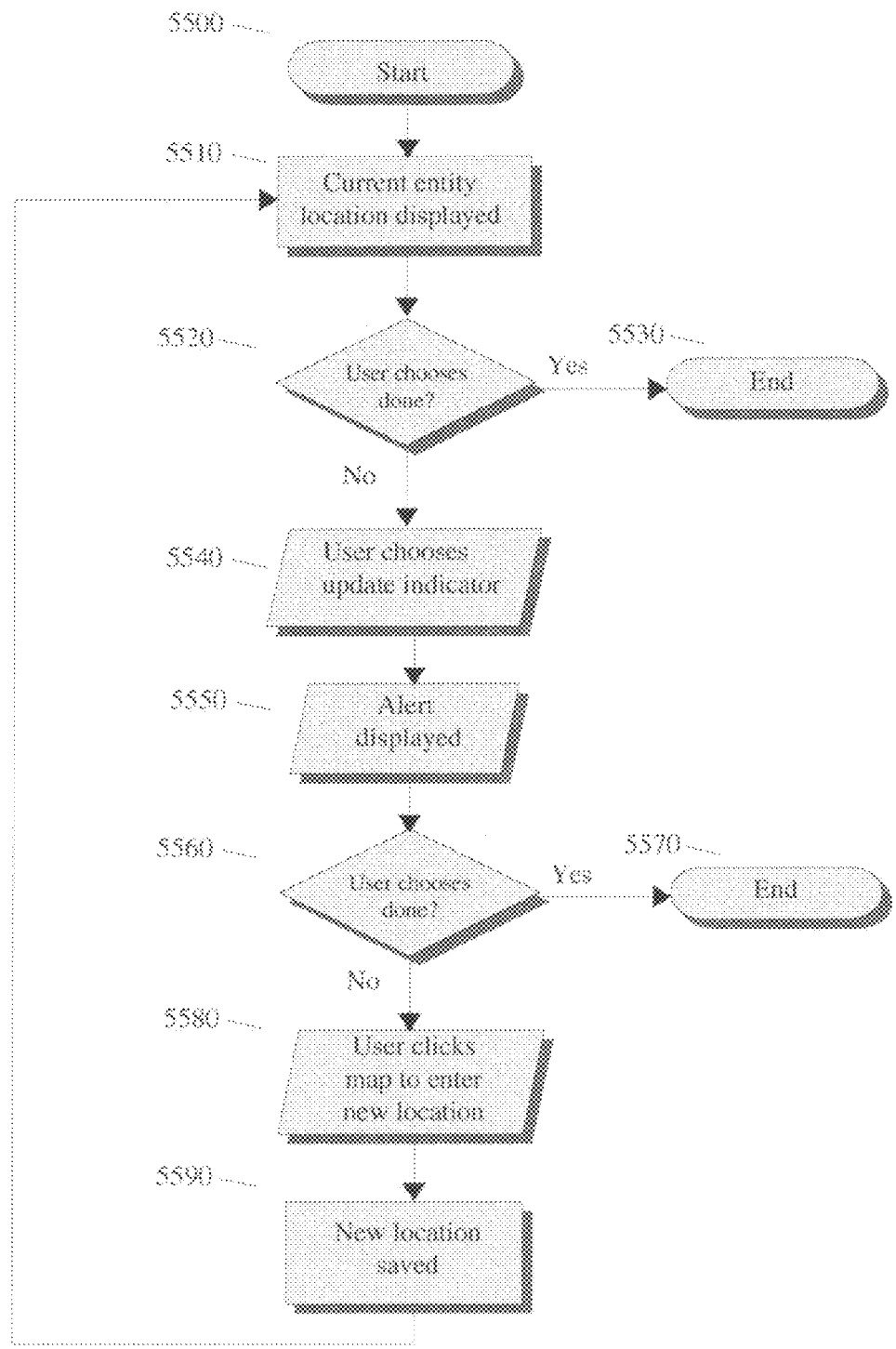
FIG. 55 is an exemplary flow diagram of a method for performing manual detailed placement of an entity representation in accordance with the present invention.
Figure 56:
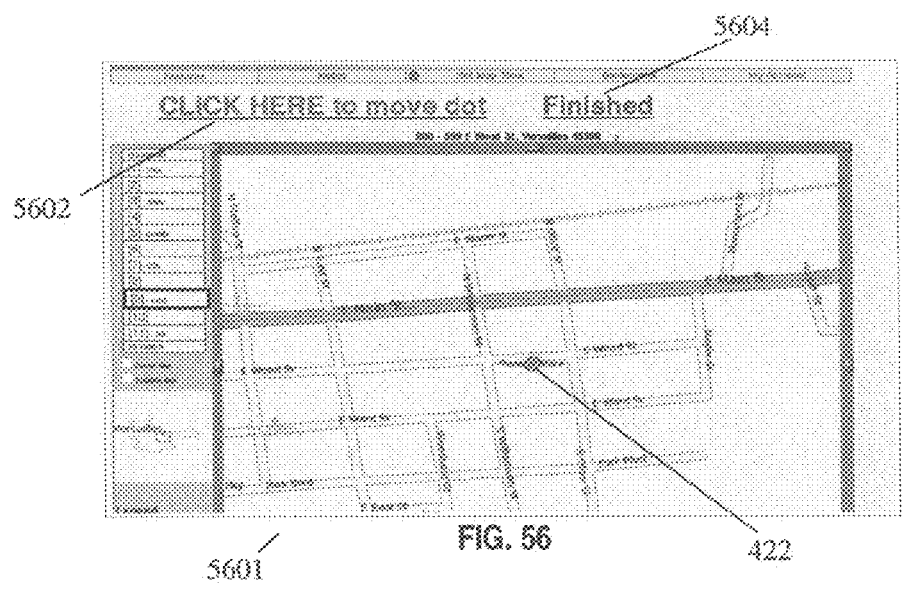
FIG. 56 is a screen shot of an exemplary web page showing the current location of an entity representation that is to be manually placed.
Figure 57:
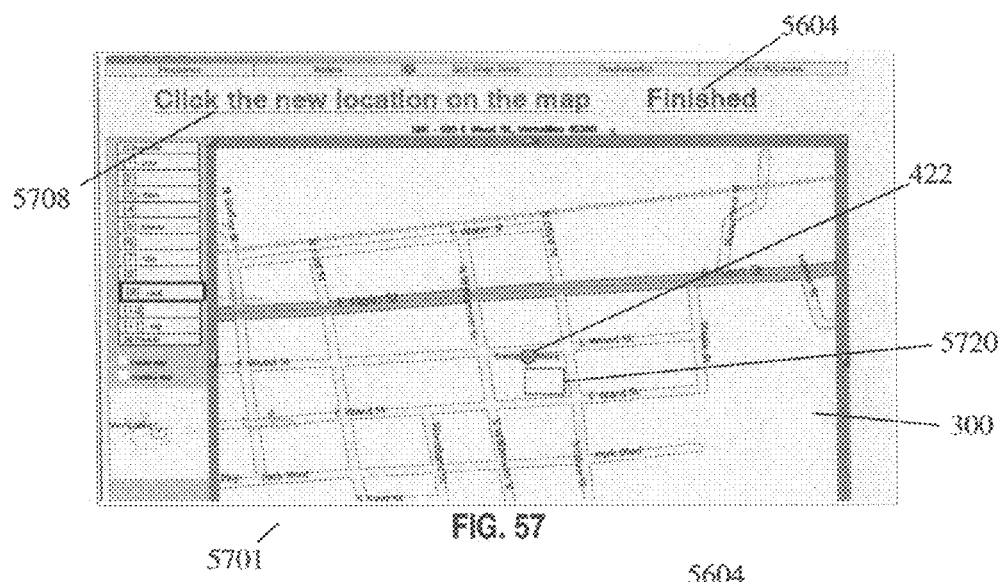
FIG. 57 is a screen shot of an exemplary web page showing an entity representation that is currently being manually placed.
Figure 58:
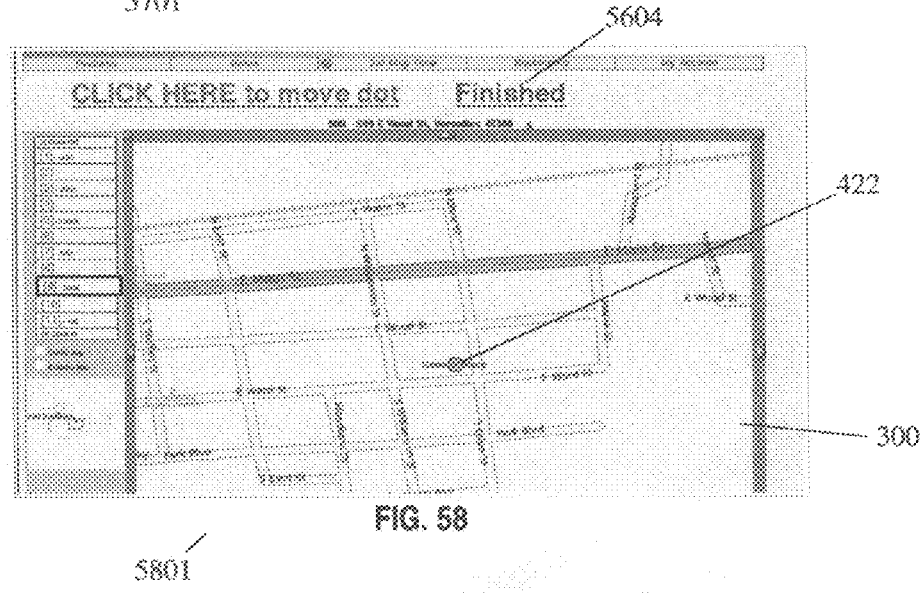
FIG. 58 is a screen shot of an exemplary web page showing an entity representation that has just been manually placed.

While this perpendicular placement technique is useful, it is also advantageous to allow more detailed manual placement of the entity representations 422. FIG. 55 shows an exemplary flow diagram of one such method 5500 for manually placing the entity representation 422 in accordance with the present invention. FIGS. 56-58 provide further screen shots of system 200 utilizing this method. When the user of system 200 indicates to the account manager 250 that the entity location needs updating, this method 5500 can be used. First, the current entity location is displayed on viewable map 300 (block 5510), such as is seen in FIG. 56. In an embodiment of the present invention, the web page 240 of FIG. 56 can be accessed by clicking on edit button 3422 of thumbnail map 3440 in FIG. 34A. If the user indicates that they are done updating the location (block 5520), such as by clicking the Finished button 5604 (shown in FIG. 56), the method completes (block 5530). If the user is not done (block 5520), they can indicate that they would like to change the location of their entity representation 422 location, such as by clicking the update indicator 5602, as shown in screen shot 5601 of FIG. 56 (block 5540). An alert 5708 (shown in screen shot 5701 of FIG. 57) is then displayed by the system (block 5550), reminding the user to change the location. If the user indicates that they are done updating the location (block 5560), such as by clicking the Finished button 5604 (as shown in screen shot 5701 of FIG. 57), the method completes (block 5570). If the user is not done (block 5560), the user can click on the map to indicate the new location of their entity representation 422 (block 5580), such as by clicking in the region 5720 shown in FIG. 57. The latitude and longitude of the location clicked on is then determined by the controller 243. The location information of the entity is then updated (block 5590) in the business table 270 of the database 262 of the system 200 by replacing the values in the latitude field 3760 and longitude field 3770 in the entity entry 3700 for the entity with their newly determined values. The method continues with block 5510, now showing the updated location, and runs until the user indicates they are done in either block 5520 or 5560.

FIG. 56 is a screen shot 5601 of an exemplary web page 240 demonstrating the start of method 5500 described hereinabove with relation to FIG. 55 for manually updating the location of an entity representation 422. In the described embodiment, the web page 240 of FIG. 56 can be accessed by clicking on map edit button 3422 of the web page 240 shown in FIG. 34A. The web page 240 contains an update indicator 5602 which can be clicked on to change the location of entity representation 422. The web page 240 also contains a Finished button 5604, which can be clicked on to end the location changing process.

FIG. 57 is a screen shot 5701 of an exemplary web page 240 further demonstrating the method 5500 described hereinabove with relation to FIG. 55 for manually updating the location of an entity representation 422. The web page 240 contains an update alert 5708 to remind the user to click to change the location. In the described embodiment of FIGS. 56-57, the update alert 5708 appears after the user clicks on update indicator 5602. The user can click anywhere on the viewable map 300 to indicate the new location of the entity representation 422, such as in the marked region 5720 in this FIG. 57.

FIG. 58 is a screen shot 5801 of an exemplary web page 240 showing the result of moving the entity representation 422 by clicking on region 5720, as described immediately hereinabove with relation to FIG. 57. The entity representation 422 appears in a different location on viewable map 300 than it does in FIG. 57, since the user has clicked on region 5720 to change the location. The new location can be seen to be proximate to the user's click within the marked region 5720. The user would then click on Finished button 5604 to return to the web page 240 shown in FIG. 34A or continue the process by clicking on the update indicator 5602.

Figure 59:
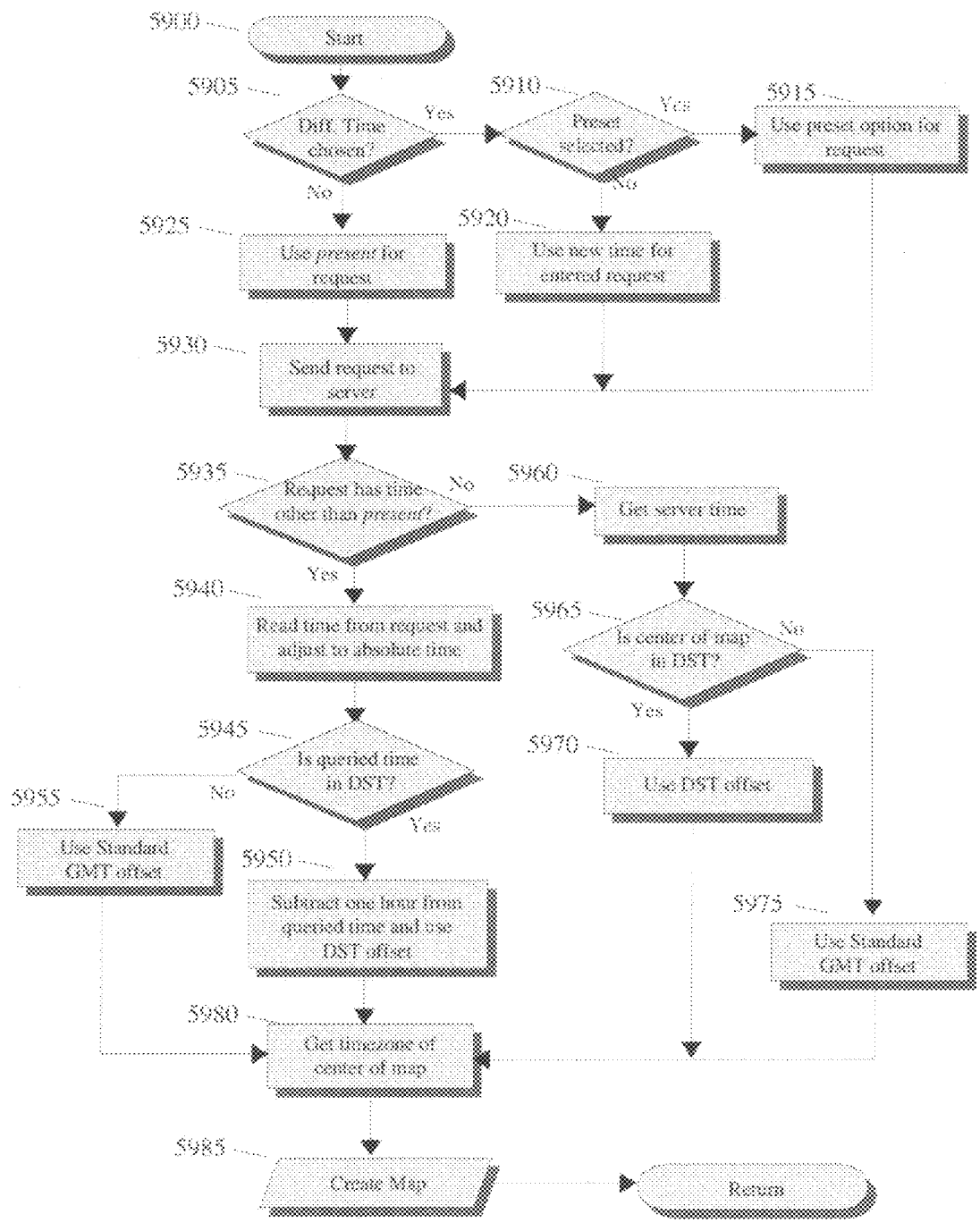
FIG. 59 is an exemplary flow diagram of a method for changing time in a map time display and presenting time dependent results on a map in accordance with the present invention.

FIG. 59 is an exemplary flow diagram of a method 5900 for presenting time dependent results on a map in accordance with the present invention. The following discussion regarding Daylight Savings Time applies to areas in the U.S. only and may need to be modified for other areas of the world. Such modifications include changing the amount of the time shift as well as the starting and ending dates for Daylight Savings Time to those used in the areas of interest. The user of the client 202 may choose to view classification results (of, for example, hours of operation or event occurrences) for a time other than the present (block 5905). If so, the user may use the web browser 204 to create a request for a viewable map 300 with the time of interest. To create the request, the user may select a preset time option, such as one of the preset time options 1304 shown in FIG. 13 (block 5910). If so, the preset time option 1304 the user chooses has its corresponding time entered into the request (block 5915). If a preset time option is not selected (block 5910), the different time option 1306 may be used to enter a specific time of interest, as shown in FIG. 13; this time is then entered into the request (block 5920). FIG. 14 shows an exemplary web page 240 that may be used to enter a new time using the time entry form 1402, time zone entry form 1404, and date entry form 1410. If the user was not interested in a time other than the present (block 5905), an indicator is entered into the request signifying that the present time should be used (block 5925). This indicator may be represented by the system 200 with an invalid time for the time of interest, such as −1 or 50:00, that will signify to the server 130 that it should determine the time of interest based on its system clock 109. In the flow diagram, this representation is referred to as present. The request is then sent to the server 130 (block 5930) with this time information and other pieces of the request needed by the server 130.

The server 130 evaluates the request to see if it has a time other than present (block 5935). If it has a time other than present, the server 130 reads this time from the request and adjusts this requested time into an absolute standard time (block 5940). In an embodiment of the present invention, it does this by setting the server time zone temporarily to the Standard (not Daylight Savings Time) time zone that was entered in the time zone entry form 1404 with an environment variable and then converting the time and date that were entered in the time entry form 1402 and date entry form 1410 into a Unix timestamp in that time zone, as may be done using the PHP library call strtotime( ). A Unix timestamp is an integer, that when interpreted as an absolute time value, represent the number of seconds elapsed since 00:00:00 on Jan. 1, 1970, Coordinated Universal Time (UTC); UTC is another name for GMT. Other operating systems and programming languages have similar date and time functions to those of PHP, and one of ordinary skill in the art should be able to implement these and other such time manipulation routines in any programming language. The system 200 then determines if Daylight Savings Time is in effect in the queried time zone (i.e., time zone entered in the time zone entry form 1404 at the queried time and date), such as by passing the Unix timestamp into the PHP function localtime( ) and noting the results (block 5945). Note that even though a time zone may be in Daylight Savings Time, certain locations in the time zone may not observe Daylight Savings Time adjustments (e.g., in the Mountain Time Zone, during Daylight Savings Time, parts of Arizona do not observe Daylight Savings Time). This may also be referred to as a separate time zone, and those areas that do not observe Daylight Savings Time will be considered to be in their own time zone. If the queried time is in Daylight Savings Time (as just determined), the server will adjust the queried time into Daylight Savings Time by subtracting one hour (3600 seconds), and will use the Daylight Savings Time GMT offset in later steps (block 5950). If the queried time is determined to not be in Daylight Savings Time, the server will use the standard GMT offset in later steps (block 5955).

In an alternative embodiment of the present invention, the system 200 sets the server time zone temporarily to the time zone that was entered in the time zone entry form 1404 with an environment variable and then converts the time and date that were entered in the time entry form 1402 and date entry form 1410 into a Unix timestamp in the server's local time zone, as may be done using the PHP library call strtotime( ). The server will then not have to do any subtraction to adjust for Daylight Savings Time later.

If the request does not have a time other than present (block 5935), the server 130 gets the current time from its system clock 109 (block 5960) as an absolute time (such as a Unix timestamp). This time will be in GMT. Then the server determines if Daylight Savings Time is in effect in the time zone of the center of the viewable map 300 at that time, as may be done using the PHP function localtime( ) (block 5965); other embodiments may read information on when Daylight Savings Time is in effect from a file, database, or other source. In addition, other embodiments may use the local time zone of the server 130 to determine if Daylight Savings Time is in effect. These methods assume that all areas in the U.S. observe Daylight Savings Time during the same periods. This is an approximation, since DST begins and ends at 2: am based on the local time. During time periods near the switch, these methods may produce incorrect results. To fix this problem, other embodiments may use the time zone of an entity stored in database 262 to determine if Daylight Savings Time is in effect when doing any time comparisons involving that entity. If Daylight Savings Time is in effect (block 5965), the server will use the Daylight Savings Time GMT offset in later steps (block 5970). If Daylight Savings Time is not in effect (block 5965), the server will use the Standard GMT offset in later steps (block 5975).

Regardless of the source of the time, the server then determines the time zone of the center of the viewable map 300 of the area in the request (block 5980). This may be done by seeing which shape in the time zones shapefile the map center falls within. This shapefile of all U.S. Time zones, including Daylight Savings Time status, is freely available from the U.S. Geological Survey and is included in the geographic data 280 of the system. The next step (block 5985) compares the queried time to the hours of operation of the entities stored in their local time zone as a viewable map 300 is created. For each entity, the comparison is done by adjusting the queried time (in GMT) by the appropriate GMT offset of the entity as calculated in earlier steps (as can be stored in offset from GMT 4040 and Daylight Savings Time offset from GMT 4045) to produce a local queried time, and performing any modular time arithmetic (as shown below) needed to compare times. This classifies the entities as open or closed and is used to present the classified entitles on the viewable map 300 (block 5985). This viewable map 300 may be created by the application engine 242 as described hereinabove with reference to FIG. 41, using in particular the hours classification method 4400 described with relation to FIG. 44. Any time zone adjustments needed for this classification method 4400 can be performed with the time computations described herein (the steps performed in blocks 5935-5975 would be performed in block 4420). Using this method, even if a viewable map 300 contains entities in afferent time zones and Daylight Savings Time areas, the entities will be classified accurately as open or closed.

The described embodiment of always converting the queried time (in the queried time zone) to GMT and then back to the local time of the entities eliminates the need to store offsets for conversion between queried time zones and time zones of entities if the two time zones are different. Other methods for handling the time calculations will be apparent to one of ordinary skill in the art. In an embodiment of the present invention, all the times being compared may be converted into the GMT time zone for comparison instead of the local time zone of the entity, or any other common time zone such as the local time of the center of the viewable map 300. Other programming language routines or code may provide mechanisms for adding, subtracting, converting between time zones, or otherwise manipulating times and dates. Other such functions, such as those provided by an operating system, programming language library, or database, or those written to perform similar functions may be used in this method. A method that correctly compares time values by adjusting for disparate time zones and Daylight Savings Time status is all that is necessary. Other embodiments may be limited to entities in a single time zone and may ignore those portions of the time conversions described above. Other embodiments may not account for Daylight Savings Time or may simplify by assuming the entire area within the system (such as the US) observes DST in the same manner. Limiting the time ranges allowed (such as by only allowing time queries for the next day, week, ten days, etc . . . ) may also allow the time conversions to be simplified.

Some examples of the time calculations are now given for a user browsing an area in Boston, Mass. (which is in the Eastern Time Zone) on the viewable map 300 at 6:00 pm (18:00) EST, while the server 130 of the system is located in California (in the Pacific Time Zone). If the user does not choose a different time, the server 130 reads the current time from its system clock 109 (23:00 GMT). If Bob's Diner is located in the area of the viewable map 300 in Boston, it will have a GMT offset of −5 hours (as can be stored in GMT offset 4040 shown in FIG. 40), and so the queried time is offset by −5 hours from 23:00 to 18:00. If the operating hours of Bob's Diner are from 9:00 am-5:00 pm (as could be stored in the Monday Open 1 time 4016A and Monday Close 1 time 4018A), the comparison with the queried time would then be: is 9:00<=18:00<17:00?, which is false; so Bob's Diner is classified as closed.

If the user selects a different time, such as 3:00 pm (15:00) EST instead, the server converts this time to 20:00 GMT, and the comparison with Bob's Diner (after offsetting 20:00 by −5 hours) is: is 9:00<=15:00<17:00?, which is true, classifying Bob's Diner as open. This also works for users in other time zones. If a user queried for 8:30 am MST, this is converted into 15:30 GMT (using the Mountain time zone GMT offset of −7 hours), and the comparison for Bob's Diner is then done (after 15:30 is adjusted using the −5 hour GMT offset for Bob's Diner to 10:30) as: is 9:00<=10:30<17:00?, which is true; so Bob's Diner is open at 8:30 am MST. Similarly, a query for 6:15 am MDT will be converted to 12:15 GMT (by first converting it to 13:15 GMT and then subtracting an hour for Daylight Savings Time as described with reference to block 5950 above) which is then offset using the Daylight Savings Time GMT offset of −4 hours for Bob's Diner to 8:15 for a comparison of: is 9:00<=8:15<=17:00?, which is false; so Bob's Diner is closed at 6:15 am MDT.

Further examples will show the calculations for an entity (e.g., Pete's Place, open 9:00 am-5:00 pm) located in Phoenix, Ariz., a region in the Mountain time zone that does not observe Daylight Savings Time. If a user queries a time of 8:30 am PST, the server converts this into a GMT time of 16:30. The standard Arizona offset of −7 hours is then added, giving a comparison of: is 9:00<=9:30<5:00?, which is true; so Pete's Place is open at 8:30 am PST. If Daylight Savings Time is in effect, such as in a query for 8:30 am PDT, this time will be converted to a GMT time of 15:30 (by first converting it to 16:30 GMT and then subtracting an hour for Daylight Savings Time as described with reference to block 5950 above). The Daylight Savings Time Arizona offset is then added, which is −7, the same as the standard offset, giving a comparison of: is 9:00 <=8:30<5:00?, which is false; so Pete's Place is closed at 8:30 am PDT.

Using the method described in this FIG. 59, even if a viewable map 300 contains entities in different time zones and Daylight Savings Time areas, the entities will be classified accurately as open or closed. In the above example, if the viewable map 300 displays entities in both Phoenix, Ariz. and San Diego, Calif., which does observe Daylight Savings Time, then comparisons between the queried time and the hours of the operation of the entities in San Diego will also be made. For example, if a restaurant named "Best Cuisine" is open from 9 am to 5 pm local time and is located in San Diego, Calif. and the user queries a time of 8:30 am PDT, this time will be converted to 15:30 GMT as described above. The Daylight Savings Time offset for San Diego, Calif. is then added (−7), giving a comparison of: is (9:00<=8:30<5:00 ?, which is false; so Best Cuisine is closed at 8:30 am PDT, as was Pete's Place In Phoenix.

It is important to note that the day of the week which will have its operating hours examined must be determined by the day of the week of the queried time and date in the local time zone of the entity, not in GMT time. This is because when the GMT offset for an entity is greater than the current GMT time, the days are different. For example, 2:00 GMT on Wednesday, when adjusted by −5 hours to Eastern Standard Time, becomes 9:00 pm EST Tuesday night. In this case, Tuesday's operating hour ranges must be examined for an entity in Eastern Standard Time, not Wednesday's.

The exemplary comparisons shown above have not accounted for hours of operation greater than 2359 GMT or local time as described in FIG. 40. This may be handled by taking all queried times modulo 2400 before comparing them. The comparisons then become open<=(Time+2400)%2400<closed. The addition of 2400 may be done to guarantee that the compared time is always positive, regardless of any offset that has been added to it. Thus, all the pseudocode in FIG. 44 and following that specifies "Time" should be replaced with "(Time+2400)%2400" in order to account for the issue just described. Also, operating hour ranges may cross days. For example, a store that is open from 9:00 pm to 2:00 am every weeknight may be represented as 2100-200 in a time range in its standard hours entry 4000. Comparisons for entities with ranges such as this that cross days can be handled as a special case. The standard comparison in the pseudocode of FIG. 44:

---
open <= Time < closed
--- may be replaced in FIG. 44 by one like this:

---
(open<=closed and
    open <= Time < closed)
or
(open > closed and
    ((open <= Time <= 2400) or (0 <= Time < closed)))
---

The first case (open<=closed) handles standard ranges that do not cross days in the usual manner, while the second case (open>closed), which can only happen for ranges that span past midnight, handles the comparisons by first seeing if the time is after the opening but before midnight, and then checking if it is greater than midnight but before the closing time in the morning. Other methods will be apparent to one of ordinary skill in the art.

In an embodiment of the present invention, the map may include a map time display 374 which will display the time of interest in the time zone of the center of the viewable map 300, making the resulting display independent of the time zone of the client 202. An example is now given for a business located in Boston, Mass.: Bob's Diner, which is open from 9:00 am until 5:00 pm Eastern Standard Time (EST). When a client 202 in the Eastern time zone views a map containing Bob's Diner at 4:00 pm EST, the entity representation 930G for Bob's Diner will be green, and the map time display 374 will list the time as 4:00 pm EST since that is the time zone of the center of the map showing Bob's Diner (in Boston). When a client 202 in the Pacific time zone views Bob's Diner at the same time, it will see the same green entity representation 930G and map time display 374 of 4:00 pm EST since it is viewing the same area of the country, even though the local Pacific Standard Time is actually 1:00 pm PST. When the client 202 in the Pacific time zone views Bob's Diner at 4:00 pm (PST), it will see a red entity dot 930R and the map time display 374 will read 7:00 pm EST, since the map time display 374 does not depend on the client time zone. This allows users to enter a time of interest in their local time zone (or any other time zone) but always see the results in the local time zone. This can be more understandable than representations based on the client 202 time zone since Bob's Diner will always be displayed as open between 9:00 am and 5:00 am EST as is customary, instead of as open from 6:00 am to 2:00 pm PST for a client in the Pacific time zone. However, embodiments where the map time display 374 is based on the preferences of the client 202 are also possible.

In other embodiments of the present invention, the map time display 374 may be displayed in the time zone of the queried time, the preferred time zone of a user as stored in the user account tables 278 of the database 262 or in the session information, or any other relevant time zone. A queried time can be converted into a local time by temporarily setting the server time zone to the queried time zone and then using a routine like the PHP function date( ) to format the time for display. The current server time may also be formatted by date( ) or similar functions. Other operating systems and programming languages have similar date and time functions to those of PHP, and one of ordinary skill in the art should be able to implement these and other such time manipulation routines in any programming language.

While the above description contains many specificities, these should not be construed as limitations on the scope of the invention, but rather as an exemplification of one preferred embodiment thereof. Many variations are possible. Throughout the above description, the described embodiment(s) have focused on management and presentations of entity information, particularly as displayed on a map. It is important to point out that these are not the only suitable embodiments. Other embodiments of such presentations may not use a map. Such embodiments could still make use of the many features and advantages of the invention. For example, a textual listing of businesses in a given area from an electronic directory or from the generated results page of a search engine could be enhanced with dynamic images that show whether or not the business in question is currently open or closed (or is open or closed at a different time) and could also contain a button to display the business results in a slide show. Yet other embodiments of the present invention suitable for use in online business directories include systems and methods for presenting and managing detailed daily hours information using multiple time ranges, exceptional hours for non-standard dates, and currently open/closed indicators, presenting notes associated with a location or an entity, providing the ability to view hours of operation for a time other than the present, providing the ability for a business to specify its actual location on a map, providing dynamically coded result displays of other entity characteristics and all the other embodiments described herein. Furthermore, other embodiments of the present invention may not utilize a directory nor other listing of business information. For example, product availability results as shown with an embodiment of the current invention could be applied to an Internet search engine so that users could see at a glance which products are available at certain websites. Graded search results could be displayed with icons next to the listings in a search engine results page. An individual entity could use the present invention for managing and presenting information on its web site, such as by placing a dynamically changing symbol representing its hours of operation on the site, or by displaying a map with features of the invention on it. All of the other embodiments of the present invention suitable for use in online business directories described herein are also suitable for use in other web sites or in an individual entity's web site. Many other embodiments will also be apparent to one of ordinary skill in the art. Since particular embodiments have been described with great specificity, it will be easily seen by one of ordinary skill in the art how to generalize these specific embodiments and implement a great number of related embodiments, such as those just described.

Although the described embodiment uses an account mechanism for entities to directly enter and modify information related to them, the invention is equally applicable to other methods and mechanisms for entering entity information such as using a web crawler or spider as is well known in the art in order to retrieve such data from various web pages, importing such data in bulk from a commercial or government or other provider of such aggregated entity data as is available, or providing a method for individuals to enter such data about entities that they know of on a volunteer or commercial basis. The various data regarding entities, such as keywords, categories, and descriptions, may be replaced with other data types or limited to portions of the data; such limitations could even allow removing the text search engine completely, if, for example, the entity descriptions were removed and only keywords or categories were stored in the system. In alternative embodiments, the data may not be directly stored in the system at all but instead retrieved dynamically over a network from other data sources when it is needed. For example, the database could include a web site URL or URLs associated with each entity that is retrieved to get current information when the map is generated, or a query could be run against another data provider like a public search engine or private inventory system to get the current data needed to generate a map.

While the described embodiments specify the use of a web browser throughout, the invention may be implemented equally well with any other computer program or application that is able to run on the client and display the results. Similarly, while the use of a standard relational database is preferred, any means of storing a set of data for later use (such as in text or binary files) would be sufficient to implement the invention.

While the invention has been described as a system of individual computers it could also be a stand-alone system, as noted with reference to FIG. 2. In such an embodiment, the client and server would preferably run on the same microprocessor, communicating within the same computer via software means, not over a network. This embodiment could include network connectivity such as a wireless connection over which to periodically or based on user input update the geographic data or other entity data, or the data could be preloaded into the system or updated manually by loading a CD, DVD, ROM cartridge, or other storage media into the computer. A stand-alone system would not require the use of any internetwork or intranetwork and various modules may be replaced by versions more appropriate to such an embedded environment, including possibly using a non-volatile solid state memory for secondary storage or software routines instead of a full-featured database.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Thus the scope of the invention should be determined by the appended claims and their legal equivalents, rather than by the examples given.

What is claimed is:

1. A method of presenting information regarding a plurality of entities, said method being performed by a processor, said method comprising:

for each said entity, storing at least one entity characteristic list, said at least one entity characteristic list comprising entity characteristic information regarding each said entity, said entity characteristic information comprising at least one time entry, said at least one time entry comprising a plurality of entity time components and a plurality of entity day components, said plurality of entity day components comprises at least seven entity day components, each of said seven entity day components corresponding to a different day of the week, each of said seven entity day components associated with at least one of said plurality of entity time components, said plurality of entity time components comprising at least one continuous time range, said continuous time range comprising at least one begin time component and at least one end time component;

receiving a queried time, said queried time comprising at least one queried day component and at least one queried time component;

for each said entity, resolving a characteristic classification from said queried time and said at least one entity characteristic list, said operation of resolving further comprising, comparing said at least one queried day component to at least one of said plurality of entity day components and comparing said at least one queried time component to a selected at least one pair of entity time components, said characteristic classification having a plurality of possible values, said possible values comprising at least a first value and a second value; and for each said entity, displaying at least one representation for said each entity, said at least one representation rendered in a first state when said characteristic classification of each said entity has resolved to a first value and said at least one representation rendered in a second state when said characteristic classification of each said entity has resolved to a second value.

2. The method recited in claim 1, further comprising:

associating a physical location with each said entity;

displaying a viewable portion of a map of a predetermined area, said viewable portion being all or a portion of said map;

selecting from said plurality of entities at least one entity associated with a physical location correspondingly located within said viewable portion of said map; and placing said at least one representation for said at least one selected entity on said viewable portion of said map at a location that is correspondingly proximate to said physical location associated with said at least one selected entity.

3. The method recited in claim 2, wherein said queried time comprises current time.

4. The method recited in claim 2, wherein said at least one entity characteristic list comprises hours of operation information, said first value for said characteristic classification comprises a value representing an entity that is open, and said second value for said characteristic classification comprises a value representing an entity that is closed.

5. The method recited in claim 1, wherein said queried time comprises a time in the future, said future time being more than a day from the present time.

6. The method recited in claim 1, wherein said queried day component comprises a day of the week.

7. The method recited in claim 1, wherein said queried time comprises a range of time having a begin time and an end time.

8. The method recited in claim 1, wherein said queried time comprises a time read from a system clock.

9. The method recited in claim 1, wherein said at least one entity characteristic list comprises hours of operation information, said first value for said characteristic classification comprises a value representing an entity that is open, and said second value for said characteristic classification comprises a value representing an entity that is closed.

10. The method recited in claim 9, wherein each of said first state and said second state comprises a state that is visible.

11. The method recited in claim 9, wherein one of said first state and said second state comprises a state that is not visible.

12. The method recited in claim 9, wherein said at least one time entry comprises at least one current status indicator, said at least one current status indicator comprises at least one value representative of either open or closed such that when said at least one current status indicator comprises a value representative of closed, said comparing step in said resolving step is skipped, and said resolving step produces said second value for said characteristic classification, and when said at least one current status indicator comprises a value representative of open, said comparing step in said resolving step is skipped, and said resolving step produces said first value for said characteristic classification.

13. The method recited in claim 9, wherein said hours of operation information is entered by at least one user via a web interface.

14. The method recited in claim 9, wherein said hours of operation information is obtained by a web crawler.

15. The method recited in claim 1, wherein said at least one entity characteristic list comprises hours of operation information, said hours of operation information comprising two or more opening times for at least one day and two or more closing times for at least one day, said first value for said characteristic classification comprises a value representing an entity that is open, and said second value for said characteristic classification comprises a value representing an entity that is closed.

16. The method recited in claim 1, wherein said at least one entity characteristic list comprises normal operating hours information and exceptional operating hours information, said normal operating hours information comprising said plurality of entity time components and said plurality of entity day components, said exceptional operating hours information comprises time information capable of being expressed in a duration of less than one day, said exceptional operating hours information being an exception to at least one of said plurality of time components associated with at least one of said seven entity day components, said exceptional operating hours information further comprising a month component and a numerical day of the month component, said first value for said characteristic classification comprises a value representing an entity that is open, and said second value for said characteristic classification comprises a value representing an entity that is closed.

17. The method recited in claim 1, wherein said operation of resolving further comprising:
adjusting said queried time by adding to queried time an offset, the adjusted queried time used in place of queried time in said resolving operation, said offset is predetermined, said offset further having the same value each time said resolving step is performed.

18. The method recited in claim 1, wherein said operation of resolving further comprises:
adjusting said queried time by adding to queried time a calculated time offset, said calculated time offset comprises a component that is dependent on a distance from a location to each said entity, the adjusted queried time comprising at least one adjusted queried day component and at least one adjusted queried time component, said adjusted queried day component being different than or the same as the queried day component, said adjusted queried day component used in place of said queried day component, and said adjusted queried time component used in place of queried time component in said operation of resolving to resolve said characteristic classification.

19. The method recited in claim 18, wherein said distance is calculated using a non-linear driving route, said non-linear driving route comprising at least one turn.

20. The method recited in claim 1, further comprising associating a physical location with each said entity;
wherein said at least one time entry comprises a time zone component, said time zone component being the time zone of said physical location, said queried time comprises a time zone component, and said operation of resolving further comprises:
for each said entity, adjusting one or both of said queried time and said at least one time entry so that said queried time and said at least one time entry are in the same time zone, adjusting for daylight savings status of said queried time and daylight savings status of said at least one time entry.

21. The method recited in claim 1, wherein said selected at least one pair of entity time components is the at least one pair of entity time components that is associated with the at least one of said plurality of entity day components that corresponds to said queried day component wherein said continuous time range is associated with said characteristic classification, said first value of said characteristic classification comprises a value representing an entity that is open, and said second value of said characteristic classification comprises a value representing an entity that is closed.

22. The method recited in claim 1, wherein said queried time comprises a future time, said future time is available to be selected from a menu of choices.

23. The method recited in claim 1, further comprising associating a physical location with each said entity;
wherein said at least one time entry comprises a time zone component, said time zone component being the time zone of said physical location, and said operation of resolving further comprises:
for each said entity, adjusting said queried time to the time zone specified by said time zone component of said at least one time entry.

24. A non-transitory computer-readable medium bearing computer-readable instructions for instructing a processor to carry out a method of presenting information regarding a plurality of entities, said method comprising:
for each said entity, storing at least one entity characteristic list, said at least one entity characteristic list comprising entity characteristic information regarding each said entity, said entity characteristic information comprising at least one time entry, said at least one time entry comprising a plurality of entity time components and a plurality of entity day components, said plurality of entity day components comprises at least seven entity day components, each of said seven entity day components corresponding to a different day of the week, each of said seven entity day components associated with at least one of said plurality of entity time components, said plurality of entity time components comprising at least one continuous time range, said continuous time range comprising at least one begin time component and at least one end time component;

receiving a queried time, said queried time comprising at least one queried day component and at least one queried time component;

for each said entity, resolving a characteristic classification from said queried time and said at least one entity characteristic list, said operation of resolving further comprising, comparing said least one queried day component to at least one of said plurality of entity day components and comparing said at least one queried time component to a selected at least one pair of entity time components, said characteristic classification having a plurality of possible values, said possible values comprising at least a first value and a second value; and for each said entity, displaying at least one representation for said each entity, said at least one representation rendered in a first state when said characteristic classification of each said entity has resolved to a first value and said at least one representation rendered in a second state when said characteristic classification of each said entity has resoled to a second value.

25. A system of presenting information regarding a plurality of entities, comprising:

means for storing at least one entity characteristic list for each said entity, said at least one entity characteristic list comprising entity characteristic information regarding each said entity, said entity characteristic information comprising at least one time entry, said at least one time entry comprising a plurality of entity time components and a plurality of entity day components, said plurality of entity day components comprises at least seven entity day components, each of said seven entity day components corresponding to a different day of the week, each of said seven entity day components associated with at least one of said plurality of entity time components, said plurality of entity time components comprising at least one continuous time range, said continuous time range comprising at least one begin time component and at least one end time component;

means for receiving a queried time, said queried time comprising at least one queried day component and at least one queried time component;

means for resolving a characteristic classification from said queried time and said at least one entity characteristic list, for each said entity, said means for resolving further comprising, means for comparing said at least one queried day component to at least one of said plurality of entity day components and means for comparing said at least one queried time component to a selected at least one pair of entity time components, said characteristic classification having a plurality of possible values, said possible values comprising at least a first value and a second value; and means for displaying at least one representation for each said entity, said at least one representation rendered in a first state when said characteristic classification of each said entity has resolved to a first value and said at least one representation rendered in a second state when said characteristic classification of each said entity has resolved to a second value.

26. The system recited in claim 25, further comprising:

means for associating a physical location with each said entity;

means for displaying a viewable portion of a map of a predetermined area, said viewable portion being all or a portion of said map;

means for selecting from said plurality of entities at least one entity associated with a physical location correspondingly located within said viewable portion of said map; and means for placing said at least one representation for said at least one selected entity on said viewable portion of said map at a location that is correspondingly proximate to said physical location associated with said at least one selected entity.

27. The system recited in claim 26, wherein said queried time comprises current time.

28. The system recited in claim 26, wherein said at least one entity characteristic list comprises hours of operation information, said first value for said characteristic classification comprises a value representing an entity that is open, and said second value for said characteristic classification comprises a value representing an entity that is closed.

29. The system recited in claim 25, wherein said queried time comprises a time in the future, said future time being more than a day from the present time.

30. The system recited in claim 25, wherein said queried day component comprises a day of the week.

31. The system recited in claim 25, wherein said queried time comprises a range of time having a begin time and an end time.

32. The system recited in claim 25, wherein said queried time comprises a time read from a system clock.

33. The system recited in claim 25, wherein said at least one entity characteristic list comprises hours of operation information, said first value for said characteristic classification comprises a value representing an entity that is open, and said second value for said characteristic classification comprises a value representing an entity that is closed.

34. The system recited in claim 33, wherein each of said first state and said second state comprises a state that is visible.

35. The system recited in claim 33, wherein one of said first state and said second state comprises a state that is not visible.

36. The system recited in claim 33, wherein said at least one time entry comprises at least one current status indicator, said at least one current status indicator comprises at least one value representative of either open or closed such that when said at least one current status indicator comprises a value representative of closed, the comparing step performed by said comparing means is skipped, and said second value for said characteristic classification is resolved by said resolving means, and when said at least one current status indicator comprises a value representative of open, said comparing step performed by said comparing means is skipped, and said first value for said characteristic classification is resolved by said resolving means.

37. The system recited in claim 25, wherein said at least one entity characteristic list comprises hours of operation information, said hours of operation information comprising two or more opening times for at least one day and two or more closing times for at least one day, said first value for said characteristic classification comprises a value representing an entity that is open, and said second value for said characteristic classification comprises a value representing an entity that is closed.

38. The system recited in claim 25, wherein said at least one entity characteristic list comprises normal operating hours information and exceptional operating hours information, said normal operating hours information comprising said plurality of entity time components and said plurality of entity day components, said exceptional operating hours information comprises time information capable of being expressed in a duration of less than one day, said exceptional operating hours information being an exception to at least one of said plurality of time components associated with at least one of said seven entity day components, said exceptional operating hours information further comprising a month component and a numerical day of the month component, said first value for said characteristic classification comprises a value representing an entity that is open, and said second value for said characteristic classification comprises a value representing an entity that is closed.

39. The system recited in claim 25, wherein means for resolving further comprises:
means for adjusting said queried time by adding to queried time an offset, the adjusted queried time used in place of queried time in said resolving operation, said offset being predetermined by said processor, said offset further having the same value each time said resolving step is performed.

40. The system recited in claim 25, wherein said means for resolving further comprises:
means for adjusting said queried time by adding to queried time a calculated time offset, said calculated time offset comprises a component that is dependent on a distance from a location to each said entity, the adjusted queried time comprising at least one adjusted queried day component and at least one adjusted queried time component, said adjusted queried day component being different than or the same as the queried day component, said adjusted queried day component used in place of said queried day component, and said adjusted queried time component used in place of queried time component in the resolving step performed by said resolving means to resolve said characteristic classification.

41. The system recited in claim 25, further comprising
means for associating a physical location with each said entity;
wherein said at least one time entry comprises a time zone component, said time zone component being the time zone of said physical location, said queried time comprises a time zone component, and said means for resolving further comprises:
means for adjusting, for each said entity, one or both of said queried time and said at least one time entry so that said queried time and said at least one time entry are in the same time zone, adjusting for daylight savings status of said queried time and daylight savings status of said at least one time entry.

42. The system recited in claim 25, wherein said selected at least one pair of entity time components is the at least one pair of entity time components that is associated with the at least one of said plurality of entity day components that corresponds to said queried day component wherein said continuous time range is associated with said characteristic classification, said first value of said characteristic classification comprises a value representing an entity that is open, and said second value of said characteristic classification comprises a value representing an entity that is closed.

43. The system recited in claim 25, wherein said queried time comprises a future time, said future time is available to be selected from a menu of choices.

44. The system recited in claim 25, further comprising
means for associating a physical location with each said entity;
wherein said at least one time entry comprises a time zone component, said time zone component being the time zone of said physical location, and said means of resolving further comprises:
means for adjusting, for each said entity, said queried time to the time zone specified by said time zone component of said at least one time entry.

\* \* \* \* \*